(12) United States Patent
Schlothauer et al.

(10) Patent No.: US 12,466,872 B2
(45) Date of Patent: Nov. 11, 2025

(54) METHOD FOR THE GENERATION OF AN FCRN EXPRESSING CELL BY TARGETED INTEGRATION OF MULTIPLE EXPRESSION CASSETTES IN A DEFINED ORGANIZATION

(71) Applicant: Hoffmann-La Roche Inc., Little Falls, NJ (US)

(72) Inventors: Tilman Schlothauer, Penzberg (DE); Stefan Seeber, Sindelsdorf (DE); Jasmin Maria Wehrstein, Ulm (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 943 days.

(21) Appl. No.: 17/490,979

(22) Filed: Sep. 30, 2021

(65) Prior Publication Data

US 2022/0119482 A1 Apr. 21, 2022

Related U.S. Application Data

(63) Continuation of application No. PCT/EP2020/058452, filed on Mar. 26, 2020.

(30) Foreign Application Priority Data

Mar. 29, 2019 (EP) .................... 19166030

(51) Int. Cl.
C07K 14/735 (2006.01)
(52) U.S. Cl.
CPC .............. C07K 14/70535 (2013.01)
(58) Field of Classification Search
CPC .......... C07K 14/70535; C07K 2319/22; C07K 14/47; C07K 14/70539; B01D 15/3809; C12N 9/93; C12N 15/85; C12Y 603/04015
See application file for complete search history.

(56) References Cited

U.S. PATENT DOCUMENTS

| | | |
|---|---|---|
| 6,277,608 B1 | 8/2001 | Hartley et al. |
| 6,410,329 B1 | 6/2002 | Hansen et al. |
| 2015/0037337 A1 | 2/2015 | Friedrich et al. |
| 2015/0167010 A1 | 6/2015 | Lamb et al. |
| 2018/0003696 A1 | 1/2018 | Sharei et al. |
| 2019/0017021 A1 | 1/2019 | Buelow et al. |
| 2020/0392237 A1 | 12/2020 | Bacac et al. |
| 2021/0139561 A1 | 5/2021 | Auer et al. |
| 2021/0388341 A1 | 12/2021 | Goepfert et al. |
| 2021/0403953 A1 | 12/2021 | Shen et al. |
| 2022/0073646 A1 | 3/2022 | Amann et al. |
| 2022/0169729 A1 | 6/2022 | Auer et al. |
| 2022/0169730 A1 | 6/2022 | Auer et al. |
| 2022/0169731 A1 | 6/2022 | Auer et al. |
| 2022/0170049 A1 | 6/2022 | Auslaender et al. |

FOREIGN PATENT DOCUMENTS

| | | |
|---|---|---|
| CN | 104508135 A | 4/2015 |
| JP | 2016-514477 A | 5/2016 |
| JP | 2017-104107 A | 6/2017 |
| KR | 10-2011-0068814 A | 6/2011 |
| KR | 10-2014-0106585 A | 9/2014 |
| WO | 92/08796 A1 | 5/1992 |
| WO | 94/28143 A1 | 12/1994 |
| WO | 00/31246 A2 | 6/2000 |
| WO | 02/101005 A2 | 12/2002 |
| WO | 02/101005 A3 | 12/2002 |
| WO | 03/031629 A1 | 4/2003 |
| WO | 2005/019463 A1 | 3/2005 |
| WO | 2006/007850 A1 | 1/2006 |
| WO | 2007/124452 A2 | 11/2007 |
| WO | 2010/118045 A1 | 10/2010 |
| WO | 2013/006142 A1 | 1/2013 |
| WO | 2013/092743 A2 | 6/2013 |
| WO | 2013/120929 A1 | 8/2013 |
| WO | 2013/171505 A2 | 11/2013 |

(Continued)

OTHER PUBLICATIONS

Loehlin (Proceedings of the National Academy of Sciences 113.21 (2016): 5988-5992) (Year: 2016).*
Stewart (Methods in enzymology. vol. 477. Academic Press, 2010. 145-151) (Year: 2010).*
Gallie (Genes & development 5.11 (1991): 2108-2116) (Year: 1991).*
Yew (Human gene therapy 8.5 (1997): 575-584) (Year: 1997).*
Osti (Journal of virological methods 136.1-2 (2006): 93-101) (Year: 2006).*
Neuber (MAbs. vol. 6. No. 4. Taylor & Francis, 2014) (Year: 2014).*
Jilette (bioRxiv 452979 (2018)) (Year: 2018).*
Ausubel, F.M., et al. Current Protocols in Molecular Biology New York, N. Y., USA: John Wiley and Sons, Inc., vol. I-III (Jan. 1, 1997).

(Continued)

Primary Examiner — Anne M. Gussow
Assistant Examiner — Kyle T Rega
(74) Attorney, Agent, or Firm — GENENTECH, INC.

(57) ABSTRACT

Herein is reported a method for producing C-terminally biotinylated FcRn comprising the steps of cultivating a mammalian cell comprising a deoxyribonucleic acid encoding FcRn and *E. coli* biotin-[acetyl-CoA-carboxylase] ligase (BirA) in a biotin containing medium, and recovering C-terminally biotinylated FcRn from the cell or the cultivation medium, wherein the deoxyribonucleic acid encoding FcRn and *E. coli* BirA is stably integrated into the genome of the mammalian cell and comprises in 5'- to 3'-direction a first expression cassette encoding class I major histocompatibility complex-like protein (α-FcRn) comprising a HisAvi-tag at the C-terminus, a second expression cassette encoding β2-microglobulin (β2m), a third expression cassette encoding class I major histocompatibility complex-like protein (α-FcRn) comprising a HisAvi-tag at the C-terminus, a fourth expression cassette encoding β2-microglobulin (β2m), and a fifth expression cassette encoding *E. coli* biotin-[acetyl-CoA-carboxylase] ligase.

9 Claims, 1 Drawing Sheet
Specification includes a Sequence Listing.

(56) References Cited

FOREIGN PATENT DOCUMENTS

| | | |
|---|---|---|
| WO | 2013/171505 A3 | 11/2013 |
| WO | 2014/033074 A1 | 3/2014 |
| WO | 2014/162318 A2 | 10/2014 |
| WO | 2016/020309 A1 | 2/2016 |
| WO | 2016/050917 A1 | 4/2016 |
| WO | 2016/079076 A1 | 5/2016 |
| WO | 2017/040335 A2 | 3/2017 |
| WO | 2017/055389 A1 | 4/2017 |
| WO | 2017/060144 A1 | 4/2017 |
| WO | 2017/180989 A2 | 10/2017 |
| WO | 2017/184831 A1 | 10/2017 |
| WO | 2018/002358 A1 | 1/2018 |
| WO | 2018/162517 A1 | 9/2018 |
| WO | 2018/197533 A1 | 11/2018 |
| WO | 2019/028023 A2 | 2/2019 |
| WO | 2019/030373 A1 | 2/2019 |
| WO | 2019/051237 A1 | 3/2019 |
| WO | 2019/086497 A2 | 5/2019 |
| WO | 2019/126634 A2 | 6/2019 |
| WO | 2020/084034 A1 | 4/2020 |
| WO | 2020/132165 A1 | 6/2020 |
| WO | 2020/254351 A1 | 12/2020 |
| WO | 2020/254352 A1 | 12/2020 |
| WO | 2020/254355 A1 | 12/2020 |
| WO | 2020/254356 A1 | 12/2020 |
| WO | 2020/254357 A1 | 12/2020 |

OTHER PUBLICATIONS

Bouhassira, E., et al., "Transcriptional Behavior of LCR Enhancer Elements Integrated at the Same Chromosomal Locus by Recombinase-Mediated Cassette Exchange" Blood 90(9):3332-3344 (Nov. 1, 1997).

BPS Bioscience et al., "FcRn (FCGRT/B2M), His-Tag, Biotin-Labeled, HiPT" (Data Sheet-Human Recombinant, C-terminal His-Avi-tag; Catalog No. 71283, Lot No. 160922), :1-2 (Oct. 1, 2016) https://bpsbioscience.com/media/wysiwyg/71283_lot_160922.pdf.

Celis, J., et al. Cell Biology: A Laboratory Handbook Celis, J., ed., Third edition, New York, USA:Elsevier—Academic Press, vol. I-III:1-638 (Dec. 1, 2006).

Crawford, Y. et al., "Fast identification of reliable hosts for targeted cell line development from a limited-genome screening using combined φC31 integrase and CRE-Lox technologies" Biotechnol Prog 29(5):1307-1315 (Sep. 1, 2013).

Dall'Acqua, W., et al., "Increasing the affinity of a human IgG1 for the neonatal Fc receptor: biological consequences" J Immunol 169(9):5171-5180 (Nov. 1, 2002).

Dall'Acqua, W., et al., "Properties of human IgG1s engineered for enhanced binding to the neonatal Fc receptor (FcRn)" J Biol Chem 281(33):23514-23524 (Aug. 18, 2006).

Datta-Mannan, A., et al., "FcRn Affinity-Pharmacokinetic Relationship of Five Human IgG4 Antibodies Engineered for Improved In Vitro FcRn Binding Properties in Cynomolgus Monkeys" Drug Metab Dispos 40(8):1545-1555 (Aug. 1, 2012).

Diepenbruck, C., et al., "Productivity and Quality of Recombinant Proteins Produced by Stable CHO Cell Clones can be Predicted by Transient Expression in HEK Cells" Mol Biotechnol 54(2):497-503 (Jun. 1, 2013).

Farber-Schwarz, A.,, "Serum Albumin and its Interaction with the Neonatal Fc Receptor (FcRn): Characterization of the Albumin/FcRn-binding Mechanism" Institut fur Zellbiologie und Immunologie der Universitat Stuttgart-DE (PhD Dissertation Thesis),: 1-152 (Jan. 1, 2013).

Firan, M., et al., "The MHC class I-related receptor, FcRn, plays an essential role in the maternofetal transfer of γ-globulin in humans" Int Immunol 13(8):993-1002 (Aug. 1, 2001).

Flatman, S., et al., "Process analytics for purification of monoclonal antibodies" J Chromatogr 848(1):79-87 (Mar. 15, 2007).

Freshney, R.I., et al. Culture of Animal Cells: A Manual of Basic Technique New York: Alan R. Liss, Inc.,:1-7 (1983).

Geisse, S., et al. Therapeutic Proteins: Methods and Protocols—Methods in Molecular Biology "Chapter 13: Transient Expression Technologies: Past, Present, and Future" Voynov, V & Caravella, J., eds., Totowa, New Jersey—US: Humana Press, vol. 899:203-219 (2012).

Gorman, C. DNA Cloning: A Practical Approach "High Efficiency Gene Transfer into Mammalian Cells" Glover, D.M., ed., Washington D.C.: IRL Press, vol. 2:143-190 (Jan. 1, 1985).

Hames, B., et al. Nucleic Acid Hybridisation: A Practical Approach Hames,B. and Higgins, S., eds., First edition, Oxford, UK: IRL Press,:1-264 (Dec. 1, 1985).

Huber, A., et al., "Crystallization and stoichiometry of binding of a complex between a rat intestinal Fc receptor and Fc" J Mol Biol 230(3):1077-1083 (Apr. 5, 1993).

"International Preliminary Report on Patentability—PCT/EP2020/08452" (Report Issuance Date: Sep. 28, 2021; Chapter I), :pp. 1-9 (Oct. 14, 2021).

"International Search Report—PCT/EP2020/058452" (w/Written Opinion), :pp. 1-16 (Apr. 30, 2020).

Kim, J., et al., "Localization of the site of the murine IgGI molecule that is involved in binding to the murine intestinal Fc receptor" Eur J Immunol 24(10):2429-2434 (Oct. 1, 1994).

Kim, J., et al., "Mapping the site on human IgG for binding of the MHC class I-related receptor, FcRn" Eur J Immunol 29(9):2819-2825 (Sep. 1, 1999).

Lanza, A., et al., "Using the Cre/lox system for targeted integration into the human genome: loxFAS-loxP pairing and delayed introduction of Cre DNA improve gene swapping efficiency" Biotechnol J 7(7):898-908 (Jul. 1, 2012).

Magistrelli, G., et al., "Robust recombinant FcRn production in mammalian cells enabling oriented immobilization for IgG binding studies" J Immunol Methods 375(1-2):20-29 (Jan. 31, 2012).

Martin, C., et al., "Peer Reviewed: Nanomaterials in Analytical Chemistry" ACS Anal Chem News & Features 70(9):322A-327A (May 1, 1998).

Martin, W., et al., "Characterization of the 2:1 Complex between the Class I MHC-Related Fc Receptor and Its Fc Ligand in Solution" ACS Biochem 38(39):12639-12647 (Sep. 3, 1999).

Medesan, C., et al., "Localization of the site of the IgG molecule that regulates maternofetal transmission in mice" Eur J Immunol 26(10):2533-2536 (Oct. 1, 1996).

Pollastrini, J., et al., "Field flow fractionation for assessing neonatal Fc receptor and Fcγ receptor binding to monoclonal antibodies in solution" Anal Biochem 414(1):88-98 (Jul. 1, 2011).

Raghavan, M., et al., "Effects of receptor dimerization on the interaction between the class I major histocompatibility complex-related Fc receptor and IgG" PNAS 92(24):11200-11204 (Nov. 21, 1995).

Sambrook, J., et al. Molecular Cloning: A Laboratory Manual Second edition, New York: Cold Spring Harbor Laboratory Press (Jan. 1, 1989).

Shields, R., et al., "High resolution mapping of the binding site on human IgG1 for Fc gamma RI, Fc gamma RII, Fc gamma RIII, and FcRn and design of IgG1 variants with improved binding to the Fc gamma R" J Biol Chem 276(9):6591-6604 (Mar. 2, 2001).

Turan, S., et al., "Recombinase-mediated cassette exchange (RMCE): traditional concepts and current challenges" J Mol Biol 407(2):193-221 (Mar. 25, 2011).

Vaughn, D., et al., "High-affinity binding of the neonatal Fc receptor to its IgG ligand requires receptor immobilization" ACS Biochem 36(31):9374-9380 (Aug. 5, 1997).

Wang, W. et al., "Monoclonal Antibodies with Identical Fc Sequences Can Bind to FcRn Differentially with Pharmacokinetic Consequences" Drug Metab Dispos 39(9): 1469-1477 (Sep. 1, 2011).

Watson, J., et al. Recombinant DNA : A Short Course First edition, New York: Scientific American Books (W.H. Freeman & Company),:1-260 (Jan. 1, 1983).

Winnacker, E., From Genes to Clones: Introduction to Gene Technology Weller, D., ed., First edition, Weinnheim, Germany: Springer-VCH,:v-vii (Jan. 1, 1987).

(56) References Cited

OTHER PUBLICATIONS

Wong, E., et al., "Reproducible doxycycline-inducible transgene expression at specific loci generated by Cre-recombinase mediated cassette exchange" Nucleic Acids Res 33(17):e147 (1-13) (Oct. 4, 2005).

Yeung, Y. et al., "Engineering human IgG1 affinity to human neonatal Fc receptor: impact of affinity improvement on pharmacokinetics in primates" J Immunol 182(12):7663-7671 (Jun. 15, 2009).

Zhong, X., et al., "Transient CHO expression platform for robust antibody production and its genhanced N-glycan sialylation on therapeutic glycoproteins" Biotechnol Prog 35(1):e2724 (1-12) (Jan 1, 2019).

Bahr, S., et al., "Engineering Conferences International ECI Digital Archives Development of a platform expression system using targeted integration in Chinese Hamster Ovary cells" Poster Cell Culture Engineering XVI, Tampa, Florida, pp. 1-2 (May 6-11, 2018) https://dc.engconfintl.org/ccexvi/120/.

Carver, J., et al., "Maximizing antibody production in a targeted integration host by optimization of subunit gene dosage and position" Biotechnol Prog 36(4):e2967 (1-10) (Jul. 1, 2020).

Gurumurthy, C., et al., "Generating mouse models for biomedical research: technological advances" Dis Model Mech 12(1):DMM029462 (1-10) (Jan. 8, 2019).

Kawabe, Y., et al., "Repeated integration of antibody genes into a pre-selected chromosomal locus of CHO cells using an accumulative site-specific gene integration system" Cytotechnology 64(3):267-279 (May 1, 2012).

Matsuyama, R. et al., "Improved gene amplification by cell-cycle engineering combined with the Cre-loxP system in Chinese hamster ovary cells" J. Biosci. Bioeng. 120(6):701-708 (Jun. 21, 2015).

Rajendra, Y., et al., "Transient and stable CHO expression, purification and characterization of novel hetero-dimeric bispecific IgG antibodies" Biotechnol Prog 33(2):469-477 (Mar. 1, 2017).

* cited by examiner

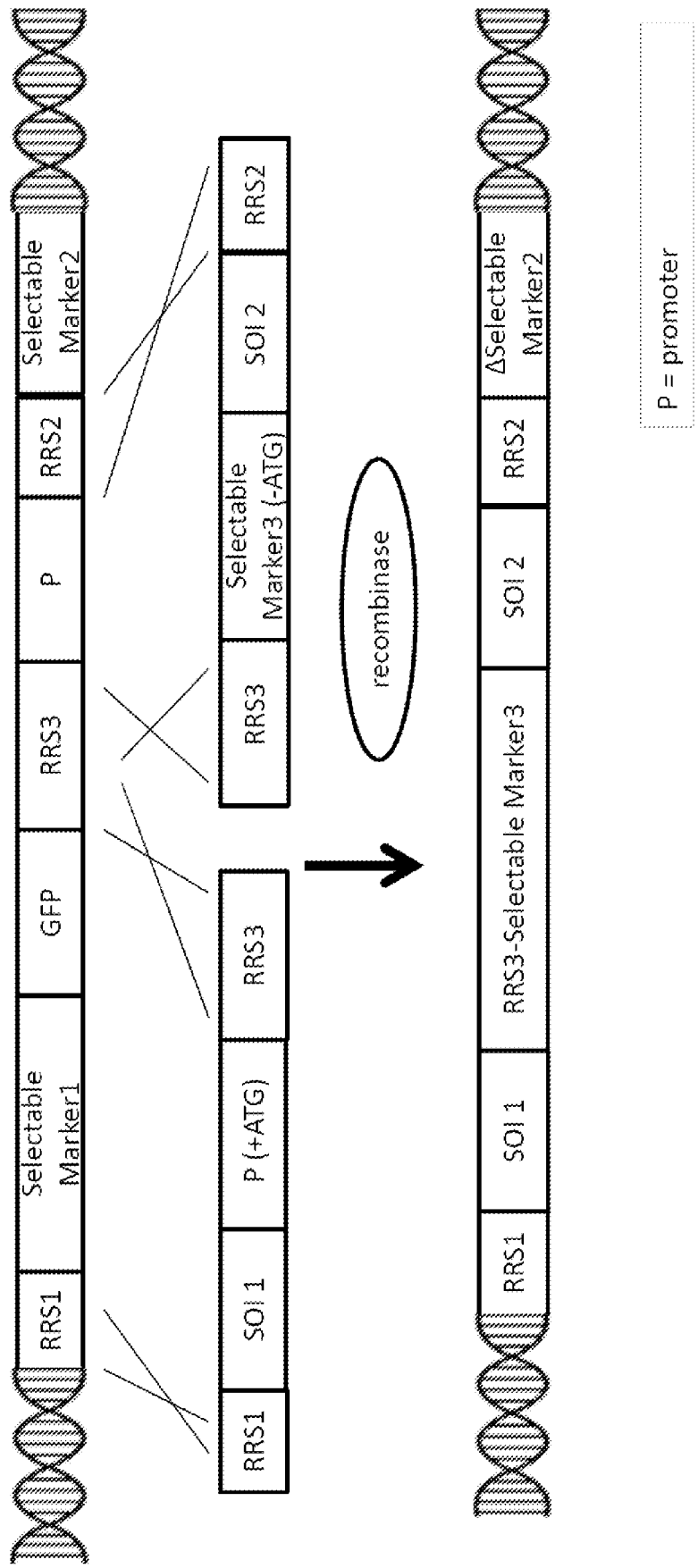

METHOD FOR THE GENERATION OF AN FCRN EXPRESSING CELL BY TARGETED INTEGRATION OF MULTIPLE EXPRESSION CASSETTES IN A DEFINED ORGANIZATION

CROSS-REFERENCE TO RELATED APPLICATIONS

This application is a continuation of International Application No. PCT/EP2020/058452 having an International filing date of Mar. 26, 2020, which claims benefit of priority to European Patent Application No. EP19166030.7, filed Mar. 29, 2019, all of which are incorporated by reference in their entirety.

SEQUENCE LISTING

This application contains a Sequence Listing which has been submitted electronically in ASCII format and is hereby incorporated by reference in its entirety. Said ASCII copy, created on Sep. 30, 2021, is named P35375-US_Sequence_Listing.txt and is 49,251 bytes in size.

FIELD OF INVENTION

The current invention is in the field of cell line generation and polypeptide production. More precisely, herein is reported a recombinant mammalian cell, which has been obtained by a double recombinase mediated cassette exchange reaction, resulting in a specific expression cassette sequence being integrated into the genome of the mammalian cell. Said cell can be used in a method for the production of FcRn.

BACKGROUND OF THE INVENTION

Secreted and glycosylated polypeptides, such as e.g. antibodies, are usually produced by recombinant expression in eukaryotic cells, either as stable or as transient expression.

One strategy for generating a recombinant cell expressing an exogenous polypeptide of interest involves the random integration of a nucleotide sequence encoding the polypeptide of interest followed by selection and isolation steps. This approach, however, has several disadvantages. First, functional integration of a nucleotide sequence into the genome of a cell as such is not only a rare event but, given the randomness as to where the nucleotide sequence integrates, these rare events result in a variety of gene expression and cell growth phenotypes. Such variation, known as "position effect variation", originates, at least in part, from the complex gene regulatory networks present in eukaryotic cell genomes and the accessibility of certain genomic loci for integration and gene expression. Second, random integration strategies generally do not offer control over the number of nucleotide sequence copies integrated into the cell's genome. In fact, gene amplification methods are often used to achieve high-producing cells. Such gene amplification, however, can also lead to unwanted cell phenotypes, such as, e.g., with unstable cell growth and/or product expression. Third, because of the integration loci heterogeneity inherent in the random integration process, it is time-consuming and labor-intensive to screen thousands of cells after transfection to isolate those recombinant cells demonstrating a desirable level of expression of the polypeptide of interest. Even after isolating such cells, stable expression of the polypeptide of interest is not guaranteed and further screening may be required to obtain a stable commercial production cell. Fourth, polypeptides produced from cells obtained by random integration exhibit a high degree of sequence variance, which may be, in part, due to the mutagenicity of the selective agents used to select for a high level of polypeptide expression. Finally, the higher the complexity of the polypeptide to be produced, i.e. the higher the number of different polypeptides or polypeptide chains required to form the polypeptide of interest inside the cell, the more important gets the control of the expression ratio of the different polypeptides or polypeptide chains to each other. The control of the expression ratio is required to enable efficient expression, correct assembly and successful secretion in high expression yield of the polypeptide of interest.

Targeted integration by recombinase mediated cassette exchange (RMCE) is a method to direct foreign DNA specifically and efficiently to a pre-defined site in a eukaryotic host genome (Turan et al., J. Mol. Biol. 407 (2011) 193-221).

WO 2006/007850 discloses anti-rhesus D recombinant polyclonal antibody and methods of manufacture using site-specific integration into the genome of individual host cells.

Crawford, Y., et al. (Biotechnol. Prog. 29 (2013) 1307-1315) reported the fast identification of reliable hosts for targeted cell line development from a limited-genome screening using combined phiC31 integrase and CRE-Lox technologies.

WO 2013/006142 discloses a nearly homogenous population of genetically altered eukaryotic cells, having stably incorporated in its genome a donor cassette comprises a strong polyadenylation site operably linked to an isolated nucleic acid fragment comprising a targeting nucleic acid site and a selectable marker protein-coding sequence wherein the isolated nucleic acid fragment is flanked by a first recombination site and a second non-identical recombination site.

WO 2013/120929 discloses the use of an immobilized non-covalent complex of a neonatal Fc receptor (FcRn) and beta-2-microglobulin (b2m) as affinity chromatography ligand in an affinity chromatography with a positive linear pH gradient for separating antibodies or fusion polypeptides comprising at least an Fc-region.

WO 2018/162517 discloses that depending i) on the expression cassette sequence and ii) on the distribution of the expression cassettes between the different expression vectors a high variation in expression yield and product quality was observed.

WO 2019/126634 disclosed targeted integration (TI) host cells suitable for the expression of recombinant proteins, as well as methods of producing and using said TI host cells.

Magistrelli et al. (J. Immunol. Meth. 375 (2012) 20-29) reported a method for producing biotinylated FcRn using PEAK cells stably expressing EBNA-1 and transiently transfected with a dual promoter vector for FcRnα and β2m co-expression (i) the biotin ligase enzyme (LsBirA) and (ii) the enhanced green fluorescent protein (EGFP) as a reporter gene. After Ni-NTA purification and immobilization they obtained only 4 mg/L and 1.2 mg/L, respectively, per liter of cell culture supernatant for hFcRn and mFcRn.

Farber-Schwarz, A., reported serum albumin and its interaction with the neonatal Fc Receptor—Characterization of the albumin/FcRn-binding mechanism (Doctoral Thesis, Univesity of Stuttgart, Germany, 2013). In this work a soluble form of the human FcRn was generated using the bicistronic Lonza pEE 6.4 expression vector. The production of a soluble mouse FcRn using the Lonza expression system was not possible. No yields are disclosed.

SUMMARY OF THE INVENTION

Herein is reported a recombinant mammalian cell expressing neonatal Fc receptor (FcRn). FcRn is a heteromultimeric polypeptide not naturally expressed by said mammalian cell. More specifically, FcRn is a heterodimeric protein consisting of two polypeptides: a class I major histocompatibility complex-like protein (α-FcRn) and β2-microglobulin (β2m). To achieve expression of FcRn a recombinant nucleic acid comprising multiple different expression cassettes in a specific and defined sequence has been integrated into the genome of a mammalian cell.

Herein is also reported a method for generating a recombinant mammalian cell expressing FcRn and a method for producing FcRn using said recombinant mammalian cell.

The current invention is based, at least in part, on the finding that the sequence of the different expression cassettes required for the expression of the heterodimeric FcRn, i.e. the expression cassette organization, as integrated into the genome of a mammalian cell influences the expression yield of FcRn.

The current invention is based, at least in part, on the finding that by integrating a nucleic acid encoding the heterodimeric FcRn that has a specific expression cassette organization into the genome of a mammalian cell efficient recombinant expression and production of FcRn can be achieved.

It has been found that the defined expression cassette sequence can advantageously be integrated into the genome of a mammalian cell by a double recombinase mediated cassette exchange reaction.

One aspect of the current invention is a method for producing C-terminally biotinylated FcRn comprising the steps of a) cultivating a mammalian cell comprising a deoxyribonucleic acid encoding FcRn and *E. coli* biotin-[acetyl-CoA-carboxylase] ligase (BirA) in a biotin containing medium, and b) recovering C-terminally biotinylated FcRn from the cell or the cultivation medium, wherein the deoxyribonucleic acid encoding FcRn and *E. coli* BirA is stably integrated into the genome of the mammalian cell and comprises in 5'- to 3'-direction a first expression cassette encoding class I major histocompatibility complex-like protein (α-FcRn) comprising a HisAvi-tag at the C-terminus, a second expression cassette encoding β2-microglobulin (β2m), a third expression cassette encoding class I major histocompatibility complex-like protein (α-FcRn) comprising a HisAvi-tag at the C-terminus, a fourth expression cassette encoding β2-microglobulin (β2m), and a fifth expression cassette encoding *E. coli* biotin-[acetyl-CoA-carboxylase] ligase.

In one embodiment the deoxyribonucleic acid encoding FcRn and *E. coli* BirA further comprises a first recombination recognition sequence located 5' to the first expression cassette, a second recombination recognition sequence located 3' to the fifth expression cassette, and a third recombination recognition sequence located between the second and the third expression cassette, and wherein all recombination recognition sequences are different.

In one embodiment the deoxyribonucleic acid encoding FcRn and BirA comprises a further expression cassette encoding for a selection marker and the expression cassette encoding for the selection marker is located partly 5' and partly 3' to the third recombination recognition sequences, wherein the 5'-located part of said expression cassette comprises the promoter and the start-codon and the 3'-located part of said expression cassette comprises the coding sequence without a start-codon and a polyA signal, wherein the start-codon is operably linked to the coding sequence.

In one embodiment each of the expression cassettes comprise in 5'-to-3' direction a promoter, a coding sequence and a polyadenylation signal sequence optionally followed by a terminator sequence. In one embodiment the promoter is the human CMV promoter with intron A, the polyadenylation signal sequence is the bGH polyA site and the terminator sequence is the hGT terminator except for the expression cassette of the selection marker, wherein the promoter is the SV40 promoter and the polyadenylation signal sequence site is the SV40 polyA site and a terminator sequence is absent.

In one embodiment the mammalian cell is a CHO cell.

In one embodiment the FcRn is human FcRn, the class I major histocompatibility complex-like protein (α-FcRn) is human class I major histocompatibility complex-like protein (α-FcRn), and the β2-microglobulin (β2m) is human β2-microglobulin (β2m).

In one embodiment the FcRn is murine FcRn, the class I major histocompatibility complex-like protein (α-FcRn) is murine class I major histocompatibility complex-like protein (α-FcRn), and the β2-microglobulin (β2m) is murine β2-microglobulin (β2m).

In one embodiment the FcRn is cynomolgus FcRn, the class I major histocompatibility complex-like protein (α-FcRn) is cynomolgus class I major histocompatibility complex-like protein (α-FcRn), and the β2-microglobulin (β2m) is cynomolgus β2-microglobulin (β2m).

One aspect according to the current invention is a biotinylated FcRn according to the invention.

One aspect according to the current invention is the use of the biotinylated FcRn according to the invention as affinity chromatography ligand.

DETAILED DESCRIPTION OF EMBODIMENTS OF THE INVENTION

The current invention is based, at least in part, on the finding that for the expression of the neonatal Fc-receptor (FcRn), a complex molecule comprising different polypeptides, i.e. which is a heteromultimer, the use of a defined and specific expression cassette organization results in efficient expression and production of FcRn in mammalian cells, such as CHO cells.

The current invention is based, at least in part, on the finding that double recombinase mediated cassette exchange (RMCE) can be used for producing a recombinant mammalian cell, such as a recombinant CHO cell, in which a defined and specific expression cassette sequence has been integrated into the genome, which in turn results in the efficient expression and production of FcRn. The integration is effected at a specific site in the genome of the mammalian cell by targeted integration. Thereby it is possible to control the expression ratio of the different polypeptides of the heteromultimeric FcRn relative to each other. Thereby in turn an efficient expression, correct assembly and successful secretion in high expression yield of correctly folded and assembled FcRn is achieved.

I. DEFINITIONS

Useful methods and techniques for carrying out the current invention are described in e.g. Ausubel, F. M. (ed.), Current Protocols in Molecular Biology, Volumes I to III (1997); Glover, N. D., and Hames, B. D., ed., DNA Cloning: A Practical Approach, Volumes I and II (1985), Oxford University Press; Freshney, R. I. (ed.), Animal Cell Culture—a practical approach, IRL Press Limited (1986); Watson, J. D., et al., Recombinant DNA, Second Edition, CHSL Press (1992); Winnacker, E. L., From Genes to Clones; N. Y., VCH Publishers (1987); Celis, J., ed., Cell Biology, Second Edition, Academic Press (1998); Freshney, R. I., Culture of Animal Cells: A Manual of Basic Technique, second edition, Alan R. Liss, Inc., N.Y. (1987).

The use of recombinant DNA technology enables the generation of derivatives of a nucleic acid. Such derivatives can, for example, be modified in individual or several nucleotide positions by substitution, alteration, exchange, deletion or insertion. The modification or derivatization can, for example, be carried out by means of site directed mutagenesis. Such modifications can easily be carried out by a person skilled in the art (see e.g. Sambrook, J., et al., Molecular Cloning: A laboratory manual (1999) Cold Spring Harbor Laboratory Press, New York, USA; Hames, B. D., and Higgins, S. G., Nucleic acid hybridization—a practical approach (1985) IRL Press, Oxford, England).

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

The term "about" denotes a range of +/-20% of the thereafter following numerical value. In one embodiment the term about denotes a range of +/-10% of the thereafter following numerical value. In one embodiment the term about denotes a range of +/-5% of the thereafter following numerical value.

The term "comprising" also encompasses the term "consisting of".

The term "mammalian cell comprising an exogenous nucleotide sequence" encompasses cells into which one or more exogenous nucleic acid(s) have been introduced, including the progeny of such cells and which are intended to form the starting point for further genetic modification. Thus, the term "a mammalian cell comprising an exogenous nucleotide sequence" encompasses a cell comprising an exogenous nucleotide sequence integrated at a single site within a locus of the genome of the mammalian cell, wherein the exogenous nucleotide sequence comprises at least a first and a second recombination recognition sequence (these recombinase recognition sequences are different) flanking at least one first selection marker. In one embodiment the mammalian cell comprising an exogenous nucleotide sequence is a cell comprising an exogenous nucleotide sequence integrated at a single site within a locus of the genome of the host cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different The term "recombinant cell" as used herein denotes a cell after final genetic modification, such as a cell expressing a polypeptide of interest and that can be used for the production of said polypeptide of interest at any scale. For example, "a mammalian cell comprising an exogenous nucleotide sequence" that has been subjected to recombinase mediated cassette exchange (RMCE) whereby the coding sequences for a polypeptide of interest have been introduced into the genome of the host cell is a "recombinant cell". Although the cell is still capable of performing further RMCE reactions it is not intended to do so.

A "mammalian cell comprising an exogenous nucleotide sequence" and a "recombinant cell" are both "transformed cells". This term includes the primary transformed cell as well as progeny derived therefrom without regard to the number of passages. Progeny may not be completely identical in nucleic acid content to a parent cell, but may e.g. contain mutations. Mutant progeny that has the same function or biological activity as screened or selected for in the originally transformed cell are encompassed.

An "isolated" composition is one which has been separated from a component of its natural environment. In some embodiments, a composition is purified to greater than 95% or 99% purity as determined by, for example, electrophoretic (e.g., SDS-PAGE, isoelectric focusing (IEF), capillary electrophoresis, CE-SDS) or chromatographic (e.g., size exclusion chromatography or ion exchange or reverse phase HPLC). For review of methods for assessment of e.g. antibody purity, see, e.g., Flatman, S. et al., J. Chrom. B 848 (2007) 79-87.

An "isolated" nucleic acid refers to a nucleic acid molecule that has been separated from a component of its natural environment. An isolated nucleic acid includes a nucleic acid molecule contained in cells that ordinarily contain the nucleic acid molecule, but the nucleic acid molecule is present extrachromosomally or at a chromosomal location that is different from its natural chromosomal location.

An "isolated" polypeptide or antibody refers to a polypeptide molecule or antibody molecule that has been separated from a component of its natural environment.

The term "integration site" denotes a nucleic acid sequence within a cell's genome into which an exogenous nucleotide sequence is inserted. In certain embodiments, an integration site is between two adjacent nucleotides in the cell's genome. In certain embodiments, an integration site includes a stretch of nucleotide sequences. In certain embodiments, the integration site is located within a specific locus of the genome of a mammalian cell. In certain embodiments, the integration site is within an endogenous gene of a mammalian cell.

The terms "vector" or "plasmid", which can be used interchangeably, as used herein, refer to a nucleic acid molecule capable of propagating another nucleic acid to which it is linked. The term includes the vector as a self-replicating nucleic acid structure as well as the vector incorporated into the genome of a host cell into which it has been introduced. Certain vectors are capable of directing the expression of nucleic acids to which they are operatively linked. Such vectors are referred to herein as "expression vectors".

The term "binding to" denotes the binding of a binding site to its target, such as e.g. of an antibody binding site comprising an antibody heavy chain variable domain and an antibody light chain variable domain to the respective antigen. This binding can be determined using, for example, a BIAcore® assay (GE Healthcare, Uppsala, Sweden). That is, the term "binding (to an antigen)" denotes the binding of an antibody in an in vitro assay to its antigen(s). In one embodiment binding is determined in a binding assay in which the antibody is bound to a surface and binding of the antigen to the antibody is measured by Surface Plasmon Resonance (SPR). Binding means e.g. a binding affinity ($K_D$) of $10^{-8}$ M or less, in some embodiments of $10^{-13}$ to $10^{-8}$ M, in some embodiments of $10^{-13}$ to $10^{-9}$ M. The term "binding" also includes the term "specifically binding".

For example, in one possible embodiment of the BIAcore® assay the antigen is bound to a surface and binding of the antibody, i.e. its binding site(s), is measured by surface plasmon resonance (SPR). The affinity of the binding is defined by the terms $k_a$ (association constant: rate constant for the association to form a complex), $k_d$ (dissociation constant; rate constant for the dissociation of the complex), and $K_D$ ($k_d/k_a$). Alternatively, the binding signal of a SPR sensorgram can be compared directly to the response signal of a reference, with respect to the resonance signal height and the dissociation behaviors.

The term "binding site" denotes any proteinaceous entity that shows binding specificity to a target. This can be, e.g., a receptor, a receptor ligand, an anticalin, an affibody, an antibody, etc. Thus, the term "binding site" as used herein denotes a polypeptide that can specifically bind to or can be specifically bound by a second polypeptide.

As used herein, the term "selection marker" denotes a gene that allows cells carrying the gene to be specifically selected for or against, in the presence of a corresponding selection agent. For example, but not by way of limitation, a selection marker can allow the host cell transformed with the selection marker gene to be positively selected for in the presence of the respective selection agent (selective cultivation conditions); a non-transformed host cell would not be capable of growing or surviving under the selective cultivation conditions. Selection markers can be positive, negative or bi-functional. Positive selection markers can allow selection for cells carrying the marker, whereas negative selection markers can allow cells carrying the marker to be selectively eliminated. A selection marker can confer resistance to a drug or compensate for a metabolic or catabolic defect in the host cell. In prokaryotic cells, amongst others, genes conferring resistance against ampicillin, tetracycline, kanamycin or chloramphenicol can be used. Resistance genes useful as selection markers in eukaryotic cells include, but are not limited to, genes for aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid. Further marker genes are described in WO 92/08796 and WO 94/28143.

Beyond facilitating a selection in the presence of a corresponding selection agent, a selection marker can alternatively be a molecule normally not present in the cell, e.g., green fluorescent protein (GFP), enhanced GFP (eGFP), synthetic GFP, yellow fluorescent protein (YFP), enhanced YFP (eYFP), cyan fluorescent protein (CFP), mPlum, mCherry, tdTomato, mStrawberry, J-red, DsRed-monomer, mOrange, mKO, mCitrine, Venus, YPet, Emerald, CyPet, mCFPm, Cerulean, and T-Sapphire. Cells expressing such a molecule can be distinguished from cells not harboring this gene, e.g., by the detection or absence, respectively, of the fluorescence emitted by the encoded polypeptide.

As used herein, the term "operably linked" refers to a juxtaposition of two or more components, wherein the components are in a relationship permitting them to function in their intended manner. For example, a promoter and/or an enhancer is operably linked to a coding sequence if the promoter and/or enhancer acts to modulate the transcription of the coding sequence. In certain embodiments, DNA sequences that are "operably linked" are contiguous and adjacent on a single chromosome. In certain embodiments, e.g., when it is necessary to join two protein encoding regions, such as a secretory leader and a polypeptide, the sequences are contiguous, adjacent, and in the same reading frame. In certain embodiments, an operably linked promoter is located upstream of the coding sequence and can be adjacent to it. In certain embodiments, e.g., with respect to enhancer sequences modulating the expression of a coding sequence, the two components can be operably linked although not adjacent. An enhancer is operably linked to a coding sequence if the enhancer increases transcription of the coding sequence. Operably linked enhancers can be located upstream, within, or downstream of coding sequences and can be located at a considerable distance from the promoter of the coding sequence. Operable linkage can be accomplished by recombinant methods known in the art, e.g., using PCR methodology and/or by ligation at convenient restriction sites. If convenient restriction sites do not exist, then synthetic oligonucleotide adaptors or linkers can be used in accord with conventional practice. An internal ribosomal entry site (IRES) is operably linked to an open reading frame (ORF) if it allows initiation of translation of the ORF at an internal location in a 5' end-independent manner.

The term "FcRn" denotes the neonatal Fc-receptor. FcRn functions to salvage IgG from the lysosomal degradation pathway, resulting in reduced clearance and long half-life. The FcRn is a heterodimeric protein consisting of two polypeptides: a class I major histocompatibility complex-like protein (α-FcRn) and a β2-microglobulin (β2m). FcRn binds with high affinity to the CH2-CH3 portion of the Fc-region of IgG. The interaction between IgG and FcRn is strictly pH dependent and occurs in a 1:2 stoichiometry, with one IgG binding to two FcRn molecules via its two heavy chains (Huber, A. H., et al., J. Mol. Biol. 230 (1993) 1077-1083). FcRn binding occurs in the endosome at acidic pH (pH<6.5) and IgG is released at the neutral cell surface (pH of about 7.4). The pH-sensitive nature of the interaction facilitates the FcRn-mediated protection of IgGs pinocytosed into cells from intracellular degradation by binding to the receptor within the acidic environment of endosomes. FcRn then facilitates the recycling of IgG to the cell surface and subsequent release into the blood stream upon exposure of the FcRn-IgG complex to the neutral pH environment outside the cell.

The term "FcRn binding portion of an Fc-region" denotes the part of an antibody heavy chain polypeptide that extends approximately from EU position 243 to EU position 261 and approximately from EU position 275 to EU position 293 and approximately from EU position 302 to EU position 319 and approximately from EU position 336 to EU position 348 and approximately from EU position 367 to EU position 393 and EU position 408 and approximately from EU position 424 to EU position 440. In one embodiment one or more of the following amino acid residues according to the EU numbering of Kabat are altered F243, P244, P245 P, K246, P247, K248, D249, T250, L251, M252, I253, S254, R255, T256, P257, E258, V259, T260, C261, F275, N276, W277, Y278, V279, D280, V282, E283, V284, H285, N286, A287, K288, T289, K290, P291, R292, E293, V302, V303, S304, V305, L306, T307, V308, L309, H310, Q311, D312, W313, L314, N315, G316, K317, E318, Y319, I336, S337, K338, A339, K340, G341, Q342, P343, R344, E345, P346, Q347, V348, C367, V369, F372, Y373, P374, S375, D376, I377, A378, V379, E380, W381, E382, S383, N384, G385, Q386, P387, E388, N389, Y391, T393, S408, S424, C425, S426, V427, M428, H429, E430, A431, L432, H433, N434, H435, Y436, T437, Q438, K439, and S440.

As used herein, the term "flanking" refers to that a first nucleotide sequence is located at either a 5'- or 3'-end, or both ends of a second nucleotide sequence. The flanking nucleotide sequence can be adjacent to or at a defined distance from the second nucleotide sequence. There is no specific limit of the length of a flanking nucleotide sequence. For example, a flanking sequence can be a few base pairs or a few thousand base pairs.

The term "positive linear pH gradient" denotes a pH gradient starting at a low (i.e. more acidic) pH value and ending at a higher (i.e. less acidic, neutral or alkaline) pH value. In one embodiment the positive linear pH gradient starts at a pH value of about 5.5 and ends at a pH value of about 8.8.

Deoxyribonucleic acids comprise a coding and a non-coding strand. The terms "5'" and "3'" when used herein refer to the position on the coding strand.

As used herein, the term "exogenous" indicates that a nucleotide sequence does not originate from a specific cell and is introduced into said cell by DNA delivery methods, e.g., by transfection, electroporation, or transformation methods. Thus, an exogenous nucleotide sequence is an artificial sequence wherein the artificiality can originate, e.g., from the combination of subsequences of different origin (e.g. a combination of a recombinase recognition sequence with an SV40 promoter and a coding sequence of green fluorescent protein is an artificial nucleic acid) or from the deletion of parts of a sequence (e.g. a sequence coding only the extracellular domain of a membrane-bound receptor or a cDNA) or the mutation of nucleobases. The term "endogenous" refers to a nucleotide sequence originating from a cell. An "exogenous" nucleotide sequence can have an "endogenous" counterpart that is identical in base compositions, but where the "exogenous" sequence is introduced into the cell, e.g., via recombinant DNA technology.

II. COMPOSITIONS AND METHODS

Generally, for the recombinant large scale production of a polypeptide of interest, such as e.g. a therapeutic polypeptide, a cell stably expressing and secreting said polypeptide is required. This cell is termed "recombinant cell" or "recombinant production cell" and the process used for generating such a cell is termed "cell line development". In the first step of the cell line development process a suitable host cell, such as e.g. a CHO cell, is transfected with a nucleic acid sequence suitable for expression of said polypeptide of interest. In a second step a cell stably expressing the polypeptide of interest is selected based on the co-expression of a selection marker, which had been co-transfected with the nucleic acid encoding the polypeptide of interest.

A nucleic acid encoding a polypeptide, i.e. the coding sequence, is called a structural gene. Such a structural gene is simple information and additional regulatory elements are required for expression thereof. Therefore, normally a structural gene is integrated in an expression cassette. The minimal regulatory elements needed for an expression cassette to be functional in a mammalian cell are a promoter functional in said mammalian cell, which is located upstream, i.e. 5', to the structural gene, and a polyadenylation signal sequence functional in said mammalian cell, which is located downstream, i.e. 3', to the structural gene. The promoter, the structural gene and the polyadenylation signal sequence are arranged in an operably linked form.

In case the polypeptide of interest is a heteromultimeric polypeptide that is composed of different (monomeric) polypeptides, not only a single expression cassette is required but a multitude of expression cassettes differing in the contained structural gene, i.e. at least one expression cassette for each of the different (monomeric) polypeptides of the heteromultimeric polypeptide. For example, a full length antibody is a heteromultimeric polypeptide comprising two copies of a light chain as well as two copies of a heavy chain. Thus, a full length antibody is composed of two different polypeptides. Therefore, two expression cassettes are required for the expression of a full length antibody, one for the light chain and one for the heavy chain. If, for example, the full length antibody is a bispecific antibody, i.e. the antibody comprises two different binding sites specifically binding to two different antigens, the light chains as well as the heavy chains are different from each other also. Thus, such a bispecific full length antibody is composed of four different polypeptides and four expression cassettes are required.

The expression cassette(s) for the polypeptide of interest is(are) in turn integrated into a so called "expression vector". An "expression vector" is a nucleic acid providing all required elements for the amplification of said vector in bacterial cells as well as the expression of the comprised structural gene(s) in a mammalian cell. Typically, an expression vector comprises a prokaryotic plasmid propagation unit, e.g. for $E.\ coli$, comprising an origin of replication, and a prokaryotic selection marker, as well as an eukaryotic selection marker, and the expression cassettes required for the expression of the structural gene(s) of interest. An "expression vector" is a transport vehicle for the introduction of expression cassettes into a mammalian cell.

As outlined in the previous paragraphs, the more complex the polypeptide to be expressed is the higher also the number of required different expression cassettes is. Inherently with the number of expression cassettes also the size of the nucleic acid to be integrated into the genome of the host cell increases. Concomitantly also the size of the expression vector increases. But there is a practical upper limit to the size of a vector in the range of about 15 kbps above which handling and processing efficiency profoundly drops. This issue can be addressed by using two or more expression vectors. Thereby the expression cassettes can be split between different expression vectors each comprising only some of the expression cassettes.

Conventional cell line development (CLD) relies on the random integration (RI) of the vectors carrying the expression cassettes for the polypeptide of interest (SOI). In general, several vectors or fragments thereof integrate into the cell's genome if vectors are transfected by a random approach. Therefore, transfection processes based on RI are non-predictable.

Thus, by addressing the size problem with splitting expression cassettes between different expression vectors a new problem arises—the random number of integrated expression cassettes and the spatial distribution thereof.

Generally, the more expression cassettes for expression of a structural gene are integrated into the genome of a cell the higher the amount of the respective expressed polypeptide becomes. Beside the number of integrated expression cassettes also the site and the locus of the integration influences the expression yield. If, for example, an expression cassette is integrated at a site with low transcriptional activity in the cell's genome only a small amount of the encoded polypeptide is expressed. But, if the same expression cassette is integrated at a site in the cell's genome with high transcriptional activity a high amount of the encoded polypeptide is expressed.

This difference in expression is not causing problems as long as the expression cassettes for the different polypeptides of a heteromultimeric polypeptide are all integrated at the same frequency and at loci with comparable transcriptional activity. Under such circumstances all polypeptides of the multimeric polypeptide are expressed at the same amount and the multimeric polypeptide will be assembled correctly.

But this scenario is very unlikely and cannot be assured for molecules composed of more than two polypeptides. For example, in WO 2018/162517 it has been disclosed that depending i) on the expression cassette sequence and ii) on the distribution of the expression cassettes between the different expression vectors a high variation in expression yield and product quality was observed using RI. Without being bound by this theory, this observation is due to the fact that the different expression cassettes from the different expression vectors integrate with differing frequency and at different loci in the cell resulting in differential expression of the different polypeptides of the heteromultimeric polypeptide, i.e. at non-appropriate, different ratios. Thereby, some of the monomeric polypeptides are present at higher amount and others at a lower amount. This disproportion between the monomers of the heteromultimeric polypeptide causes non-complete assembly, mis-assembly as well as slow-down of the secretion rate. All of the before will result in lower expression yield of the correctly folded heteromultimeric polypeptide and a higher fraction of product-related by-products.

Unlike conventional RI CLD, targeted integration (TI) CLD introduces the transgene comprising the different expression cassettes at a predetermined "hot-spot" in the cell's genome. Also the introduction is with a defined ratio of the expression cassettes. Thereby, without being bound by this theory, all the different polypeptides of the heteromultimeric polypeptide are expressed at the same (or at least a comparable and only slightly differing) rate and at an appropriate ratio. Thereby the amount of correctly assembled heteromultimeric polypeptide should be increased and the fraction of product-related by-product should be reduced.

Also, given the defined copy number and the defined integration site, recombinant cells obtained by TI should have better stability compared to cells obtained by RI. Moreover, since the selection marker is only used for selecting cells with proper TI and not for selecting cells with a high level of transgene expression, a less mutagenic marker may be applied to minimize the chance of sequence variants (SVs), which is in part due to the mutagenicity of the selective agents like methotrexate (MTX) or methionine sulfoximine (MSX).

But it has now been found that the sequence of the expression cassettes, i.e. the expression cassette organization, in the transgene used in TI has a profound impact on FcRn expression.

The current invention uses a specific expression cassette organization with a defined number and sequence of the individual expression cassettes. This results in high expression yield and good product quality of the FcRn expressed in a mammalian cell.

For the defined integration of the transgene with the expression cassette sequence according to the current invention TI methodology is used. The current invention provides a novel method of generating FcRn expressing recombinant mammalian cells using a two-plasmid recombinase mediated cassette exchange (RMCE) reaction. The improvement lies, amongst other things, in the defined integration at the same locus in a defined sequence and thereby a high expression of FcRn and reduced product-related by-product formation.

The presently disclosed subject matter not only provides methods for producing recombinant mammalian cells for stable large scale production of FcRn but also for recombinant mammalian cells that have high productivity of FcRn with advantageous by-product profile.

The two-plasmid RMCE strategy used herein allows for the insertion of multiple expression cassettes in the same TI locus.

II.a the Transgene and the Method According to the Invention

Herein is reported a recombinant mammalian cell expressing neonatal Fc receptor (FcRn). FcRn is a heteromultimeric polypeptide not naturally expressed by said mammalian cell. More specifically, FcRn is a heterodimeric protein consisting of two polypeptides: a class I major histocompatibility complex-like protein ($\alpha$-FcRn) and $\beta$2-microglobulin ($\beta$2m). To achieve expression of FcRn a recombinant nucleic acid comprising multiple different expression cassettes in a specific and defined sequence has been integrated into the genome of a mammalian cell.

Herein is also reported a method for generating a recombinant mammalian cell expressing FcRn and a method for producing FcRn using said recombinant mammalian cell.

The current invention is based, at least in part, on the finding that the sequence of the different expression cassettes required for the expression of the heterodimeric FcRn, i.e. the expression cassette organization, as integrated into the genome of a mammalian cell influences the expression yield of FcRn.

The current invention is based, at least in part, on the finding that double recombinase mediated cassette exchange (RMCE) can be used for producing a recombinant mammalian cell, such as a recombinant CHO cell, in which a defined and specific expression cassette sequence has been integrated into the genome, which in turn results in the efficient expression and production of FcRn. The integration is effected at a specific site in the genome of the mammalian cell by targeted integration. Thereby it is possible to control the expression ratio of the different polypeptides of the heteromultimeric FcRn relative to each other. Thereby in turn an efficient expression, correct assembly and successful secretion in high expression yield of correctly folded and assembled FcRn is achieved.

As FcRn is a heterodimer at least two expression cassettes are required for the expression thereof: a first for the expression of the class I major histocompatibility complex-like protein ($\alpha$-FcRn) and a second for the expression of $\beta$2-microglobulin ($\beta$2m). Additionally, a third expression cassette for a positive selection marker can be included.

Even with this simple heterodimeric molecule consisting only of two different polypeptides different expression cassette organizations can be realized. Some examples thereof are given below (in 5'-to-3' direction):
α-FcRn-β2m
α-FcRn-β2m-α-FcRn
α-FcRn-β2m-β2m
α-FcRn-β2m-α-FcRn-β2m
etc.

At first it had been tested if the presence of additional expression cassettes for the monomers has an impact on expression yield. Therefore, transient screening expressions have been done. It is known from the art that such a transient screening can be done, e.g. in HEK cells, to upfront elucidate the ranking of stable cell lines. This is advantageous as the transient approach is less time consuming (see e.g. Diepenbruck, C., et al. Mol. Biotechnol. 54 (2013) 497-503).

The expression cassette organizations used in the transient screening for expression of human FcRn were (given in 5'-to-3' direction, the selection marker is not shown but was always located after the second expression cassette):
α-FcRn-β2m
α-FcRn-β2m-β2m
α-FcRn-β2m-α-FcRn-β2m It has been found that the presence of two copies of both expression cassettes doubled the yield as expected (20 mg/mL vs. 40 mg/mL after NiNTA and SEC purification). Unexpectedly the addition of a second expression cassette for the β2m only resulted in an expression yield of more than double of that of the four expression cassette organization (90 mg/mL vs. 40 mg/mL after NiNTA and SEC purification). The results are summarized in the following Table 1.

Magistrelli et al. (J. Immunol. Meth. 375 (2012) 20-29) reported a method for producing biotinylated FcRn using PEAK cells stably expressing EBNA-1 and transiently transfected with a dual promoter vector for FcRnα and β2m co-expression (i) the biotin ligase enzyme (LsBirA) and (ii) the enhanced green fluorescent protein (EGFP) as a reporter gene. After Ni-NTA purification and immobilization they obtained only 4 mg/L and 1.2 mg/L, respectively, per liter of cell culture supernatant for hFcRn and mFcRn.

TABLE 1

Results of transient expression in HEK293 cells. The expression cassette organization is given in 5'-to-3' direction, the selection marker expression cassette is not shown for reduced complexity but was always located after the second expression cassette;

| expression cassette organization | ratio α-FcRn | ratio β2m | titer batch [µg/mL] medium [L] | after NiNTA | after SEC |
|---|---|---|---|---|---|
| α-FcRn-β2m | 1 | 1 | 1 | n.d. | 20 |
| α-FcRn-β2m-β2m | 1 | 2 | 1 | 188 | 90 |
| α-FcRn-β2m-α-FcRn-β2m | 2 | 2 | 1 | 88 | 40 |
| α-FcRn-β2m | 1 | 1 | 3-5 mL* | n.d. | 1.2-4** | n. d. = not determined.
*working volume of 6-well microtiter plate
**after Ni-NTA and affinity absorption The expression cassette organization determined to be best in transient expression was used for the generation by TI of stable recombinant CHO cells expressing human, cynomolgus and murine FcRn. The four expression cassette organization resulting in second best expression yield in transient expression was also used. The results are presented in the following Table 2.

TABLE 2

Results of stable expression in CHO-K1 cells. The expression cassette organization is given in 5'-to-3' direction, the selection marker is not shown for reduced complexity but was always located after the second expression cassette;

| expression cassette organization | species | ratio α-FcRn | ratio β2m | titer batch [µg/mL] medium [L] | after NiNTA | after SEC |
|---|---|---|---|---|---|---|
| α-FcRn-β2m-β2m | hu | 1 | 2 | 1 | 1140 | 900 |
| α-FcRn-β2m-α-FcRn-β2m | hu | 2 | 2 | 1 | 1240 | 1300 |
| α-FcRn-β2m-β2m | cy | 1 | 2 | 1 | 1020 | 800 |
| α-FcRn-β2m-α-FcRn-β2m | cy | 2 | 2 | 1 | 725 | 590 |
| α-FcRn-β2m-β2m | mu | 1 | 2 | 1 | 1660 | 1240 |
| α-FcRn-β2m-α-FcRn-β2m | mu | 2 | 2 | 1 | 1046 | 880 | hu = human;
cy = cynomolgus;
mu = murine.

It can be seen that for the stable expression of murine and cynomolgus FcRn the same expression cassette organization as in the transient expression provided for the best yield.

For the stable expression of human FcRn unexpectedly the four expression cassette organization resulted in better yield despite the lower yield in transient expression.

Thus, for the recombinant production of human FcRn and murine/cynomolgus FcRn, respectively, i.e. FcRn differencing in the species, different expression cassette organizations are resulting in the best expression yield.

One application of the FcRn produced with the recombinant cell according to the current invention is as affinity chromatography ligand. It is known from the art that a stable FcRn affinity chromatography column can be obtained by immobilizing mono-biotinylated FcRn on an avidin or streptavidin derivatized matrix (see, e.g., WO2013/120929).

Thus, for such a use the FcRn produced with a recombinant cell according to the current invention or in a method according to the current invention has to be mono-biotinylated. Such mono-biotinylation can be achieved either by an in vitro method after the expression and isolation of non-biotinylated FcRn or in vivo directly in the cultivation of the recombinant cell expressing FcRn.

Both methods are applicable.

For both approaches the α-FcRn is modified by extending its amino acid sequence at the C-terminus with an Avi-tag recognized by E. coli biotin ligase BirA.

In the in vitro approach the FcRn comprising said Avi-tag is incubated with BirA in the presence of biotin. This results in the attachment of biotin to the α-FcRn at the site of the Avi-tag. The results obtained with the in vitro biotinylation are shown in the following Table 3.

TABLE 3

Results of the in vitro biotinylation of FcRn produced by stable expression in CHO-K1 cells. The expression cassette organization is given in 5'-to-3' direction, the selection marker is not shown for reduced complexity but was always located after the second expression cassette;

| expression cassette organization | species | titer batch [µg/mL] after SEC | biotinylation level [%] |
|---|---|---|---|
| α-FcRn-β2m-β2m | hu | 900 | 69.5 |
| α-FcRn-β2m-α-FcRn-β2m | hu | 1300 | 85.5 |
| α-FcRn-β2m-β2m | cy | 800 | 76.6 |
| α-FcRn-β2m-α-FcRn-β2m | cy | 590 | 76.5 |
| α-FcRn-β2m-β2m | mu | 1240 | 85.6 |
| α-FcRn-β2m-α-FcRn-β2m | mu | 880 | 89.5 | hu = human;
cy = cynomolgus;
mu = murine.

For the in vivo approach the BirA is expressed in the same recombinant cell. Thus, in this case a further expression cassette for the expression of the BirA is required and has to be integrated into the transgene introduced by targeted integration.

Like in the organization for the FcRn expression cassettes the BirA expression cassette can be placed at different positions. The respective results are shown in Table 4 below.

Unexpectedly the location of the BirA expression cassette as the final most 3'-terminal expression cassette in the transgene resulted in highest effective titers. Also unexpectedly a single BirA expression cassette results in higher effective titer than two BirA expression cassettes. This is independent of the species of the FcRn.

The current invention is summarized below.

1. Human FcRn

One aspect according to the current invention is a method for producing human FcRn comprising the steps of
a) cultivating a mammalian cell comprising a deoxyribonucleic acid encoding human FcRn, and
b) recovering human FcRn from the cell or the cultivation medium,
wherein the deoxyribonucleic acid encoding human FcRn is stably integrated into the genome of the mammalian cell and comprises in 5'- to 3'-direction
a first expression cassette encoding human class I major histocompatibility complex-like protein (α-FcRn),
a second expression cassette encoding human β2-microglobulin (β2m),
a third expression cassette encoding human class I major histocompatibility complex-like protein (α-FcRn), and
a fourth expression cassette encoding human β2-microglobulin (β2m).

In one embodiment the deoxyribonucleic acid is stably integrated into the genome of the mammalian cell at a single site or locus.

In one embodiment the human class I major histocompatibility complex-like protein (α-FcRn) is the extracellular domain thereof.

In one embodiment the human class I major histocompatibility complex-like protein (α-FcRn) further comprises a His-tag, an Avi-tag, or a HisAvi-tag at the C-terminus.

One aspect according to the current invention is a method for producing C-terminally biotinylated human FcRn comprising the steps of
a) cultivating a mammalian cell comprising a deoxyribonucleic acid encoding human FcRn and biotin-[acetyl-CoA-carboxylase] ligase (BirA) in a biotin containing medium, and

TABLE 4

Results of the in vivo biotinylation of FcRn produced by stable co-expression with BirA in CHO-K1 cells. The expression cassette organization is given in 5'-to-3' direction, the selection marker is not shown for reduced complexity but was located either after the second expression cassette if the BirA was the most 3' located expression cassette or after the BirA expression cassette if an BirA expression cassette was located as third expression cassette;

| expression cassette organization | species | ratio α-FcRn | ratio β2m | ratio BirA | titer batch [µg/mL] after SEC | biotinylation level [%] | effective titer [µg*%/mL] |
|---|---|---|---|---|---|---|---|
| α-FcRn-β2m-BirA-β2m | hu | 1 | 2 | 1 | 410 | 68.8 | 282.1 |
| α-FcRn-β2m-α-FcRn-β2m-BirA | hu | 2 | 2 | 1 | 810 | 50.2 | 406.6 |
| α-FcRn-β2m-BirA-α-FcRn-β2m-BirA | hu | 2 | 2 | 2 | 460 | 74.7 | 343.6 |
| α-FcRn-β2m-BirA-β2m | cy | 1 | 2 | 1 | 320 | 85.3 | 273 |
| α-FcRn-β2m-α-FcRn-β2m-BirA | cy | 2 | 2 | 1 | 630 | 51 | 321.3 |
| α-FcRn-β2m-BirA-α-FcRn-β2m-BirA | cy | 2 | 2 | 2 | 260 | 72.6 | 188.8 |
| α-FcRn-β2m-BirA-β2m | mu | 1 | 2 | 1 | 830 | 73.2 | 607.6 |
| α-FcRn-β2m-α-FcRn-β2m-BirA | mu | 2 | 2 | 1 | 970 | 72.5 | 703.3 |
| α-FcRn-β2m-BirA-α-FcRn-β2m-BirA | mu | 2 | 2 | 2 | 790 | 83.2 | 657.3 | hu = human;
cy = cynomolgus;
mu = murine;
BirA = E.coli biotin ligase.

b) recovering C-terminally biotinylated human FcRn from the cell or the cultivation medium, wherein the deoxyribonucleic acid encoding human FcRn and BirA is stably integrated into the genome of the mammalian cell and comprises in 5'- to 3'-direction a first expression cassette encoding human class I major histocompatibility complex-like protein (α-FcRn) comprising an Avi-tag at the C-terminus, a second expression cassette encoding human β2-microglobulin (β2m), a third expression cassette encoding human class I major histocompatibility complex-like protein (α-FcRn) comprising an Avi-tag at the C-terminus, a fourth expression cassette encoding human β2-microglobulin (β2m), and a fifth expression cassette encoding biotin-[acetyl-CoA-carboxylase] ligase.

In one embodiment the deoxyribonucleic acid is stably integrated into the genome of the mammalian cell at a single site or locus.

In one embodiment the human class I major histocompatibility complex-like protein (α-FcRn) is the extracellular domain thereof.

In one embodiment the BirA is from E. coli.

One aspect of the current invention is a deoxyribonucleic acid encoding human FcRn comprising in 5'- to 3'-direction a first expression cassette encoding human class I major histocompatibility complex-like protein (α-FcRn), a second expression cassette encoding human β2-microglobulin (β2m), a third expression cassette encoding human class I major histocompatibility complex-like protein (α-FcRn), and a fourth expression cassette encoding human β2-microglobulin (β2m).

In one embodiment the human class I major histocompatibility complex-like protein (α-FcRn) further comprises an Avi-tag, or a His-tag, or an HisAvi-tag at the C-terminus.

In one embodiment the deoxyribonucleic acid encoding human FcRn further comprises a fifth expression cassette encoding biotin-[acetyl-CoA-carboxylase] ligase.

In one embodiment the BirA is from E. coli.

One aspect of the current invention is the use of a deoxyribonucleic acid comprising in 5'- to 3'-direction a first expression cassette encoding human class I major histocompatibility complex-like protein (α-FcRn), a second expression cassette encoding human β2-microglobulin (β2m), a third expression cassette encoding human class I major histocompatibility complex-like protein (α-FcRn), and a fourth expression cassette encoding human β2-microglobulin (β2m), for the expression of human FcRn in a mammalian cell.

In one embodiment of the use the deoxyribonucleic acid is integrated into the genome of the mammalian cell.

In one embodiment of the use the deoxyribonucleic acid is stably integrated into the genome of the mammalian cell at a single site or locus.

In one embodiment the human class I major histocompatibility complex-like protein (α-FcRn) further comprises an Avi-tag, a His-tag, or an HisAvi-tag at the C-terminus.

In one embodiment the human class I major histocompatibility complex-like protein (α-FcRn) is the extracellular domain thereof.

In one embodiment the use is for the expression of C-terminally biotinylated human FcRn and the deoxyribonucleic acid encoding human FcRn further comprises a fifth expression cassette encoding biotin-[acetyl-CoA-carboxylase] ligase (BirA) after the fourth expression cassette and the human class I major histocompatibility complex-like protein (α-FcRn) further comprises an Avi-tag at the C-terminus.

In one embodiment the BirA is from E. coli.

One aspect of the invention is a recombinant mammalian cell comprising a deoxyribonucleic acid encoding human FcRn integrated in the genome of the cell, wherein the deoxyribonucleic acid encoding human FcRn comprises in 5'- to 3'-direction a first expression cassette encoding human class I major histocompatibility complex-like protein (α-FcRn), a second expression cassette encoding human β2-microglobulin (β2m), a third expression cassette encoding human class I major histocompatibility complex-like protein (α-FcRn), and a fourth expression cassette encoding human β2-microglobulin (β2m).

In one embodiment the deoxyribonucleic acid is stably integrated into the genome of the mammalian cell at a single site or locus.

In one embodiment the human class I major histocompatibility complex-like protein (α-FcRn) further comprises an Avi-tag, a His-tag or an HisAvi-tag at the C-terminus.

In one embodiment the human class I major histocompatibility complex-like protein (α-FcRn) is the extracellular domain thereof.

In one embodiment the deoxyribonucleic acid encoding human FcRn further comprises a fifth expression cassette encoding biotin-[acetyl-CoA-carboxylase] ligase (BirA) after the fourth expression cassette and the human class I major histocompatibility complex-like protein (α-FcRn) further comprises an Avi-tag at the C-terminus.

In one embodiment the BirA is from E. coli.

In one embodiment of all previous aspects the deoxyribonucleic acid encoding human FcRn further comprises a first recombination recognition sequence located 5' to the first (most 5') expression cassette, a second recombination recognition sequence located 3' to the fourth or, if present, to the fifth (most 3') expression cassette, and a third recombination recognition sequence located
between the first and the second recombination recognition sequence, and
between two of the expression cassettes,
and
wherein all recombination recognition sequences are different.

In one embodiment the third recombination recognition sequence is located between the second and the third expression cassette.

One aspect of the current invention is a composition comprising two deoxyribonucleic acids, which comprise in turn three different recombination recognition sequences and four expression cassettes, wherein the first deoxyribonucleic acid comprises in 5'- to 3'-direction, a first recombinase recognition sequence, a first expression cassette encoding human class I major histocompatibility complex-like protein (α-FcRn), a second expression cassette encoding human β2-microglobulin (β2m), and a first copy of a third recombination recognition sequence, and
the second deoxyribonucleic acid comprises in 5'- to 3'-direction
a second copy of the third recombination recognition sequence,
a third expression cassette encoding human class I major histocompatibility complex-like protein (α-FcRn), and
a fourth expression cassette encoding human β2-microglobulin (β2m), and
a second recombination recognition sequence.

In one embodiment the human class I major histocompatibility complex-like protein (α-FcRn) further comprises an Avi-tag, a His-tag or an HisAvi-tag at the C-terminus.

In one embodiment the human class I major histocompatibility complex-like protein (α-FcRn) is the extracellular domain thereof.

In one embodiment the second deoxyribonucleic acid further comprises a fifth expression cassette encoding biotin-[acetyl-CoA-carboxylase] ligase (BirA) located after the fourth expression cassette and before the second recombinase recognition sequence and the human class I major histocompatibility complex-like protein (α-FcRn) further comprises an Avi-tag at the C-terminus.

In one embodiment the BirA is from *E. coli*.

In one embodiment of all previous aspects the deoxyribonucleic acid encoding human FcRn comprises a further expression cassette encoding for a selection marker.

In one embodiment the expression cassette encoding for a selection marker is located either
  i) 5', or
  ii) 3', or
  iii) partly 5' and partly 3'
to the third recombination recognition sequence.

In one embodiment the expression cassette encoding for a selection marker is located partly 5' and partly 3' to the third recombination recognition sequences, wherein the 5'-located part of said expression cassette comprises the promoter and a start-codon and the 3'-located part of said expression cassette comprises the coding sequence without a start-codon and a polyA signal.

In one embodiment the 5'-located part of the expression cassette encoding the selection marker comprises a promoter sequence operably linked to a start-codon, whereby the promoter sequence is flanked upstream by (i.e. is positioned downstream to) the second expression cassette and the start-codon is flanked downstream by (i.e. is positioned upstream of) the third recombination recognition sequence; and the 3'-located part of the expression cassette encoding the selection marker comprises a nucleic acid encoding the selection marker lacking a start-codon operably linked to a polyadenylation sequence and is flanked upstream by the third recombination recognition sequence and downstream by the third expression cassette.

In one embodiment the start-codon is a transcription start-codon. In one embodiment the start-codon is ATG.

One aspect of the invention is a recombinant mammalian cell comprising a deoxyribonucleic acid encoding human FcRn integrated in the genome of the cell,
  wherein the deoxyribonucleic acid encoding human FcRn comprises the following elements:
    a first, a second and a third recombination recognition sequence,
    a first and a second selection marker, and
    a first to fourth expression cassette,
      wherein the sequences of said elements in 5'-to-3' direction is RRS1-1$^{st}$ EC-2$^{nd}$ EC-RRS3-SM1-3$^{rd}$ EC-4$^{th}$ EC-RRS2-SM2
with
  RRS=recombination recognition sequence,
  EC=expression cassette,
  SM=selection marker.

One aspect of the current invention is a method for producing a recombinant mammalian cell comprising a deoxyribonucleic acid encoding human FcRn and secreting human FcRn comprising the following steps:
  a) providing a mammalian cell comprising an exogenous nucleotide sequence integrated at a single site within a locus of the genome of the mammalian cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;
  b) introducing into the cell provided in a) a composition of two deoxyribonucleic acids comprising three different recombination recognition sequences and five expression cassettes, wherein
    the first deoxyribonucleic acid comprises in 5'- to 3'-direction,
      a first recombinase recognition sequence,
      a first expression cassette encoding human class I major histocompatibility complex-like protein (α-FcRn),
      a second expression cassette encoding human β2-microglobulin (β2m),
      a 5'-terminal part of an expression cassette encoding one second selection marker, and
      a first copy of a third recombination recognition sequence,
    and
    the second deoxyribonucleic acid comprises in 5'- to 3'-direction
      a second copy of the third recombination recognition sequence,
      a 3'-terminal part of an expression cassette encoding the one second selection marker,
      a third expression cassette encoding human class I major histocompatibility complex-like protein (α-FcRn), and
      a fourth expression cassette encoding human β2-microglobulin (β2m), and
      a second recombination recognition sequence,
    wherein the first to third recombination recognition sequences of the first and second deoxyribonucleic acid are matching the first to third recombination recognition sequence on the integrated exogenous nucleotide sequence,
    wherein the 5'-terminal part and the 3'-terminal part of the expression cassette encoding the one second selection marker when taken together form a functional expression cassette of the one second selection marker;
  c) introducing
    i) either simultaneously with the first and second deoxyribonucleic acid of b); or
    ii) sequentially thereafter
    one or more recombinases,
    wherein the one or more recombinases recognize the recombination recognition sequences of the first and the second deoxyribonucleic acid and the exogenous nucleotide sequence; (and optionally wherein the one or more recombinases perform two recombinase mediated cassette exchanges;) and d) selecting a cell expressing the second selection marker and secreting human FcRn, thereby producing a recombinant mammalian cell comprising a deoxyribonucleic acid encoding human FcRn and secreting human FcRn.

In one embodiment the human class I major histocompatibility complex-like protein (α-FcRn) further comprises an Avi-tag, a His-tag or an HisAvi-tag at the C-terminus.

In one embodiment the method is for producing a recombinant mammalian cell comprising a deoxyribonucleic acid encoding human FcRn and secreting C-terminally biotinylated human FcRn, wherein the two deoxyribonucleic acids comprise three different recombination recognition sequences and six expression cassettes and the second deoxyribonucleic acid further comprises a fifth expression cassette encoding *E. coli* biotin-[acetyl-CoA-carboxylase] ligase located after the fourth expression cassette and before the second recombinase recognition sequence and the human class I major histocompatibility complex-like protein (α-FcRn) further comprises an Avi-tag at the C-terminus.

In one embodiment the expression cassette encoding the one second selection marker is located partly 5' and partly 3' to the third recombination recognition sequences, wherein the 5'-located part of said expression cassette comprises the promoter and the start-codon and said 3'-located part of the expression cassette comprises the coding sequence of the one second selection marker without a start-codon and a polyadenylation signal sequence.

In one embodiment the 5'-terminal part of the expression cassette encoding the one second selection marker comprises a promoter sequence operably linked to the start-codon, whereby the promoter sequence is flanked upstream by (i.e. is positioned downstream to) the second expression cassette and the start-codon is flanked downstream by (i.e. is positioned upstream of) the third recombination recognition sequence; and the 3'-terminal part of the expression cassette encoding the one second selection marker comprises the coding sequence of the one second selection marker lacking a start-codon operably linked to a polyadenylation signal sequence and is flanked upstream by the third recombination recognition sequence and downstream by the third expression cassette.

In one embodiment the start-codon is a transcription start-codon. In one embodiment the start-codon is ATG.

In one embodiment the human class I major histocompatibility complex-like protein (α-FcRn) is the extracellular domain thereof.

In one embodiment of all previous aspects and embodiments the first deoxyribonucleic acid is integrated into a first vector and the second deoxyribonucleic acid is integrated into a second vector.

In one embodiment of all previous aspects and embodiments each of the expression cassettes comprises in 5'-to-3' direction a promoter, a coding sequence and a polyadenylation signal sequence optionally followed by a terminator sequence, which are all operably linked to each other.

In one embodiment
i) the first expression cassette comprises in 5'-to-3' direction a promoter, a nucleic acid encoding human class I major histocompatibility complex-like protein (α-FcRn), and a polyadenylation signal sequence and optionally a terminator sequence, and/or ii) the second expression cassette comprises in 5'-to-3' direction a promoter, a nucleic acid encoding human β2-microglobulin (β2m), and a polyadenylation signal sequence and optionally a terminator sequence, and/or iii) the third expression cassette comprises in 5'-to-3' direction a promoter, a nucleic acid encoding human class I major histocompatibility complex-like protein (α-FcRn), and a polyadenylation signal sequence and optionally a terminator sequence, and/or iv) the fourth expression cassette comprises in 5'-to-3' direction a promoter, a nucleic acid encoding human β2-microglobulin (β2m), and a polyadenylation signal sequence and optionally a terminator sequence, and/or v) the expression cassette encoding the selection marker comprises in 5'-to-3' direction a promoter, a nucleic acid encoding puromycin N-acetyl-transferase, and a polyadenylation signal sequence and optionally a terminator sequence.

In one embodiment the fifth expression cassette comprises in 5'-to-3' direction a promoter, a nucleic acid encoding *E. coli* biotin-[acetyl-CoA-carboxylase] ligase, and a polyadenylation signal sequence and optionally a terminator sequence.

In one embodiment of all previous aspects and embodiments the promoter is the human CMV promoter with intron A, the polyadenylation signal sequence is the bGH polyA site and the terminator sequence is the hGT terminator.

In one embodiment of all previous aspects and embodiments the promoter is the human CMV promoter with intron A, the polyadenylation signal sequence is the bGH polyA site and the terminator sequence is the hGT terminator except for the expression cassette(s) of the selection marker (s), wherein the promoter is the SV40 promoter and the polyadenylation signal sequence is the SV40 polyA site and a terminator sequence is absent.

In one embodiment of all previous aspects and embodiments the human FcRn is a non-covalent complex of the human class I major histocompatibility complex-like protein (α-FcRn) and the human beta-2-microglobulin (b2m).

In one embodiment of all previous aspects and embodiments the human FcRn is mono-biotinylated.

In one embodiment of all previous aspects and embodiments the mammalian cell is a CHO cell. In one embodiment the CHO cell is a CHO-K1 cell.

In one embodiment of all previous aspects and embodiments the human class I major histocompatibility complex-like protein (α-FcRn) is the extracellular domain thereof. In one embodiment the human class I major histocompatibility complex-like protein (α-FcRn) has the amino acid sequence of SEQ ID NO: 03. In one embodiment the human class I major histocompatibility complex-like protein (α-FcRn) has the amino acid sequence of SEQ ID NO: 04.

In one embodiment of all previous aspects and embodiments the recombinase recognition sequences are L3, 2 L and LoxFas. In one embodiment L3 has the sequence of SEQ ID NO: 22, 2 L has the sequence of SEQ ID NO: 23 and LoxFas has the sequence of SEQ ID NO: 24. In one embodiment the first recombinase recognition sequence is L3, the second recombinase recognition sequence is 2L and the third recombinase recognition sequence is LoxFas.

In one embodiment of all previous aspects and embodiments the human β2-microglobulin (β2m) has the amino acid sequence of SEQ ID NO: 07.

In one embodiment of all previous aspects and embodiments the *E. coli* biotin-[acetyl-CoA-carboxylase] ligase has the amino acid sequence of SEQ ID NO: 21.

In one embodiment of all previous aspects and embodiments the human CMV promoter has the sequence of SEQ ID NO: 25. In one embodiment the human CMV promoter has the sequence of SEQ ID NO: 27.

In one embodiment of all previous aspects and embodiments the bGH polyadenylation signal sequence is SEQ ID NO: 29.

In one embodiment of all previous aspects and embodiments the hGT terminator has the sequence of SEQ ID NO: 30.

In one embodiment of all previous aspects and embodiments the SV40 promoter has the sequence of SEQ ID NO: 31.

In one embodiment of all previous aspects and embodiments the SV40 polyadenylation signal sequence is SEQ ID NO: 28.

2. Non-Human FcRn

One aspect according to the current invention is a method for producing non-human FcRn comprising the steps of
 a) cultivating a mammalian cell comprising a deoxyribonucleic acid encoding non-human FcRn, and
 b) recovering non-human FcRn from the cell or the cultivation medium,
 wherein the deoxyribonucleic acid encoding non-human FcRn is stably integrated into the genome of the mammalian cell and comprises in 5'- to 3'-direction
  a first expression cassette encoding non-human class I major histocompatibility complex-like protein (α-FcRn),
  a second expression cassette encoding non-human β2-microglobulin (β2m), and
  a third expression cassette encoding non-human β2-microglobulin (β2m).

In one embodiment the deoxyribonucleic acid is stably integrated into the genome of the mammalian cell at a single site or locus.

In one embodiment the non-human class I major histocompatibility complex-like protein (α-FcRn) is the extracellular domain thereof.

In one embodiment the non-human class I major histocompatibility complex-like protein (α-FcRn) further comprises an Avi-tag, a His-tag or an HisAvi-tag at the C-terminus.

One aspect according to the current invention is a method for recombinantly producing C-terminally biotinylated non-human FcRn comprising the steps of
 a) cultivating a mammalian cell comprising a deoxyribonucleic acid encoding non-human FcRn and biotin-[acetyl-CoA-carboxylase] ligase (BirA) in a biotin containing medium, and
 b) recovering C-terminally biotinylated non-human FcRn from the cell or the cultivation medium,
 wherein the deoxyribonucleic acid encoding non-human FcRn and BirA is stably integrated into the genome of the mammalian cell and comprises in 5'- to 3'-direction
  a first expression cassette encoding non-human class I major histocompatibility complex-like protein (α-FcRn) comprising an Avi-tag at the C-terminus,
  a second expression cassette encoding non-human β2-microglobulin (β2m),
  a third expression cassette encoding non-human class I major histocompatibility complex-like protein (α-FcRn) comprising an Avi-tag at the C-terminus,
  a fourth expression cassette encoding non-human β2-microglobulin (β2m), and
  a fifth expression cassette encoding biotin-[acetyl-CoA-carboxylase] ligase.

In one embodiment the deoxyribonucleic acid is stably integrated into the genome of the mammalian cell at a single site or locus.

In one embodiment the non-human class I major histocompatibility complex-like protein (α-FcRn) is the extracellular domain thereof.

One aspect of the current invention is a deoxyribonucleic acid encoding non-human FcRn comprising in 5'- to 3'-direction
 a first expression cassette encoding non-human class I major histocompatibility complex-like protein (α-FcRn),
 a second expression cassette encoding non-human β2-microglobulin (β2m), and
 a third expression cassette encoding non-human β2-microglobulin (β2m).

In one embodiment the non-human class I major histocompatibility complex-like protein (α-FcRn) further comprises an Avi-tag, a His-tag or an HisAvi-tag at the C-terminus.

In one embodiment the deoxyribonucleic acid encoding non-human FcRn comprises in 5'- to 3'-direction
 a first expression cassette encoding non-human class I major histocompatibility complex-like protein (α-FcRn) comprising an Avi-tag at the C-terminus,
 a second expression cassette encoding non-human β2-microglobulin (β2m),
 a third expression cassette encoding non-human class I major histocompatibility complex-like protein (α-FcRn) comprising an Avi-tag at the C-terminus,
 a fourth expression cassette encoding non-human β2-microglobulin (β2m), and
 a fifth expression cassette encoding biotin-[acetyl-CoA-carboxylase] ligase.

In one embodiment the non-human class I major histocompatibility complex-like protein (α-FcRn) is the extracellular domain thereof.

One aspect of the current invention is the use of a deoxyribonucleic acid comprising in 5'- to 3'-direction
 a first expression cassette encoding non-human class I major histocompatibility complex-like protein (α-FcRn),
 a second expression cassette encoding non-human β2-microglobulin (β2m), and
 a third expression cassette encoding non-human β2-microglobulin (β2m), for the expression of non-human FcRn in a mammalian cell.

In one embodiment of the use the deoxyribonucleic acid is integrated into the genome of the mammalian cell.

In one embodiment of the use the deoxyribonucleic acid is stably integrated into the genome of the mammalian cell at a single site or locus.

In one embodiment the non-human class I major histocompatibility complex-like protein (α-FcRn) further comprises an Avi-tag, a His-tag or an HisAvi-tag at the C-terminus.

In one embodiment the use is for the expression of C-terminally biotinylated non-human FcRn and the deoxyribonucleic acid encoding non-human FcRn comprises in 5'- to 3'-direction
 a first expression cassette encoding non-human class I major histocompatibility complex-like protein (α-FcRn) comprising an Avi-tag at the C-terminus,
 a second expression cassette encoding non-human β2-microglobulin (β2m), a third expression cassette encoding non-human class I major histocompatibility complex-like protein (α-FcRn) comprising an Avi-tag at the C-terminus,
a fourth expression cassette encoding non-human β2-microglobulin (β2m), and
a fifth expression cassette encoding biotin-[acetyl-CoA-carboxylase] ligase.

One aspect of the invention is a recombinant mammalian cell comprising a deoxyribonucleic acid encoding non-human FcRn integrated in the genome of the cell,
wherein the deoxyribonucleic acid encoding non-human FcRn comprises in 5'- to 3'-direction
a first expression cassette encoding non-human class I major histocompatibility complex-like protein (α-FcRn),
a second expression cassette encoding non-human β2-microglobulin (β2m), and
a third expression cassette encoding non-human β2-microglobulin (β2m).

In one embodiment the deoxyribonucleic acid is stably integrated into the genome of the mammalian cell at a single site or locus.

In one embodiment the non-human class I major histocompatibility complex-like protein (α-FcRn) further comprises an Avi-tag, a His-tag or an HisAvi-tag at the C-terminus.

In one embodiment the deoxyribonucleic acid encoding non-human FcRn comprises in 5'- to 3'-direction
a first expression cassette encoding non-human class I major histocompatibility complex-like protein (α-FcRn) comprising an Avi-tag at the C-terminus,
a second expression cassette encoding non-human β2-microglobulin (β2m),
a third expression cassette encoding non-human class I major histocompatibility complex-like protein (α-FcRn) comprising an Avi-tag at the C-terminus,
a fourth expression cassette encoding non-human β2-microglobulin (β2m), and
a fifth expression cassette encoding biotin-[acetyl-CoA-carboxylase] ligase.

In one embodiment the non-human class I major histocompatibility complex-like protein (α-FcRn) is the extracellular domain thereof.

In one embodiment of all aspects and embodiments the BirA is from *E. coli*.

In one embodiment of all previous aspects the deoxyribonucleic acid encoding non-human FcRn further comprises
a first recombination recognition sequence located 5' to the first (most 5') expression cassette,
a second recombination recognition sequence located 3' to the third or, if present, to the fifth (most 3') expression cassette, and
a third recombination recognition sequence located
between the first and the second recombination recognition sequence, and
between two of the expression cassettes,
and
wherein all recombination recognition sequences are different.

In one embodiment the third recombination recognition sequence is located between the second and the third expression cassette.

One aspect of the current invention is a composition comprising two deoxyribonucleic acids, which comprise in turn three different recombination recognition sequences and three expression cassettes, wherein the first deoxyribonucleic acid comprises in 5'- to 3'-direction,
a first recombinase recognition sequence,
a first expression cassette encoding non-human class I major histocompatibility complex-like protein (α-FcRn),
a second expression cassette encoding non-human β2-microglobulin (β2m), and
a first copy of a third recombination recognition sequence,
and
the second deoxyribonucleic acid comprises in 5'- to 3'-direction
a second copy of the third recombination recognition sequence,
a third expression cassette encoding non-human β2-microglobulin (β2m), and
a second recombination recognition sequence.

In one embodiment the non-human class I major histocompatibility complex-like protein (α-FcRn) further comprises an Avi-tag, a His-tag or an HisAvi-tag at the C-terminus.

In one embodiment the second deoxyribonucleic acid comprises in 5'- to 3'-direction
a second copy of the third recombinase recognition sequence,
a third expression cassette encoding non-human class I major histocompatibility complex-like protein (α-FcRn) comprising an Avi-tag at the C-terminus,
a fourth expression cassette encoding non-human β2-microglobulin (β2m),
a fifth expression cassette encoding biotin-[acetyl-CoA-carboxylase] ligase, and
a second recombinase recognition sequence.

In one embodiment the non-human class I major histocompatibility complex-like protein (α-FcRn) is the extracellular domain thereof.

In one embodiment of all previous aspects the deoxyribonucleic acid encoding non-human FcRn comprises a further expression cassette encoding for a selection marker.

In one embodiment the expression cassette encoding for a selection marker is located either
i) 5', or
ii) 3', or
iii) partly 5' and partly 3'
to the third recombination recognition sequence.

In one embodiment the expression cassette encoding for a selection marker is located partly 5' and partly 3' to the third recombination recognition sequences, wherein the 5'-located part of said expression cassette comprises the promoter and a start-codon and the 3'-located part of said expression cassette comprises the coding sequence without a start-codon and a polyA signal.

In one embodiment the 5'-located part of the expression cassette encoding the selection marker comprises a promoter sequence operably linked to a start-codon, whereby the promoter sequence is flanked upstream by (i.e. is positioned downstream to) the second expression cassette and the start-codon is flanked downstream by (i.e. is positioned upstream of) the third recombination recognition sequence; and the 3'-located part of the expression cassette encoding the selection marker comprises a nucleic acid encoding the selection marker lacking a start-codon operably linked to a polyadenylation signal sequence and is flanked upstream by the third recombination recognition sequence and downstream by the third expression cassette.

In one embodiment the start-codon is a transcription start-codon. In one embodiment the start-codon is ATG.

One aspect of the invention is a recombinant mammalian cell comprising a deoxyribonucleic acid encoding non-human FcRn integrated in the genome of the cell,
wherein the deoxyribonucleic acid encoding non-human FcRn comprises the following elements:
a first, a second and a third recombination recognition sequence,
a first and a second selection marker, and
a first to third expression cassette,
wherein the sequences of said elements in 5'-to-3' direction is
RRS1-1$^{st}$ EC-2$^{nd}$ EC-RRS3-SM1-3$^{rd}$ EC-RRS2-SM2
with
RRS=recombination recognition sequence,
EC=expression cassette,
SM=selection marker.

One aspect of the current invention is a method for producing a recombinant mammalian cell comprising a deoxyribonucleic acid encoding non-human FcRn and secreting non-human FcRn comprising the following steps:
a) providing a mammalian cell comprising an exogenous nucleotide sequence integrated at a single site within a locus of the genome of the mammalian cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different;
b) introducing into the cell provided in a) a composition of two deoxyribonucleic acids comprising three different recombination recognition sequences and five expression cassettes, wherein
the first deoxyribonucleic acid comprises in 5'- to 3'-direction,
a first recombinase recognition sequence,
a first expression cassette encoding non-human class I major histocompatibility complex-like protein (α-FcRn),
a second expression cassette encoding non-human β2-microglobulin β2m),
a 5'-terminal part of an expression cassette encoding one second selection marker, and
a first copy of a third recombination recognition sequence,
and
the second deoxyribonucleic acid comprises in 5'- to 3'-direction
a second copy of the third recombination recognition sequence,
a 3'-terminal part of an expression cassette encoding the one second selection marker,
a third expression cassette encoding non-human β2-microglobulin (β2m), and
a second recombination recognition sequence,
wherein the first to third recombination recognition sequences of the first and second deoxyribonucleic acid are matching the first to third recombination recognition sequence on the integrated exogenous nucleotide sequence,
wherein the 5'-terminal part and the 3'-terminal part of the expression cassette encoding the one second selection marker when taken together form a functional expression cassette of the one second selection marker;
c) introducing
i) either simultaneously with the first and second deoxyribonucleic acid of b); or
ii) sequentially thereafter
one or more recombinases,
wherein the one or more recombinases recognize the recombination recognition sequences of the first and the second deoxyribonucleic acid; (and optionally wherein the one or more recombinases perform two recombinase mediated cassette exchanges;)
and
d) selecting a cell expressing the second selection marker and secreting non-human FcRn,
thereby producing a recombinant mammalian cell comprising a deoxyribonucleic acid encoding non-human FcRn and secreting non-human FcRn.

In one embodiment the non-human class I major histocompatibility complex-like protein (α-FcRn) further comprises an Avi-tag, a His-tag or an HisAvi-tag at the C-terminus.

In one embodiment the non-human class I major histocompatibility complex-like protein (α-FcRn) is the extracellular domain thereof.

In one embodiment the method is for producing a recombinant mammalian cell comprising a deoxyribonucleic acid encoding non-human FcRn and secreting C-terminal biotinylated non-human FcRn, wherein the two deoxyribonucleic acids comprise three different recombination recognition sequences and six expression cassettes and the second deoxyribonucleic acid comprises in 5'- to 3'-direction
a second copy of the third recombinase recognition sequence,
a third expression cassette encoding non-human class I major histocompatibility complex-like protein (α-FcRn) comprising an Avi-tag at the C-terminus,
a fourth expression cassette encoding non-human β2-microglobulin (β2m), and
a fifth expression cassette encoding biotin-[acetyl-CoA-carboxylase] ligase.

In one embodiment the expression cassette encoding the one second selection marker is located partly 5' and partly 3' to the third recombination recognition sequences, wherein the 5'-located part of said expression cassette comprises the promoter and the start-codon and said 3'-located part of the expression cassette comprises the coding sequence of the one second selection marker without a start-codon and a polyA signal.

In one embodiment the 5'-terminal part of the expression cassette encoding the one second selection marker comprises a promoter sequence operably linked to the start-codon, whereby the promoter sequence is flanked upstream by (i.e. is positioned downstream to) the second expression cassette and the start-codon is flanked downstream by (i.e. is positioned upstream of) the third recombination recognition sequence; and the 3'-terminal part of the expression cassette encoding the one second selection marker comprises the coding sequence of the one second selection marker lacking a start-codon operably linked to a polyadenylation signal sequence and is flanked upstream by the third recombination recognition sequence and downstream by the third expression cassette.

In one embodiment the start-codon is a transcription start-codon. In one embodiment the start-codon is ATG.

In one embodiment of all previous aspects and embodiments the first deoxyribonucleic acid is integrated into a first vector and the second deoxyribonucleic acid is integrated into a second vector.

In one embodiment of all previous aspects and embodiments each of the expression cassettes comprise in 5'-to-3' direction a promoter, a coding sequence and a polyadenylation signal sequence optionally followed by a terminator sequence.

In one embodiment
i) the first and/or third expression cassette comprises in 5'-to-3' direction a promoter, a nucleic acid encoding non-human class I major histocompatibility complex-like protein (α-FcRn), and a polyadenylation signal sequence and optionally a terminator sequence,
ii) the second and/or fourth expression cassette comprises in 5'-to-3' direction a promoter, a nucleic acid encoding non-human β2-microglobulin (β2m), and a polyadenylation signal sequence and optionally a terminator sequence, and
iii) the expression cassette encoding the selection marker comprises in 5'-to-3' direction a promoter, a nucleic acid encoding puromycin N-acetyl-transferase, and a polyadenylation signal sequence and optionally a terminator sequence.

In one embodiment the fifth expression cassette comprises in 5'-to-3' direction a promoter, a nucleic acid encoding *E. coli* biotin-[acetyl-CoA-carboxylase] ligase, and a polyadenylation signal sequence and optionally a terminator sequence.

In one embodiment of all previous aspects and embodiments the promoter is the human CMV promoter with intron A, the polyadenylation signal sequence is the bGH polyA site and the terminator sequence is the hGT terminator.

In one embodiment of all previous aspects and embodiments the promoter is the human CMV promoter with intron A, the polyadenylation signal sequence is the bGH polyA site and the terminator sequence is the hGT terminator except for the expression cassette of the selection marker, wherein the promoter is the SV40 promoter and the polyadenylation signal sequence is the SV40 polyA site and a terminator sequence is absent.

In one embodiment of all previous aspects and embodiments the non-human FcRn is a non-covalent complex of the non-human class I major histocompatibility complex-like protein (α-FcRn) and the non-human beta-2-microglobulin (b2m).

In one embodiment of all previous aspects and embodiments the non-human FcRn is mono-biotinylated.

In one embodiment of all previous aspects and embodiments the mammalian cell is a CHO cell. In one embodiment the CHO cell is a CHO-K1 cell.

In one embodiment of all previous aspects and embodiments the recombinase recognition sequences are L3, 2L and LoxFas. In one embodiment L3 has the sequence of SEQ ID NO: 22, 2L has the sequence of SEQ ID NO: 23 and LoxFas has the sequence of SEQ ID NO: 24. In one embodiment the first recombinase recognition sequence is L3, the second recombinase recognition sequence is 2L and the third recombinase recognition sequence is LoxFas.

In one embodiment of all previous aspects and embodiments the *E. coli* biotin-[acetyl-CoA-carboxylase] ligase has the amino acid sequence of SEQ ID NO: 21.

In one embodiment of all previous aspects and embodiments the human CMV promoter has the sequence of SEQ ID NO: 25. In one embodiment the human CMV promoter has the sequence of SEQ ID NO: 27.

In one embodiment of all previous aspects and embodiments the bGH polyadenylation signal sequence is SEQ ID NO: 29.

In one embodiment of all previous aspects and embodiments the hGT terminator has the sequence of SEQ ID NO: 30.

In one embodiment of all previous aspects and embodiments the SV40 promoter has the sequence of SEQ ID NO: 31.

In one embodiment of all previous aspects and embodiments the SV40 polyadenylation signal sequence is SEQ ID NO: 28.

In one embodiment of all previous aspects and embodiments the non-human FcRn is cynomolgus FcRn, the non-human class I major histocompatibility complex-like protein (α-FcRn) is cynomolgus class I major histocompatibility complex-like protein (α-FcRn), and the non-human β2-microglobulin (β2m) is cynomolgus β2-microglobulin (β2m). In one embodiment the cynomolgus class I major histocompatibility complex-like protein (α-FcRn) is the extracellular domain thereof. In one embodiment the cynomolgus class I major histocompatibility complex-like protein (α-FcRn) has the amino acid sequence of SEQ ID NO: 09. In one embodiment the cynomolgus class I major histocompatibility complex-like protein (α-FcRn) has the amino acid sequence of SEQ ID NO: 10. In one embodiment the cynomolgus β2-microglobulin (β2m) has the amino acid sequence of SEQ ID NO: 13.

In one embodiment of all previous aspects and embodiment the non-human FcRn is murine FcRn, the non-human class I major histocompatibility complex-like protein (α-FcRn) is murine class I major histocompatibility complex-like protein (α-FcRn), and the non-human β2-microglobulin (β2m) is murine β2-microglobulin (β2m). In one embodiment the murine class I major histocompatibility complex-like protein (α-FcRn) is the extracellular domain thereof. In one embodiment the murine class I major histocompatibility complex-like protein (α-FcRn) has the amino acid sequence of SEQ ID NO: 15. In one embodiment the murine class I major histocompatibility complex-like protein (α-FcRn) has the amino acid sequence of SEQ ID NO: 16. In one embodiment the murine β2-microglobulin (β2m) has the amino acid sequence of SEQ ID NO: 19.

II.b Recombinase Mediated Cassette Exchange (RMCE)

Targeted integration allows for exogenous nucleotide sequences to be integrated into a pre-determined site of a mammalian cell's genome. In certain embodiments, the targeted integration is mediated by a recombinase that recognizes one or more recombination recognition sequences (RRSs). In certain embodiments, the targeted integration is mediated by homologous recombination.

A "recombination recognition sequence" (RRS) is a nucleotide sequence recognized by a recombinase and is necessary and sufficient for recombinase-mediated recombination events. A RRS can be used to define the position where a recombination event will occur in a nucleotide sequence.

In certain embodiments, a RRS is selected from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, a Lox66 sequence, a FRT sequence, a Bxb1 attP sequence, a Bxb1 attB sequence, a φC31 attP sequence, and a φC31 attB sequence. If multiple RRSs have to be present, the selection of each of the sequences is dependent on the other insofar as non-identical RRSs are chosen.

In certain embodiments, a RRS can be recognized by a Cre recombinase. In certain embodiments, a RRS can be recognized by a FLP recombinase. In certain embodiments, a RRS can be recognized by a Bxb1 integrase. In certain embodiments, a RRS can be recognized by a φC31 integrase.

In certain embodiments when the RRS is a LoxP site, the cell requires the Cre recombinase to perform the recombination. In certain embodiments when the RRS is a FRT site, the cell requires the FLP recombinase to perform the recombination. In certain embodiments when the RRS is a Bxb1 attP or a Bxb1 attB site, the cell requires the Bxb1 integrase to perform the recombination. In certain embodiments when the RRS is a φC31 attP or a φC31attB site, the cell requires the φC31 integrase to perform the recombination. The recombinases can be introduced into a cell using an expression vector comprising coding sequences of the enzymes.

The Cre-LoxP site-specific recombination system has been widely used in many biological experimental systems. Cre is a 38-kDa site-specific DNA recombinase that recognizes 34 bp LoxP sequences. Cre is derived from bacteriophage P1 and belongs to the tyrosine family site-specific recombinase. Cre recombinase can mediate both intra and intermolecular recombination between LoxP sequences. The LoxP sequence is composed of an 8 bp non-palindromic core region flanked by two 13 bp inverted repeats. Cre recombinase binds to the 13 bp repeat thereby mediating recombination within the 8 bp core region. Cre-LoxP-mediated recombination occurs at a high efficiency and does not require any other host factors. If two LoxP sequences are placed in the same orientation on the same nucleotide sequence, Cre-mediated recombination will excise DNA sequences located between the two LoxP sequences as a covalently closed circle. If two LoxP sequences are placed in an inverted position on the same nucleotide sequence, Cre-mediated recombination will invert the orientation of the DNA sequences located between the two sequences. If two LoxP sequences are on two different DNA molecules and if one DNA molecule is circular, Cre-mediated recombination will result in integration of the circular DNA sequence.

In certain embodiments, a LoxP sequence is a wild-type LoxP sequence. In certain embodiments, a LoxP sequence is a mutant LoxP sequence. Mutant LoxP sequences have been developed to increase the efficiency of Cre-mediated integration or replacement. In certain embodiments, a mutant LoxP sequence is selected from the group consisting of a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, and a Lox66 sequence. For example, the Lox71 sequence has 5 bp mutated in the left 13 bp repeat. The Lox66 sequence has 5 bp mutated in the right 13 bp repeat. Both the wild-type and the mutant LoxP sequences can mediate Cre-dependent recombination.

The term "matching RRSs" indicates that a recombination occurs between two RRSs. In certain embodiments, the two matching RRSs are the same. In certain embodiments, both RRSs are wild-type LoxP sequences. In certain embodiments, both RRSs are mutant LoxP sequences. In certain embodiments, both RRSs are wild-type FRT sequences. In certain embodiments, both RRSs are mutant FRT sequences. In certain embodiments, the two matching RRSs are different sequences but can be recognized by the same recombinase. In certain embodiments, the first matching RRS is a Bxb1 attP sequence and the second matching RRS is a Bxb1 attB sequence. In certain embodiments, the first matching RRS is a φC31 attB sequence and the second matching RRS is a φC31 attB sequence.

II.c Exemplary Mammalian Cells Suitable for TI

Any known or future mammalian cell suitable for TI comprising an exogenous nucleic acid ("landing site") as described above can be used in the current invention.

The invention is exemplified with a CHO cell comprising an exogenous nucleic acid (landing site) according to the previous sections. This is presented solely to exemplify the invention but shall not be construed in any way as limitation. The true scope of the invention is set in the claims.

In one preferred embodiment the mammalian cell comprising an exogenous nucleotide sequence integrated at a single site within a locus of the genome of the mammalian cell is a CHO cell.

An exemplary mammalian cell comprising an exogenous nucleotide sequence integrated at a single site within a locus of its genome that is suitable for use in the current invention is a CHO cell harboring a landing site (=exogenous nucleotide sequence integrated at a single site within a locus of the genome of the mammalian cell) comprising three heterospecific loxP sites for Cre recombinase mediated DNA recombination. These heterospecific loxP sites are L3, LoxFas and 2L (see e.g. Lanza et al., Biotechnol. J. 7 (2012) 898-908; Wong et al., Nucleic Acids Res. 33 (2005) e147), whereby L3 and 2L flank the landing site at the 5'-end and 3'-end, respectively, and LoxFas is located between the L3 and 2L sites. The landing site further contains a bicistronic unit linking the expression of a selection marker via an IRES to the expression of the fluorescent GFP protein allowing to stabilize the landing site by positive selection as well as to select for the absence of the site after transfection and Cre-recombination (negative selection). Green fluorescence protein (GFP) serves for monitoring the RMCE reaction.

Such a configuration of the landing site as outlined in the previous paragraph allows for the simultaneous integration of two vectors, a so called front vector with an L3 and a LoxFas site and a back vector harboring a LoxFas and an 2L site. The functional elements of a selection marker gene different from that present in the landing site are distributed between both vectors: promoter and start codon are located on the front vector whereas coding region and poly A signal are located on the back vector. Only correct Cre-mediated integration of said nucleic acids from both vectors induces resistance against the respective selection agent.

Generally, a mammalian cell suitable for TI is a mammalian cell comprising an exogenous nucleotide sequence integrated at a single site within a locus of the genome of the mammalian cell, wherein the exogenous nucleotide sequence comprises a first and a second recombination recognition sequence flanking at least one first selection marker, and a third recombination recognition sequence located between the first and the second recombination recognition sequence, and all the recombination recognition sequences are different. Said exogenous nucleotide sequence is called a "landing site".

The presently disclosed subject matter uses a mammalian cell suitable for TI of exogenous nucleotide sequences. In certain embodiments, the mammalian cell suitable for TI comprises an exogenous nucleotide sequence integrated at an integration site in the genome of the mammalian cell. Such a mammalian cell suitable for TI can be denoted also as a TI host cell.

In certain embodiments, the mammalian cell suitable for TI is a hamster cell, a human cell, a rat cell, or a mouse cell comprising a landing site. In certain embodiments, the mammalian cell suitable for TI is a Chinese hamster ovary (CHO) cell, a CHO K1 cell, a CHO K1SV cell, a CHO DG44 cell, a CHO DUKXB-11 cell, a CHO K1S cell, or a CHO KIM cell comprising a landing site.

In certain embodiments, a mammalian cell suitable for TI comprises an integrated exogenous nucleotide sequence, wherein the exogenous nucleotide sequence comprises one or more recombination recognition sequence (RRS). In certain embodiments, the exogenous nucleotide sequence comprises at least two RRSs. The RRS can be recognized by a recombinase, for example, a Cre recombinase, an FLP recombinase, a Bxb1 integrase, or a φC31 integrase. The RRS can be selected from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, a Lox66 sequence, a FRT sequence, a Bxb1 attP sequence, a Bxb1 attB sequence, a φC31 attP sequence, and a φC31 attB sequence.

In certain embodiments, the exogenous nucleotide sequence comprises a first, a second and a third RRS, and at least one selection marker located between the first and the second RRS, and the third RRS is different from the first and/or the second RRS. In certain embodiments, the exogenous nucleotide sequence further comprises a second selection marker, and the first and the second selection markers are different. In certain embodiments, the exogenous nucleotide sequence further comprises a third selection marker and an internal ribosome entry site (IRES), wherein the IRES is operably linked to the third selection marker. The third selection marker can be different from the first or the second selection marker.

The selection marker(s) can be selected from the group consisting of an aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid. The selection marker(s) can also be a fluorescent protein selected from the group consisting of green fluorescent protein (GFP), enhanced GFP (eGFP), a synthetic GFP, yellow fluorescent protein (YFP), enhanced YFP (eYFP), cyan fluorescent protein (CFP), mPlum, mCherry, tdTomato, mStrawberry, J-red, DsRed-monomer, mOrange, mKO, mCitrine, Venus, YPet, Emerald6, CyPet, mCFPm, Cerulean, and T-Sapphire.

In certain embodiments, the exogenous nucleotide sequence comprises a first, second, and third RRS, and at least one selection marker located between the first and the third RRS.

An exogenous nucleotide sequence is a nucleotide sequence that does not originate from a specific cell but can be introduced into said cell by DNA delivery methods, such as, e.g., by transfection, electroporation, or transformation methods. In certain embodiments, a mammalian cell suitable for TI comprises at least one exogenous nucleotide sequence integrated at one or more integration sites in the mammalian cell's genome. In certain embodiments, the exogenous nucleotide sequence is integrated at one or more integration sites within a specific a locus of the genome of the mammalian cell.

In certain embodiments, an integrated exogenous nucleotide sequence comprises one or more recombination recognition sequence (RRS), wherein the RRS can be recognized by a recombinase. In certain embodiments, the integrated exogenous nucleotide sequence comprises at least two RRSs. In certain embodiments, an integrated exogenous nucleotide sequence comprises three RRSs, wherein the third RRS is located between the first and the second RRS. In certain embodiments, the first and the second RRS are the same and the third RRS is different from the first or the second RRS. In certain preferred embodiments, all three RRSs are different. In certain embodiments, the RRSs are selected independently of each other from the group consisting of a LoxP sequence, a LoxP L3 sequence, a LoxP 2L sequence, a LoxFas sequence, a Lox511 sequence, a Lox2272 sequence, a Lox2372 sequence, a Lox5171 sequence, a Loxm2 sequence, a Lox71 sequence, a Lox66 sequence, a FRT sequence, a Bxb1 attP sequence, a Bxb1 attB sequence, a φC31 attP sequence, and a φC31 attB sequence.

In certain embodiments, the integrated exogenous nucleotide sequence comprises at least one selection marker. In certain embodiments, the integrated exogenous nucleotide sequence comprises a first, a second and a third RRS, and at least one selection marker. In certain embodiments, a selection marker is located between the first and the second RRS. In certain embodiments, two RRSs flank at least one selection marker, i.e., a first RRS is located 5' (upstream) and a second RRS is located 3' (downstream) of the selection marker. In certain embodiments, a first RRS is adjacent to the 5'-end of the selection marker and a second RRS is adjacent to the 3'-end of the selection marker.

In certain embodiments, a selection marker is located between a first and a second RRS and the two flanking RRSs are different. In certain preferred embodiments, the first flanking RRS is a LoxP L3 sequence and the second flanking RRS is a LoxP 2L sequence. In certain embodiments, a LoxP L3 sequenced is located 5' of the selection marker and a LoxP 2L sequence is located 3' of the selection marker. In certain embodiments, the first flanking RRS is a wild-type FRT sequence and the second flanking RRS is a mutant FRT sequence. In certain embodiments, the first flanking RRS is a Bxb1 attP sequence and the second flanking RRS is a Bxb1 attB sequence. In certain embodiments, the first flanking RRS is a φC31 attP sequence and the second flanking RRS is a φC31 attB sequence. In certain embodiments, the two RRSs are positioned in the same orientation. In certain embodiments, the two RRSs are both in the forward or reverse orientation. In certain embodiments, the two RRSs are positioned in opposite orientation.

In certain embodiments, the integrated exogenous nucleotide sequence comprises a first and a second selection marker, which are flanked by two RRSs, wherein the first selection marker is different from the second selection marker. In certain embodiments, the two selection markers are both independently of each other selected from the group consisting of a glutamine synthetase selection marker, a thymidine kinase selection marker, a HYG selection marker, and a puromycin resistance selection marker. In certain embodiments, the integrated exogenous nucleotide sequence comprises a thymidine kinase selection marker and a HYG selection marker. In certain embodiments, the first selection maker is selected from the group consisting of an aminoglycoside phosphotransferase (APH) (e.g., hygromycin phosphotransferase (HYG), neomycin and G418 APH), dihydrofolate reductase (DHFR), thymidine kinase (TK), glutamine synthetase (GS), asparagine synthetase, tryptophan synthetase (indole), histidinol dehydrogenase (histidinol D), and genes encoding resistance to puromycin, blasticidin, bleomycin, phleomycin, chloramphenicol, Zeocin, and mycophenolic acid, and the second selection maker is selected from the group consisting of a GFP, an eGFP, a synthetic GFP, a YFP, an eYFP, a CFP, an mPlum, an mCherry, a tdTomato, an mStrawberry, a J-red, a DsRed-monomer, an mKO, an mCitrine, a Venus, a YPet, an Emerald, a CyPet, an mCFPm, a Cerulean, and a T-Sapphire fluorescent protein. In certain embodiments, the first selection marker is a glutamine synthetase selection marker and the second selection marker is a GFP fluorescent protein. In certain embodiments, the two RRSs flanking both selection markers are different.

In certain embodiments, the selection marker is operably linked to a promoter sequence. In certain embodiments, the selection marker is operably linked to an SV40 promoter. In certain embodiments, the selection marker is operably linked to a human Cytomegalovirus (CMV) promoter.

In certain embodiments, the integrated exogenous nucleotide sequence comprises three RRSs. In certain embodiments, the third RRS is located between the first and the second RRS. In certain embodiments, the first and the second RRS are the same, and the third RRS is different from the first or the second RRS. In certain preferred embodiments, all three RRSs are different.

II.d Exemplary Vectors Suitable for Performing the Invention

Beside the "single-vector RMCE" as outlined above a novel "two-vector RMCE" can be performed for simultaneous targeted integration of two nucleic acids.

A "two-vector RMCE" strategy is employed in the method according to the current invention using a vector combination according to the current invention. For example, but not by way of limitation, an integrated exogenous nucleotide sequence could comprise three RRSs, e.g., an arrangement where the third RRS ("RRS3") is present between the first RRS ("RRS1") and the second RRS ("RRS2"), while a first vector comprises two RRSs matching the first and the third RRS on the integrated exogenous nucleotide sequence, and a second vector comprises two RRSs matching the third and the second RRS on the integrated exogenous nucleotide sequence. An example of a two vector RMCE strategy is illustrated in FIG. 1. Such two vector RMCE strategies allow for the introduction of multiple SOIs by incorporating the appropriate number of SOIs in the respective sequence between each pair of RRSs so that the expression cassette organization according to the current invention is obtained after TI in the genome of the mammalian cell suitable for TI.

The two-plasmid RMCE strategy involves using three RRS sites to carry out two independent RMCEs simultaneously (FIG. 1). Therefore, a landing site in the mammalian cell suitable for TI using the two-plasmid RMCE strategy includes a third RRS site (RRS3) that has no cross activity with either the first RRS site (RRS1) or the second RRS site (RRS2). The two expression plasmids to be targeted require the same flanking RRS sites for efficient targeting, one expression plasmid (front) flanked by RRS1 and RRS3 and the other (back) by RRS3 and RRS2. Also two selection markers are needed in the two-plasmid RMCE. One selection marker expression cassette was split into two parts. The front plasmid would contain the promoter followed by a start codon and the RRS3 sequence. The back plasmid would have the RRS3 sequence fused to the N-terminus of the selection marker coding region, minus the start-codon (ATG). Additional nucleotides may need to be inserted between the RRS3 site and the selection marker sequence to ensure in frame translation for the fusion protein, i.e. operable linkage. Only when both plasmids are correctly inserted the full expression cassette of the selection marker will be assembled and, thus, rendering cells resistance to the respective selection agent. FIG. 1 is the schematic diagram showing the two plasmid RMCE strategy.

Both single-vector and two-vector RMCE allow for unidirectional integration of one or more donor DNA molecule(s) into a pre-determined site of a mammalian cell's genome by precise exchange of a DNA sequence present on the donor DNA with a DNA sequence in the mammalian cell's genome where the integration site resides. These DNA sequences are characterized by two heterospecific RRSs flanking i) at least one selection marker or as in certain two-vector RMCEs a "split selection marker"; and/or ii) at least one exogenous SOI.

RMCE involves double recombination cross-over events, catalyzed by a recombinase, between the two heterospecific RRSs within the target genomic locus and the donor DNA molecule. RMCE is designed to introduce a copy of the DNA sequences from the front- and back-vector in combination into the pre-determined locus of a mammalian cell's genome. Unlike recombination which involves just one cross-over event, RMCE can be implemented such that prokaryotic vector sequences are not introduced into the mammalian cell's genome, thus reducing and/or preventing unwanted triggering of host immune or defense mechanisms. The RMCE procedure can be repeated with multiple DNA sequences.

In certain embodiments, targeted integration is achieved by two RMCEs, wherein two different DNA sequences, each comprising at least one expression cassette encoding a part of a heteromultimeric polypeptide and/or at least one selection marker or part thereof flanked by two heterospecific RRSs, are both integrated into a pre-determined site of the genome of a mammalian cell suitable for TI. In certain embodiments, targeted integration is achieved by multiple RMCEs, wherein DNA sequences from multiple vectors, each comprising at least one expression cassette encoding a part of a heteromultimeric polypeptide and/or at least one selection marker or part thereof flanked by two heterospecific RRSs, are all integrated into a predetermined site of the genome of a mammalian cell suitable for TI. In certain embodiments the selection marker can be partially encoded on the first the vector and partially encoded on the second vector such that only the correct integration of both by double RMCE allows for the expression of the selection marker. An example of such a system is presented in FIG. 1.

In certain embodiments, targeted integration via recombinase-mediated recombination leads to selection marker and/or the different expression cassettes for the multimeric polypeptide integrated into one or more pre-determined integration sites of a host cell genome free of sequences from a prokaryotic vector.

II.e Use of the FcRn According to the Current Invention or Produced with a Method According to the Current Invention The neonatal Fc receptor (FcRn), such as that from human, mouse or cynomolgus ape, plays an important role in IgG catabolism. An IgGs in vitro FcRn binding properties/characteristics are indicative of its in vivo pharmacokinetic properties. Such in vitro methods are of great value during antibody development as repeated in vivo studies can be avoided (reduced animal experiments, time and costs). Such analyses can be performed using plasmon surface resonance (SPR) assays (Wang, W., et al., Drug Metab. Disp. 39 (2011) 1469-1477; Datta-Mannan, A., et al., Drug Metab. Disp. 40 (2012) 1545-1555; Vaughn, D. E. and Bjorkman, P. J., Biochemistry 36 (1997) 9374-9380; Raghavan, M., et al., Proc. Natl. Acad. Sci. USA 92 (1995) 11200-11204; Martin, W. L. and Bjorkman, P. J., Biochemistry 38 (1999) 12639-12647); calorimetric and asymmetrical flow field flow fractionation methods (Huber, A. H., et al., J. Mol. Biol. 230 (1993) 1077-1083; Pollastrini, J., et al., Anal. Biochem. 414 (2011) 88-98); and FcRn affinity chromatography (WO 2013/120929). The by far most convenient method is FcRn affinity chromatography. A combination of other methods could achieve analytical results comparable to those of the FcRn affinity chromatography but at the expense of increased complexity and efforts.

Furthermore, non-pH dependent methods do not appropriately reflect the physiologic pH dependency of the FcRn binding characteristics requiring acidic pH for endosomal binding, but neutral pH for IgG release at the cell surface. Also the pH milieu has influence on the self-association properties of the FcRn molecule. Working under standard conditions at one pH and, thus, detecting just a snapshot of the complex FcRn-IgG interaction requires multiple measurements for compiling the complete pH-dependency of FcRn binding. In FcRn affinity chromatography this can be done in a single measurement.

FcRn affinity chromatography allows to analyze the sample under appropriate physiologic conditions with a predominant 2:1 stoichiometry in a mixture of stoichiometries including 1:2, 1:1 and 2:2 stoichiometries and a pH gradient which can be adjusted to fine tune the separation of the different peaks found in a sample. The different peaks can be quantitated by their respective area under the curve and the eluate corresponding to each peak is amenable to secondary analysis for e.g. functionality determinations, re-chromatography or mass spectrometric analysis.

Additionally, in order to provide therapeutic regimens to treat the diversity of diseases know today and also those that will be revealed in the future a need for tailor-made antibodies as well as Fc-region containing fusion polypeptides exists.

To tailor-make the FcRn binding characteristics of an antibody or an Fc-region containing fusion polypeptide residues involved in Fc-region mediated effector function are modified and the resulting modified antibodies and fusion polypeptides are tested. If the required characteristics are not met the same process is performed again.

With FcRn affinity chromatography a method is provided that predicts the changes in the characteristic properties of a modified antibody based on a simple chromatographical method and does not require in vivo studies to analyze the changes of the characteristics in the modified antibody.

In some cases, antibodies with extended half-life are desired. For example, drugs with an extended half-life in the circulation of a patient in need of a treatment require decreased dosing or increased dosing intervals. Such antibodies also have the advantage of increased exposure to a disease site, e.g. a tumor.

The neonatal Fc receptor (FcRn) is important for the metabolic fate of IgG antibodies in vivo.

The (biotinylated) FcRn according to the current invention or produced with a method according to the current invention can be used as affinity chromatography ligand.

Thus, one aspect of the invention is the use of an immobilized FcRn according to the current invention as affinity chromatography ligand in an affinity chromatography with a positive linear pH gradient for separating antibodies or fusion polypeptides comprising at least an Fc-region,
wherein the FcRn is bound to a solid phase,
wherein the FcRn is mono-biotinylated and the solid phase is derivatized with streptavidin,
wherein the pH gradient is from a first pH value to a second pH value whereby the first pH value is from pH 3.5 to pH 6.4 and the second pH value is from pH 7.4 to pH 9.5.

Thus, one further aspect of the invention is an FcRn-affinity chromatography method comprising the steps of:
applying a solution with a first pH value and comprising an antibody or a fusion polypeptide comprising at least an Fc-region to an FcRn-affinity chromatography material comprising an FcRn according to the current invention,
applying a solution with a pH gradient from the first pH value to a second pH value to the affinity chromatography material of the previous step, and
determining the elution of the antibody or fusion polypeptide,
wherein the FcRn-affinity chromatography material comprises an FcRn according to the current invention bound to a solid phase, wherein the FcRn is mono-biotinylated and the solid phase is derivatized with streptavidin, and
wherein the first pH value is from pH 3.5 to pH 6.4 and the second pH value is from pH 7.4 to pH 9.5.

With the method/use as reported herein it is possible to separate, isolate and characterize with respect to their in vivo properties closely related antibody species, i.e. differing in a single or a limited number of amino acid residues influencing FcRn binding.

Thus, the chromatography method as reported herein can be used to characterize/identify FcRn-related half-life influencing amino acid positions.

Thus, with the method as reported herein it is possible to separate different variants of one parent antibody and to determine the specific ratio between these variants. This can be achieved by the combination of i) the immobilization on a chromatography support of recombinantly produced FcRn and ii) a linear pH gradient.

An antibody having a modified Fc-region with reduced FcRn binding has a retention time that is smaller, whereas an antibody having a modified Fc-region with enhanced FcRn binding has a retention time that is bigger than an antibody with wild-type Fc-region.

In one embodiment the FcRn is bound to a solid phase. In one embodiment the solid phase is a chromatography material. In one embodiment the FcRn is a non-covalent complex of a class I major histocompatibility complex-like protein ($\alpha$-FcRn) and beta-2-microglobulin (b2m) and is biotinylated and the solid phase is derivatized with streptavidin.

In one embodiment the beta-2-microglobulin is from the same species as the FcRn.

In one embodiment the antibody is a monospecific antibody or antibody fragment of fusion polypeptide, or a bispecific antibody or antibody fragment of fusion polypeptide, or a trispecific antibody or antibody fragment of fusion polypeptide, or a tetraspecific antibody or antibody fragment of fusion polypeptide.

An exemplary method as reported herein is a method for selecting an antibody with a predetermined in vivo half-live wherein a chromatography is performed and an antibody is selected that has a retention time within a given retention time window relative to a wild-type IgG1.

FcRn affinity chromatography can differentiate IgG samples by their peak area and retention time profile. It allows the analysis of the interaction between FcRn and IgG in vitro and can provide insight into the structural and functional integrity of therapeutic IgG regarding pharmacokinetics in vivo.

Thus, FcRn affinity chromatography of mutant and wild-type IgGs can be used as semi-quantitatively predictive of in vivo pharmacokinetics. Further, FcRn affinity chromatography can be used to monitor FcRn-IgG interaction, e.g. for IgG batch characterization or for comparability studies.

A standardized pH gradient FcRn affinity liquid chromatography method has been found with conditions closely resembling the mechanism of interaction between IgG and FcRn in vivo. For example, human FcRn was immobilized on the column as affinity ligand and a linear pH gradient e.g. from pH 5.5 to 8.8 was applied.

For example, analytical FcRn affinity chromatography allows identification and characterization of IgG samples and variants by peak pattern and retention time profile. The method can distinguish 1) the same IgG with different Fab fragments, 2) oxidized IgG forms from non-oxidized IgG forms, 3) aggregates from monomers, and 4) antibodies with variations in the Fc-region.

It has been found that changes in the FcRn affinity chromatography profile of variant IgGs (Fc-region variants) relative to the wild-type IgG are predictive of the in vivo pharmacokinetic profile. These results demonstrate that FcRn affinity chromatography is a useful new method for the characterization of FcRn-IgG interactions, of IgG integrity, and at most of an IgG as such.

One aspect as reported herein is the use of an FcRn according to the current invention or as produced with a method according to the current invention as affinity chromatography ligand.

An exemplary affinity chromatography column comprises a matrix and matrix bound chromatographical functional groups, characterized in that the matrix bound chromatographical functional group comprises FcRn according to the current invention or as produced with a method according to the current invention.

An exemplary use of a chromatography material comprising FcRn according to the current invention or as produced with a method according to the current invention as ligand is for the determination of the in vivo half-live of an antibody by determining the ratio of the retention times of the antibody and a reference antibody. The reference antibody can be a full length human IgG1 antibody.

An exemplary method for determining the in vivo half-live of an antibody in relation to a reference antibody is by determining the ratio of the retention times determined on an FcRn affinity column of the antibody and the reference antibody.

One aspect of the invention is the use of a chromatography material comprising FcRn according to the current invention or as produced with a method according to the current invention as ligand for the separation of antibodies or fusion polypeptides comprising at least an Fc-region.

Herein is also reported a method for separating antibodies or fusion polypeptides comprising at least an Fc-region using FcRn affinity chromatography.

In one embodiment the separating is selected from purifying, producing and analyzing.

An exemplary use is the use of a chromatography material comprising FcRn according to the current invention or as produced with a method according to the current invention as ligand for the separation of antibodies of the IgG1 subclass from antibodies of the IgG3 subclass.

An exemplary use is the use of a chromatography material comprising FcRn according to the current invention or as produced with a method according to the current invention as ligand for determining methionine oxidation of an antibody.

An exemplary method is a method for determining the impact on FcRn binding of oxidized methionine residues in the Fc-region of an antibody using an affinity chromatography method as reported herein.

An exemplary use is the use of a chromatography material comprising FcRn according to the current invention or as produced with a method according to the current invention as ligand for determining the oligomerization level of an antibody.

An exemplary method is a method to determine the oligomerization level of an antibody using an affinity chromatography method as reported herein.

An exemplary use is the use of a chromatography material comprising FcRn according to the current invention or as produced with a method according to the current invention as ligand for screening a library of modified antibodies or modified fusion polypeptides of a parent antibody or a parent fusion polypeptide which comprise at least an FcRn binding portion of an Fc-region for those modified antibodies or modified fusion polypeptides that have an altered binding affinity for FcRn compared to the parent antibody or parent fusion polypeptide.

An exemplary method is a method for screening a library of modified antibodies or modified fusion polypeptides of a parent antibody or a parent fusion polypeptide which comprise at least an FcRn binding portion of an Fc-region for those modified antibodies or modified fusion polypeptides that have an altered binding affinity for FcRn compared to the parent antibody or parent fusion polypeptide, the method comprising the following steps:

(a) applying the individual members of the library and the parent antibody or parent fusion polypeptide to an FcRn affinity chromatography column as reported herein;

(b) recovering the individual members of the library with a positive linear pH gradient and determining the individual retention times; and (c) selecting those antibodies or fusion polypeptides that have altered binding affinity for FcRn compared to the parent antibody or parent fusion polypeptide.

Herein is reported a method for purifying an antibody or a fusion polypeptide, which comprises at least an FcRn-binding part of an Fc-region, from a mixture of polypeptides, the method comprising applying the mixture to a FcRn affinity column as reported herein and eluting the antibodies or the fusion polypeptide, which comprises at least an FcRn binding portion of an Fc-region, with a positive linear pH gradient and thereby purifying the antibody or the fusion polypeptide. In one embodiment the FcRn-part of an Fc-region is of a human Fc-region, or a mouse Fc-region, or a cynomolgus Fc-region.

In one embodiment, the reaction/production mixture or the crude or partly purified cultivation supernatant is applied to the FcRn affinity column at a first pH value and the antibody or the fusion polypeptide is recovered from the FcRn affinity column at a second pH value.

An exemplary use is the use of a chromatography material comprising FcRn according to the current invention or as produced with a method according to the current invention as ligand for identifying antibodies or fusion polypeptides that comprise at least an FcRn-binding portion of an Fc-region (e.g., a constant domain of an immunoglobulin such as IgG1) which exhibit altered binding to the neonatal Fc receptor (FcRn).

An exemplary method is a method for identifying antibodies or fusion polypeptides that comprise at least an FcRn-binding portion of an Fc-region (e.g., a constant domain of an immunoglobulin such as IgG1) which exhibit altered binding to the neonatal Fc receptor (FcRn).

Such modified antibodies or fusion polypeptides show either increased or decreased binding to FcRn when compared to a parent antibody or fusion polypeptide or compared to a reference antibody or reference fusion protein, and, thus, have an increased or decreased half-life in serum, respectively.

Fc-region variants with increased affinity for the FcRn (i.e. increased retention time on an FcRn column but still eluting before a pH value of pH 7.4 as reported herein compared to a parent antibody or reference antibody) are predicted to have longer serum half-lives compared to those with decreased affinity for the FcRn. Fc-region variants with increased affinity for the FcRn have applications in methods of treating mammals, especially humans, where long half-life of the administered antibody or fusion polypeptide is desired, such as in the treatment of a chronic disease or disorder. Fc-region variants with decreased affinity for the FcRn have applications in methods of treating mammals, especially humans, where a short half-life of the administered antibody or fusion polypeptide is desired, such as in vivo diagnostic imaging.

It is very likely that Fc-region variants with decreased FcRn binding affinity will be able to cross the placenta and, thus, can be used in the treatment of diseases or disorders in pregnant women especially of unborn children. In addition, reduced FcRn binding affinity may be desired for those drugs intended for application/transport to the brain, kidney, and/or liver.

An exemplary use is the use of a chromatography material comprising FcRn according to the current invention or as produced with a method according to the current invention as ligand for identifying antibodies or fusion polypeptides that exhibit reduced transport across the epithelium of kidney glomeruli from the vasculature.

The antibody or fusion polypeptide comprising a modified Fc-region as reported herein may exhibit reduced transport across the epithelium of kidney glomeruli from the vasculature.

An exemplary use is the use of a chromatography material comprising FcRn according to the current invention or as produced with a method according to the current invention as ligand for identifying antibodies or fusion polypeptides that exhibit reduced transport across the blood brain barrier from the brain into the vascular space.

The antibody or fusion polypeptide comprising a modified Fc-region of human origin as reported herein may exhibit reduced transport across the blood brain barrier (BBB) from the brain into the vascular space.

In one embodiment of all aspects as reported herein is the at least a part of an Fc-region at least a part of an Fc-region of human origin. In one embodiment of all aspects as reported herein is the FcRn selected from human FcRn, cynomolgus FcRn, and mouse FcRn.

In one embodiment of all aspects as reported herein the beta-2-microglobulin is from the same species as the α-FcRn.

In one embodiment of all aspects as reported herein the beta-2-microglobulin is from a different species as the α-FcRn.

In one embodiment the Fc-regions or the FcRn binding parts of an Fc-region are derived from heavy chains of any isotype.

In one embodiment the at least a part of an Fc-region comprises at least amino acid residues 282-340 of a CH2 domain of human origin (numbering according to Kabat). In one embodiment the at least a portion of an Fc-region comprises a complete CH2 domain (about amino acid residues 231-340 of an antibody heavy chain polypeptide Fc-region of human origin according to EU numbering according to Kabat). In one embodiment the at least a portion of an Fc-region comprises at least a CH2 domain, and at least one of a hinge region (about amino acid residues 216-230 of an antibody heavy chain polypeptide Fc-region of human origin according to EU numbering) or a CH3 domain (about amino acid residues 341-446 of an antibody heavy chain polypeptide Fc-region of human origin according to EU numbering). In one embodiment the at least a portion of an Fc-region comprises a CH2 and a CH3 domain of an antibody heavy chain of human origin. In one embodiment the at least a portion of an Fc-region comprises a hinge, a CH2 domain, and CH3 domain of an antibody heavy chain Fc-region of human origin. Fc-regions of human origin or FcRn binding parts of an Fc-region of human origin portions may be derived from heavy chains of any isotype. In one embodiment the human isotype is IgG1.

Antibodies specifically binding to a target can be raised in mammals by multiple subcutaneous or intraperitoneal injections of the relevant antigen (e.g. purified antigen, cells or cellular extracts comprising such antigens, or DNA encoding for such antigen) and optionally an adjuvant.

In one embodiment the antibody is a monoclonal antibody.

Generally, the binding domain is fused to the C-terminus or the N-terminus of the at least an FcRn binding portion of an Fc-region.

An exemplary use is the use of a chromatography material comprising FcRn according to the current invention or as produced with a method according to the current invention as ligand for selecting antibodies with a binding to the FcRn at a pH value of pH 7.4 for in vivo (co-)targeting. The co-targeting can be internalization.

In one embodiment of all aspects as reported herein the FcRn according to the current invention or as produced with a method according to the current invention is bound to a solid phase.

A "solid phase" denotes a non-fluid substance, and includes particles (including microparticles and beads) made from materials such as polymer, metal (paramagnetic, ferromagnetic particles), glass, and ceramic; gel substances such as silica, alumina, and polymer gels; capillaries, which may be made of polymer, metal, glass, and/or ceramic; zeolites and other porous substances; electrodes; microtiter plates; solid strips; and cuvettes, tubes or other spectrometer sample containers. A solid phase component of an assay is distinguished from inert solid surfaces in that a "solid support" contains at least one moiety on its surface, which is intended to interact chemically with a molecule. A solid phase may be a stationary component, such as a chip, tube, strip, cuvette, or microtiter plate, or may be non-stationary components, such as beads and microparticles. Microparticles can also be used as a solid support for homogeneous assay formats. A variety of microparticles that allow both non-covalent or covalent attachment of proteins and other substances may be used. Such particles include polymer particles such as polystyrene and poly (methylmethacrylate); gold particles such as gold nanoparticles and gold colloids; and ceramic particles such as silica, glass, and metal oxide particles. See for example Martin, C. R., et al., Analytical Chemistry-News & Features, May 1 (1998) 322A-327A. In one embodiment the solid support is sepharose.

The FcRn according to the current invention or as produced with a method according to the current invention is conjugated to the solid phase via a specific binding pair. The FcRn according to the current invention or as produced with a method according to the current invention is conjugated to biotin and immobilization to a solid support is performed via solid support immobilized avidin or streptavidin.

The recovering of antibody bound to the FcRn affinity chromatography column as reported herein in the uses and methods as reported herein is by a linear gradient elution. The linear gradient is a pH gradient.

In principle any buffer substance can be used in the methods as reported herein.

Fc residues critical to the mouse Fc-mouse FcRn interaction have been identified by site-directed mutagenesis (see e.g. Dall'Acqua, W. F., et al. J. Immunol 169 (2002) 5171-5180). Residues I253, H310, H433, N434, and H435 (EU numbering according to Kabat) are involved in the interaction (Medesan, C., et al., Eur. J. Immunol. 26 (1996) 2533; Firan, M., et al., Int. Immunol. 13 (2001) 993; Kim, J. K., et al., Eur. J. Immunol. 24 (1994) 542). Residues I253, H310, and H435 were found to be critical for the interaction of human Fc with murine FcRn (Kim, J. K., et al., Eur. J. Immunol. 29 (1999) 2819). Residues M252Y, S254T, T256E have been described by Dall'Acqua et al. to improve FcRn binding by protein-protein interaction studies (Dall'Acqua, W. F., et al. J. Biol. Chem. 281 (2006) 23514-23524). Studies of the human Fc-human FcRn complex have shown that residues I253, S254, H435, and Y436 are crucial for the interaction (Firan, M., et al., Int. Immunol. 13 (2001) 993; Shields, R. L., et al., J. Biol. Chem. 276 (2001) 6591-6604). In Yeung, Y. A., et al. (J. Immunol. 182 (2009) 7667-7671) various mutants of residues 248 to 259 and 301 to 317 and 376 to 382 and 424 to 437 have been reported and examined.

In one embodiment a pharmaceutically acceptable buffer substance is used in the FcRn affinity chromatography step or method, such as e.g. phosphoric acid or salts thereof, acetic acid or salts thereof, citric acid or salts thereof, morpholine, 2-(N-morpholino) ethanesulfonic acid (MES) or salts thereof, histidine or salts thereof, glycine or salts thereof, tris (hydroxymethyl) aminomethane (TRIS) or salts thereof, (4-(2-hydroxyethyl)-1-piperazineethanesulfonic acid (HEPES) or salts thereof.

In one embodiment the buffer substance is selected from phosphoric acid or salts thereof, or acetic acid or salts thereof, or citric acid or salts thereof, or histidine or salts thereof.

In one embodiment the buffer substance has a concentration of from 10 mM to 500 mM. In one embodiment the buffer substance has a concentration of from 10 mM to 300 mM. In one embodiment the buffer substance has a concentration of from 10 mM to 250 mM. In one embodiment the buffer substance has a concentration of from 10 mM to 100 mM. In one embodiment the buffer substance has a concentration of from 15 mM to 50 mM. In one embodiment the buffer substance has a concentration of about 20 mM.

In one embodiment the buffer substance in the solution with the first pH value and the buffer substance in the solution with the second pH value are the same buffer substance.

In one embodiment the buffer substance in the solution with the first pH value and the buffer substance in the solution with the second pH value are different buffer substances.

An exemplary solution with a first pH value comprises 20 mM MES and 150 mM NaCl, adjusted to pH 5.5.

An exemplary solution with a second pH value comprises 20 mM TRIS and 150 mM NaCl, adjusted to pH 8.8

An exemplary solution with a second pH value comprises 20 mM HEPES adjusted to pH 8.6.

An exemplary solution with a second pH value comprises 20 mM TRIS adjusted to pH 8.2.

In one embodiment the buffered solution comprises an additional salt. In one embodiment the additional salt is selected from sodium chloride, sodium sulphate, potassium chloride, potassium sulfate, sodium citrate, or potassium citrate. In one embodiment comprises the buffered solution of from 50 mM to 1000 mM of the additional salt. In one embodiment comprises the buffered solution of from 50 mM to 750 mM of the additional salt. In one embodiment comprises the buffered solution of from 50 mM to 500 mM of the additional salt. In one embodiment comprises the buffered solution of from 50 mM to 750 mM of the additional salt. In one embodiment comprises the buffered solution about 50 mM to about 300 mM of the additional salt.

In one embodiment the solution with a first and/or second pH value comprises sodium chloride. In one embodiment he the solution with a first and/or second pH value comprises of about 50 mM to about 300 mM sodium chloride.

Thus, an exemplary use is the use of a chromatography material comprising FcRn according to the current invention or as produced with a method according to the current invention as ligand for detecting FAB modification. In one embodiment the modification is glycosylation, or charge distribution.

In general, the retention time in the methods and uses as reported herein is depending on steepness of the pH gradient and the employed salt concentration. The wild-type antibody is used as reference and a weaker binding is indicated by a shorter retention time (=earlier elution) whereas a stronger binding is indicated by a longer retention time (=later elution), but still before a pH value of pH 7.4.

It has been found that different mutants of the Fc part of the IgG behave different on the FcRn column, displaying modified retention times.

It has been found that with the FcRn column as reported herein it is possible to identify FcRn binding relevant amino acids and to rank the mutants in comparison to the not modified wild-type antibody.

An exemplary use is the use of a chromatography material comprising FcRn according to the current invention or as produced with a method according to the current invention as ligand for identifying FcRn binding relevant amino acids and for ranking the mutants in comparison to the not modified wild-type antibody.

It has been found that antibodies that showed a late elution from the FcRn column, i.e. that had a longer retention time on the FcRn column, had a longer half-life in vivo.

An exemplary use is the use of a chromatography material comprising FcRn according to the current invention or as produced with a method according to the current invention as ligand for determining the in vivo half-life of an antibody.

It has been found that the analysis and removal of half antibodies in IgG preparations can be achieved by using an FcRn column as reported herein.

An exemplary use is the use of a chromatography material comprising FcRn according to the current invention or as produced with a method according to the current invention as ligand for the removal of half antibodies from IgG preparations.

It has been found that oligomers and aggregates can be separated by FcRn chromatography as reported herein.

An exemplary use is the use of a chromatography material comprising FcRn according to the current invention or as produced with a method according to the current invention as ligand for the removal of antibody aggregates and antibody oligomers from IgG preparations.

It has been found that the retention time is influenced by number of Fc parts comprised in the analyte molecule.

It has been found that oxidation had an impact on FcRn binding and could be determined on FcRn affinity chromatography columns by retention time difference.

It has been shown that the antibody format had no impact on the binding to the FcRn affinity chromatography column. Thus, the FcRn affinity chromatography column can be used for the evaluation of new antibody formats.

Some FcRn according to the current invention or as produced with a method according to the current invention is mono-biotinylated.

A chromatography material comprising FcRn according to the current invention or as produced with a method according to the current invention as ligand as reported herein can be used for the isolation/separation of antibody fragments and, thus, provides for an alternative to conventional Protein A affinity chromatography. In addition, by using the chromatography material as reported herein the separation can be effected at more physiological conditions, such as pH value, compared to conventional Protein A affinity chromatography.

The chromatography material comprising FcRn according to the current invention or as produced with a method according to the current invention as ligand can be used for the determination/separation/enrichment of antibody species comprising modifications such as e.g. oxidation, charge variants, glycosylation, and deamidation. The chromatography material comprising FcRn according to the current invention or as produced with a method according to the current invention as ligand can be used depending on the chosen pH gradient (start/end pH value) for the enrichment of certain antibody species.

The chromatography material comprising FcRn according to the current invention or as produced with a method according to the current invention as ligand can be used for the isolation/enrichment of antibodies species by molecular weight variation/difference.

The chromatography material comprising FcRn according to the current invention or as produced with a method according to the current invention as ligand can be used for the isolation/enrichment of antibodies by the number of FcRn binding site in the molecule.

The chromatography material comprising FcRn according to the current invention or as produced with a method according to the current invention as ligand can be used for the isolation of amino acid modifications. The chromatography material comprising FcRn according to the current invention or as produced with a method according to the current invention as ligand can be used for the isolation/separation of bispecific antibody mispairings such as hole-hole dimers and half antibodies.

Exemplary embodiments of the use of the FcRn according to the invention or produced with a method according to the invention are:

1. Use of an immobilized FcRn according to the current invention or as produced with a method according to the current invention as affinity chromatography ligand in an affinity chromatography with a positive linear pH gradient.
2. The use according to item 1, wherein it is in an affinity chromatography with a positive linear pH gradient for separating antibodies or fusion polypeptides comprising at least an Fc-region.
3. The use according to any one of items 1 to 2, wherein the α-FcRn and the β2m are independently of each other of human origin, or of mouse origin, or of cynomolgus origin.
4. The use according to any one of items 1 to 3, wherein the β2m is from the same species as the α-FcRn.
5. The use according to any one of items 1 to 4, wherein the α-FcRn and the β2m are the human wild-type the α-FcRn and the human wild-type the β2m each independently of each other with 0 to 10 amino acid residue modifications.
6. The use according to any one of items 1 to 5, wherein the FcRn according to the current invention or as produced with a method according to the current invention is bound to a solid phase.
7. The use according to item 6, wherein the solid phase is a chromatography material.
8. The use according to any one of items 6 to 7, wherein the FcRn according to the current invention or as produced with a method according to the current invention is biotinylated and the solid phase is derivatized with streptavidin.
9. The use according to any one of items 1 to 8, wherein the pH gradient is from a first pH value to a second pH value whereby the first pH value is from about pH 3.5 to about pH 7.5 and the second pH value is from about pH 6.0 to about pH 9.5.
10. The use according to any one of items 1 to 9, wherein the first pH value is about pH 5.5 and the second pH value is about pH 8.8.
11. The use according to any one of items 1 to 10, wherein the use is for the determination of the in vivo half-live of an antibody by determining the ratio of the retention times of the antibody and a reference antibody.
12. The use according to any one of items 1 to 10, wherein the use is for determining methionine oxidation of an antibody.
13. The use according to any one of items 1 to 10, wherein the use is for determining the oligomerization level of an antibody.
14. The use according to any one of items 1 to 10, wherein the use is for screening a library of modified antibodies or modified fusion polypeptides of a parent antibody or a parent fusion polypeptide which comprise at least an FcRn binding portion of an Fc-region for those modified antibodies or modified fusion polypeptides that have an altered binding affinity for FcRn compared to the parent antibody or parent fusion polypeptide.
15. The use according to any one of items 1 to 10, wherein the use is for identifying antibodies or fusion polypeptides that comprise at least an FcRn-binding portion of an Fc-region which exhibit altered binding to the neonatal Fc receptor.
16. The use according to any one of items 1 to 10, wherein the use is for the removal of half antibodies from IgG preparations.
17. The use according to any one of items 1 to 10, wherein the use is for the removal of antibody aggregates and antibody oligomers from IgG preparations.
18. The use according to any one of items 1 to 17, wherein the antibody is a monospecific antibody or antibody fragment of fusion polypeptide, or a bispecific antibody or antibody fragment of fusion polypeptide, or a trispecific antibody or antibody fragment of fusion polypeptide, or a tetraspecific antibody or antibody fragment of fusion polypeptide.

19. The use according to any one of items 1 to 18, wherein the use is for the separation of antibodies of the IgG1 subclass from antibodies of the IgG3 subclass.

The following examples and figures are provided to aid the understanding of the present invention, the true scope of which is set forth in the appended claims. It is understood that modifications can be made in the procedures set forth without departing from the spirit of the invention.

DESCRIPTION OF THE FIGURES

FIG. 1: Scheme of a two-plasmid RMCE strategy involving the use of three RRS sites to carry out two independent RMCEs simultaneously.

DESCRIPTION OF THE SEQUENCES

SEQ ID NO: 01: AviTag
SEQ ID NO: 02: HisAvi-tag
SEQ ID NO: 03: human α-FcRn extracellular domain without tag without leader peptide
SEQ ID NO: 04: human α-FcRn extracellular domain with tag without leader peptide
SEQ ID NO: 05: human α-FcRn extracellular domain without tag with leader peptide
SEQ ID NO: 06: human α-FcRn extracellular domain with tag with leader peptide
SEQ ID NO: 07: human β2m without leader peptide
SEQ ID NO: 08: human β2m with leader peptide
SEQ ID NO: 09: cynomolgus α-FcRn extracellular domain without tag without leader peptide
SEQ ID NO: 10 cynomolgus α-FcRn extracellular domain with tag without leader peptide
SEQ ID NO: 11: cynomolgus α-FcRn extracellular domain without tag with leader peptide
SEQ ID NO: 12: cynomolgus α-FcRn extracellular domain with tag with leader peptide
SEQ ID NO: 13: cynomolgus 132m without leader peptide
SEQ ID NO: 14: cynomolgus 132m with leader peptide
SEQ ID NO: 15: murine α-FcRn extracellular domain without tag without leader peptide
SEQ ID NO: 16: murine α-FcRn extracellular domain with tag without leader peptide
SEQ ID NO: 17: murine α-FcRn extracellular domain without tag with leader peptide
SEQ ID NO: 18: murine α-FcRn extracellular domain with tag with leader peptide
SEQ ID NO: 19: murine 132m without leader peptide
SEQ ID NO: 20: murine 132m with leader peptide
SEQ ID NO: 21: exemplary sequence of an E. coli BirA
SEQ ID NO: 22: exemplary sequence of an L3 recombinase recognition sequence
SEQ ID NO: 23: exemplary sequence of a 2L recombinase recognition sequence
SEQ ID NO: 24: exemplary sequence of a LoxFas recombinase recognition sequence
SEQ ID NO: 25-27: exemplary variants of human CMV promoter
SEQ ID NO: 28: exemplary SV40 polyadenylation signal sequence
SEQ ID NO: 29: exemplary bGH polyadenylation signal sequence
SEQ ID NO: 30: exemplary hGT terminator sequence
SEQ ID NO: 31: exemplary SV40 promoter sequence
SEQ ID NO: 32: exemplary GFP nucleic acid sequence

EXAMPLES

Example 1

General Techniques
Recombinant DNA Techniques
Standard methods were used to manipulate DNA as described in Sambrook et al., Molecular Cloning: A Laboratory Manual, Second Edition, Cold Spring Harbor Laboratory Press, Cold Spring Harbor, N.Y, (1989). The molecular biological reagents were used according to the manufacturer's instructions.
DNA Sequence Determination
DNA sequencing was performed at SequiServe GmbH (Vaterstetten, Germany)
DNA and Protein Sequence Analysis and Sequence Data Management
The EMBOSS (European Molecular Biology Open Software Suite) software package and Invitrogen's Vector NTI version 11.5 were used for sequence creation, mapping, analysis, annotation and illustration.

Example 2

Cloning of Targeted Integration Vectors
For the generation of stable CHO TI pools for the production of soluble human, murine and cynomolgus monkey FcRn plasmids must be designed and cloned. The cloning of the TI-vectors was performed in two cloning steps. In the first step the gene synthesis of the FcRn α-chain and β2-microglobulin was cloned in the pre-vectors under the control of the hCMV promoter. Both expression cassettes end with the poly-adenylation signal form bovine growth hormone (BGH poly (A)).
In the second cloning step the expression cassette of the previously cloned pre-vectors were cloned in the final TI-vectors. The final TI-vectors contains the expression cassettes of the FcRn α-chain with a His-Avi-Tag and that of the β2-microglobulin.
The TI-Plasmids for the murine and cynomolgus monkey FcRn were cloned analogously to the human FcRn.
The cDNAs encoding the extracellular domain of FcRn α-chain with a His-Avi-Tag and the 132m were generated for all three species by gene synthesis (Geneart, Life Technologies Inc.). The gene synthesis and the backbone-vectors were digested with HindIII-HF and EcoRI-HF (NEB) at 37° C. for 1 h and separated by agarose gel electrophoresis. The DNA-fragment of the insert and backbone were cut out from the agarose gel and extracted by QIAquick Gel Extraction Kit (Qiagen). The purified insert and backbone fragment was ligated via the Rapid Ligation Kit (Roche) following the manufacturer protocol with an Insert/Backbone ratio of 3:1. The ligation approach was then transformed in competent E. coli DH5a via heat shock for 30 sec. at 42° C. and incubated for 1 h at 37° C. before they were plated out on agar plates with ampicillin for selection. Plates were incubated at 37° C. overnight.
On the following day clones were picked and incubated overnight at 37° C. under shaking for the Mini or Maxi-Preparation, which was performed with the EpMotion® 5075 (Eppendorf) or with the QIAprep Spin Mini-Prep Kit (Qiagen)/NucleoBond Xtra Maxi EF Kit (Macherey & Nagel), respectively. All constructs were sequenced to ensure the absence of any undesirable mutations (Sequi-Serve GmbH).

In the second cloning step, the previously cloned vectors were digested with KpnI-HF/SalI-HF and SalI-HF/MfeI-HF with the same conditions as for the first cloning. The TI backbone vector was digested with KpnI-HF and MfeI-HF. Separation and extraction was performed as described above. Ligation of the purified insert and backbone was performed using T4 DNA Ligase (NEB) following the manufacturing protocol with an Insert/Insert/Backbone ratio of 1:1:1 overnight at 4° C. and inactivated at 65° C. for 10 min. The following cloning steps were performed as described above.

The cloned plasmids were used for the TI transfection and pool generation.

Example 3

BirA Amplification and Cloning

For in vivo biotinylation vectors were designed and cloned, which in addition to the FcRn α-chain and β2m contained the BirA gene, which catalyzes the biotinylation. The final TI vectors were also cloned in two steps. In the first step the BirA gene was amplified by PCR, digested with HindIII-HF/EcoRI-HF (NEB) and cloned in the backbone vector as described in Example 2.

In the second step the plasmids for α-FcRn, 132m and BirA-Ligase were digested with restriction enzymes and cloned in the respective TI vectors (see Example 2). The final plasmids were then used for the TI transfection and pool generation.

Example 4

TI-Transfection and Pool Generation

The transfection of CHO host cell line was performed by MaxCyte's Flow Electroporation® technology. Therefore, 3×10E7 cells for each approach were centrifuged and the supernatant discorded. Totally 30 μg DNA (25 μg plasmid and 5 μg recombinase plasmid) was added to the cells and all mixed with electroloading buffer (Hyclone, MaxCyte). The transfection was performed via MaxCyte electroporation. The cells were transferred after transfection into shake flask and incubated 30 min at 37° C. static. 30 mL recovery medium were added and the culture was swirled briefly. The cells were incubated by 37° C., 100 rpm, 5% $CO_2$, and 85% humidity. Two days after transfection, the transfection efficiency FACS was performed and the cells were expanded to 65 mL recovery medium.

On Day 5 the selection was started by media exchange. Therefore, 6×10E5 cells/ml were centrifuged and resuspended in 80 ml selection media I (chemically-defined medium, selection marker 1 & 2). The cells were incubated at 37° C., 150 rpm. 5% $CO_2$, and 85% humidity from this day on without splitting.

To promote the recovering of the cells, the selection pressure was reduced if the viability is >40% and the viable cell density (VCD) is >0.5×10E6 cells/mL. Therefore, 4×10E5 cells/ml were centrifuged and resuspended in 40 ml selection media II (chemically-defined medium, ½ selection marker 1 & 2). The cells were incubated with the same conditions as before and also not splitted.

At a viability >80% the RMCE efficiency FACS was performed and the cells were passaged through splitting to 4×10E5 cells/mL in 40 mL every three or four days. When the viability is >95% the shake flask production was set up.

The viability and viable cell density (VCD) was checked over the whole process by CEDEX Analyzer.

Example 5

FACS Screening

FACS analysis was performed to check the transfection efficiency and the RMCE efficiency of the transfection. 4×10E5 cells of the transfected approaches were centrifuged (1200 rpm, 4 min.) and washed twice with 1 mL PBS. After the washing steps with PBS the pellet was resuspended in 400 μL PBS and transferred in FACS tubes (Falcon® Round-Bottom Tubes with cell strainer cap; Coming). The measurement was performed with a FACS Canto II and the data were analyzed by the software FlowJo.

Example 6

Fed-Batch Shake Flask Production

The Fed-Batch production was in shake flasks. Therefore, the cells were seeded in a density of 1×10E6 cells/mL in 40 mL defined medium (Fed Batch medium I). On day 3, 7 and 10 the cells were fed. Viability and VCD measurements were performed by CEDEX Analyzer. The supernatant was harvested 14 days after start of fed-batch by centrifugation (10 min, 1000 rpm and 10 min, 4000 rpm) and cleared by filtration (0.22 μm).

A second chemically defined medium (Fed Batch medium II) was used for the second fed-batch. Therefore, the cells were seeded in a density of 2×10E6 cells/mL in 30 mL medium. From day three on, the cells were fed. Glucose concentration was measured on day 3, 5, 7, 10, 12 and 14 and stocked up to a concentration of 10 g/L if the concentration was <7 g/L. Further, the biotin concentration was determined on the same days as the glucose concentration to avoid a lack of biotin. Viability and VCD measurements were performed by CEDEX Analyzer. The supernatant was harvested 14 days after fed-batch start by centrifugation (10 min, 1000 rpm and 10 min, 4000 rpm) and cleared by filtration (0.22 μm).

Example 7

Transient Transfection of Human FcRn in HEK293F

A transient transfection with human FcRn in HEK293F cells was performed. HEK293F cells were seeded with a density of 2.6×10E6 cells/mL on day of transfection. 20 μg of DNA were mixed with 1.6 mL Opti-Mem (for 40 ml) and incubated for 5 min. 50 μl PEIpro was added to the DNA/medium mixture and incubated for another 8 min. The DNA/medium/PEIpro mixture was added slowly to the cells and they were incubated by 37° C., 120 rpm., 7% $CO_2$, and 80% humidity. 5 h after transfection valproic acid was added. The cells were fed 24 h after transfection with glucose and Feed. On day 7 the cells were harvested by centrifugation (5 min 1000 rpm, 20 min 4000 rpm) and cleared by filtration (0.22 μm).

Example 8

Purification of FcRn

The FcRn of all three species was tagged with an HisAvi-Tag. This Tag was used to purify the FcRn. In the first purification step the clarified supernatants from the fed-batch were loaded on a Ni-NTA affinity chromatography (5 ml HiTrap Ni Sepharose, GE Healthcare). After two wash steps with 20 mM sodium phosphate buffer comprising 500 mM NaCl at pH 7.4 (buffer A), without imidazole in the first wash and 20 mM imidazole in a second wash, proteins were eluted at a flow rate of 3 ml/min with the same buffer containing 300 mM imidazole. The elution was performed by a step elution with an imidazole concentration of 4%, 60% and 100%. The column was regenerated using buffer A after each run.

Fractions were pooled and concentrated (Amicon® Ultra 15 ml, Millipore) up to a volume <9 ml before they were further purified by size exclusion chromatography (SEC, Superdex™ 200, GE Healthcare). The samples were injected with a flow rate of 3 ml/min and eluted with the same flow rate in 20 mM sodium citrate, 150 mM KCl buffer at pH 5.5.

Chromatography's was performed on a ÄKTA Avant chromatography system and recorded, controlled and evaluated with the UNICORN 7.3 software.

Purified proteins were quantified using Nanodrop spectrophotometer (Nanodrop Technologies) and analyzed by analytical SEC (Superdex™ 75, GE Healthcare) and CE-SDS (Caliper life science, PerkinElmer Company) under non-reducing and reducing conditions, after each purification step.

Analytical SEC was performed with 50 µg sample on a high performance liquid chromatography (HPLC) and analyzed by the Chromeleon 7.2 software.

For the CE-SDS the samples were mixed with the corresponding sample buffer mixture (Caliper Life Sciences) (5 µL sample, 35 µl sample buffer) and for reducing conditions 5 µL NuPAGE sample reducing Agent (Invitrogen) was added to 30 µL sample buffer and also mixed with 5 µL sample. Then the samples were heated at 70° C. for 10 min and 70 µl Milli-Q water was added. The samples were measured with a Caliper LabChip GXII System.

Example 9

Biotinylation of Purified FcRn

To couple FcRn to the streptavidin sepharose beads, 15 mg of the purified FcRn were biotinylated using the biotinylation kit from Avidity according to the manufacturer's instruction. The reaction was performed at 30° C. and 300 rpm overnight. The biotinylated proteins were purified via SEC (Superdex™ 200, GE Healthcare) to remove excess biotin. Therefore, the samples were injected with a flow rate of 2.5 ml/min and eluted with the same buffer and at a flow rate of 3 ml/min. Fractions were pooled and concentrated (Amicon® Ultra 15 ml, Millipore). Biotinylated Proteins were quantified by Nanodrop spectrophotometer and analyzed via CE-SDS (Caliper life science, PerkinElmer Company) and analytical SEC (Superdex™ 75, GE Healthcare).

Streptavidin-biotin interaction was used to determine the biotinylation level of the approaches. Samples were provided 1:1 with streptavidin (SA) (50 µg sample and streptavidin) and an analytical SEC (Superdex™ 75, GE Healthcare) was performed. Through the binding of streptavidin to the biotinylated molecule, the molecular weight increases about 52 kDa. Thus, the SEC can distinguish between the converted FcRn, which is biotinylated and interact with SA, and the unconverted FcRn, which is not biotinylated. The biotinylation level is determine from the ratio of converted to unconverted FcRn.

Example 10

FcRn Column Preparation

The purified and biotinylated FcRn was bound to the beads via biotin/streptavidin interaction. Therefore, 1 mL sepharose streptavidin beads (GE Healthcare) were washed with $H_2O$ and then buffered in 20 mM 2-(N-morpholino) ethanesulfonic acid (MES), 140 mM NaCl at pH 5.5 (buffer A). Biotinylated FcRn was subsequently added to the prepared sepharose streptavidin beads and incubated overnight by rotation. The FcRn derivatized beads were filled in a 4.6×50 mm chromatographic column (Tricorn 5/50 column, GE Healthcare) and were thereafter equilibrated with buffer A. To test the quality of the packed column, a standard was applied to the column. If the standard shows the typical chromatogram, the column can be used for further measurements. As standard an oxidized mAb was used. The antibody was oxidized with 0.01% (v/v) $H_2O_2$ for 18 h in the dark and at RT. The oxidation quality was tested before the mAb—ox was dialyzed overnight.

Example 11

FcRn Affinity Chromatography

The FcRn affinity column was used on a HPLC system. The column temperature was 25° C. The column was equilibrated with 20 mM 2-(N-morpholino) ethanesulfonic acid (MES), 140 mM NaCl at pH 5.5 (buffer A) at 0.3 ml/min. 30 µg of each sample were subsequently injected in separate runs onto the FcRn column in a volume of 100 µl His-His/HCl buffer pH 5.5. The samples were eluted by a continuous gradient to 100% 20 mM Tris, 140 mM NaCl at pH 8.8 (buffer B) with a flow rate of 0.5 ml/min. The column was regenerated using buffer A after each run to get a pH of 6.0. Standard was injected at the beginning and the end of the chromatographic sequence. If more than 10 samples were run, a standard is injected after each 10 samples. The elution profile was obtained by continuous measurement of the absorbance at 280 nm. Furthermore, the pH was recorded during elution to determine the exact pH at which the sample eluted.

---

What is claimed is:

1. A method for producing C-terminally biotinylated FcRn comprising the steps of
   a) cultivating a mammalian cell comprising a deoxyribonucleic acid encoding FcRn and biotin-[acetyl-CoA-carboxylase] ligase (BirA) in a biotin containing medium, and
   b) recovering C-terminally biotinylated FcRn from the cell or the cultivation medium, wherein the deoxyribonucleic acid encoding FcRn and BirA is stably integrated into the genome of the mammalian cell and comprises in 5'- to 3'-direction
   a first expression cassette encoding class I major histocompatibility complex-like protein (α-FcRn) comprising an Avi-tag at the C-terminus,
   a second expression cassette encoding β2-microglobulin (β2m),
   a third expression cassette encoding α-FcRn comprising an Avi-tag at the C-terminus,
   a fourth expression cassette encoding β2m, and
   a fifth expression cassette encoding biotin-[acetyl-CoA-carboxylase] ligase.

2. The method according to claim 1, wherein the deoxyribonucleic acid encoding FcRn and BirA further comprises
   a first recombination recognition sequence located 5' to the first expression cassette, a second recombination recognition sequence located 3' to the fifth expression cassette, and a third recombination recognition sequence located between the second and the third expression cassette, and wherein all recombination recognition sequences are different.

3. The method according to claim 2, wherein the deoxyribonucleic acid encoding FcRn and BirA comprises a further expression cassette encoding a selection marker, wherein the expression cassette comprises a 5'-located part and a 3'-located part third, wherein the 5'-located part of said expression cassette comprises the promoter and a start-codon and is located 5' to the third recombination recognition sequences, and the 3'-located part of said expression cassette comprises the coding sequence without a start-codon and a polyA signal and is located 3' to the third recombination recognition sequences.

4. The method according to claim 3, wherein each of the expression cassettes comprise in 5'-to-3' direction a promoter, a coding sequence and a polyadenylation signal sequence optionally followed by a terminatorsequence.

5. The method according to claim 4, wherein the promoter is a human CMV promoter with intron A, the polyadenylation signal sequence is a bGH polyA site and the terminator sequence is an hGT terminator except for the expression cassette of the selection marker, wherein the promoter is an SV40 promoter and the polyadenylation signal sequence site is an SV40 polyA site and a terminator sequence is absent.

6. The method according to claim 5, wherein the mammalian cell is a CHO cell.

7. The method according to claim 6, wherein the FcRn is human FcRn, the class I major histocompatibility complex-like protein ($\alpha$-FcRn) is human class I major histocompatibility complex-like protein ($\alpha$-FcRn), and the $\beta$2-microglobulin ($\beta$2m) is human $\beta$2-microglobulin ($\beta$2m).

8. The method according to claim 6, wherein the FcRn is murine FcRn, the class I major histocompatibility complex-like protein ($\alpha$-FcRn) is murine class I major histocompatibility complex-like protein ($\alpha$-FcRn), and the $\beta$2-microglobulin ($\beta$2m) is murine $\beta$2-microglobulin ($\beta\lambda$m).

9. The method according to claim 6, wherein the FcRn is cynomolgus FcRn, the class I major histocompatibility complex-like protein ($\alpha$-FcRn) is cynomolgus class I major histocompatibility complex-like protein ($\alpha$-FcRn), and the $\beta$2-microglobulin ($\beta$2m) is cynomolgus $\beta$2-microglobulin ($\beta$2m).

\* \* \* \* \*

SEQUENCE LISTING

```
<160> NUMBER OF SEQ ID NOS: 32

<210> SEQ ID NO 1
<211> LENGTH: 15
<212> TYPE: PRT
<213> ORGANISM: Escherichia coli

<400> SEQUENCE: 1

Gly Leu Asn Asp Ile Phe Glu Ala Gln Lys Ile Glu Trp His Glu
1               5                   10                  15

<210> SEQ ID NO 2
<211> LENGTH: 26
```

<212> TYPE: PRT
<213> ORGANISM: Artificial Sequence
<220> FEATURE:
<223> OTHER INFORMATION: HIS-AVITAG

<400> SEQUENCE: 2

His His His His His His His His His Ile Gly Leu Asn Asp Ile
1               5                   10                  15

Phe Glu Ala Gln Lys Ile Glu Trp His Glu
            20                  25

<210> SEQ ID NO 3
<211> LENGTH: 274
<212> TYPE: PRT
<213> ORGANISM: Homo sapiens

<400> SEQUENCE: 3

Ala Glu Ser His Leu Ser Leu Leu Tyr His Leu Thr Ala Val Ser Ser
1               5                   10                  15

Pro Ala Pro Gly Thr Pro Ala Phe Trp Val Ser Gly Trp Leu Gly Pro
            20                  25                  30

Gln Gln Tyr Leu Ser Tyr Asn Ser Leu Arg Gly Glu Ala Glu Pro Cys
        35                  40                  45

Gly Ala Trp Val Trp Glu Asn Gln Val Ser Trp Tyr Trp Glu Lys Glu
    50                  55                  60

Thr Thr Asp Leu Arg Ile Lys Glu Lys Leu Phe Leu Glu Ala Phe Lys
65                  70                  75                  80

Ala Leu Gly Gly Lys Gly Pro Tyr Thr Leu Gln Gly Leu Leu Gly Cys
                85                  90                  95

Glu Leu Gly Pro Asp Asn Thr Ser Val Pro Thr Ala Lys Phe Ala Leu
            100                 105                 110

Asn Gly Glu Glu Phe Met Asn Phe Asp Leu Lys Gln Gly Thr Trp Gly
        115                 120                 125

Gly Asp Trp Pro Glu Ala Leu Ala Ile Ser Gln Arg Trp Gln Gln Gln
    130                 135                 140

Asp Lys Ala Ala Asn Lys Glu Leu Thr Phe Leu Leu Phe Ser Cys Pro
145                 150                 155                 160

His Arg Leu Arg Glu His Leu Glu Arg Gly Arg Gly Asn Leu Glu Trp
                165                 170                 175

Lys Glu Pro Pro Ser Met Arg Leu Lys Ala Arg Pro Ser Ser Pro Gly
            180                 185                 190

Phe Ser Val Leu Thr Cys Ser Ala Phe Ser Phe Tyr Pro Pro Glu Leu
        195                 200                 205

Gln Leu Arg Phe Leu Arg Asn Gly Leu Ala Ala Gly Thr Gly Gln Gly
    210                 215                 220

Asp Phe Gly Pro Asn Ser Asp Gly Ser Phe His Ala Ser Ser Ser Leu
225                 230                 235                 240

Thr Val Lys Ser Gly Asp Glu His His Tyr Cys Cys Ile Val Gln His
                245                 250                 255

Ala Gly Leu Ala Gln Pro Leu Arg Val Glu Leu Glu Ser Pro Ala Lys
            260                 265                 270

Ser Ser

<210> SEQ ID NO 4
<211> LENGTH: 302
<212> TYPE: PRT
<213> ORGANISM: Artificial Sequence
<220> FEATURE:
<223> OTHER INFORMATION: hu a-FcRn w/ tag w/ leader

<400> SEQUENCE: 4

```
Ala Glu Ser His Leu Ser Leu Leu Tyr His Leu Thr Ala Val Ser Ser
1               5                   10                  15

Pro Ala Pro Gly Thr Pro Ala Phe Trp Val Ser Gly Trp Leu Gly Pro
            20                  25                  30

Gln Gln Tyr Leu Ser Tyr Asn Ser Leu Arg Gly Glu Ala Glu Pro Cys
        35                  40                  45

Gly Ala Trp Val Trp Glu Asn Gln Val Ser Trp Tyr Trp Glu Lys Glu
    50                  55                  60

Thr Thr Asp Leu Arg Ile Lys Glu Lys Leu Phe Leu Glu Ala Phe Lys
65                  70                  75                  80

Ala Leu Gly Gly Lys Gly Pro Tyr Thr Leu Gln Gly Leu Leu Gly Cys
                85                  90                  95

Glu Leu Gly Pro Asp Asn Thr Ser Val Pro Thr Ala Lys Phe Ala Leu
            100                 105                 110

Asn Gly Glu Glu Phe Met Asn Phe Asp Leu Lys Gln Gly Thr Trp Gly
        115                 120                 125

Gly Asp Trp Pro Glu Ala Leu Ala Ile Ser Gln Arg Trp Gln Gln Gln
    130                 135                 140

Asp Lys Ala Ala Asn Lys Glu Leu Thr Phe Leu Leu Phe Ser Cys Pro
145                 150                 155                 160

His Arg Leu Arg Glu His Leu Glu Arg Gly Arg Gly Asn Leu Glu Trp
                165                 170                 175

Lys Glu Pro Pro Ser Met Arg Leu Lys Ala Arg Pro Ser Ser Pro Gly
            180                 185                 190

Phe Ser Val Leu Thr Cys Ser Ala Phe Ser Phe Tyr Pro Pro Glu Leu
        195                 200                 205

Gln Leu Arg Phe Leu Arg Asn Gly Leu Ala Ala Gly Thr Gly Gln Gly
    210                 215                 220

Asp Phe Gly Pro Asn Ser Asp Gly Ser Phe His Ala Ser Ser Ser Leu
225                 230                 235                 240

Thr Val Lys Ser Gly Asp Glu His His Tyr Cys Cys Ile Val Gln His
                245                 250                 255

Ala Gly Leu Ala Gln Pro Leu Arg Val Glu Leu Glu Ser Pro Ala Lys
            260                 265                 270

Ser Ser Leu Glu His His His His His His His His Ile Gly
    275                 280                 285

Leu Asn Asp Ile Phe Glu Ala Gln Lys Ile Glu Trp His Glu
    290                 295                 300
```

<210> SEQ ID NO 5
<211> LENGTH: 290
<212> TYPE: PRT
<213> ORGANISM: Homo sapiens

<400> SEQUENCE: 5

```
Met Pro Leu Leu Leu Leu Leu Pro Leu Leu Trp Ala Gly Ala Leu Ala
1               5                   10                  15

Ala Glu Ser His Leu Ser Leu Leu Tyr His Leu Thr Ala Val Ser Ser
            20                  25                  30

Pro Ala Pro Gly Thr Pro Ala Phe Trp Val Ser Gly Trp Leu Gly Pro
        35                  40                  45
```

```
Gln Gln Tyr Leu Ser Tyr Asn Ser Leu Arg Gly Glu Ala Glu Pro Cys
        50                  55                  60

Gly Ala Trp Val Trp Glu Asn Gln Val Ser Trp Tyr Trp Glu Lys Glu
 65                  70                  75                  80

Thr Thr Asp Leu Arg Ile Lys Glu Lys Leu Phe Leu Glu Ala Phe Lys
                 85                  90                  95

Ala Leu Gly Gly Lys Gly Pro Tyr Thr Leu Gln Gly Leu Leu Gly Cys
             100                 105                 110

Glu Leu Gly Pro Asp Asn Thr Ser Val Pro Thr Ala Lys Phe Ala Leu
         115                 120                 125

Asn Gly Glu Glu Phe Met Asn Phe Asp Leu Lys Gln Gly Thr Trp Gly
130                 135                 140

Gly Asp Trp Pro Glu Ala Leu Ala Ile Ser Gln Arg Trp Gln Gln Gln
145                 150                 155                 160

Asp Lys Ala Ala Asn Lys Glu Leu Thr Phe Leu Leu Phe Ser Cys Pro
                 165                 170                 175

His Arg Leu Arg Glu His Leu Glu Arg Gly Arg Gly Asn Leu Glu Trp
             180                 185                 190

Lys Glu Pro Pro Ser Met Arg Leu Lys Ala Arg Pro Ser Ser Pro Gly
         195                 200                 205

Phe Ser Val Leu Thr Cys Ser Ala Phe Ser Phe Tyr Pro Pro Glu Leu
210                 215                 220

Gln Leu Arg Phe Leu Arg Asn Gly Leu Ala Ala Gly Thr Gly Gln Gly
225                 230                 235                 240

Asp Phe Gly Pro Asn Ser Asp Gly Ser Phe His Ala Ser Ser Ser Leu
                 245                 250                 255

Thr Val Lys Ser Gly Asp Glu His His Tyr Cys Cys Ile Val Gln His
             260                 265                 270

Ala Gly Leu Ala Gln Pro Leu Arg Val Glu Leu Glu Ser Pro Ala Lys
         275                 280                 285

Ser Ser
    290

<210> SEQ ID NO 6
<211> LENGTH: 318
<212> TYPE: PRT
<213> ORGANISM: Artificial Sequence
<220> FEATURE:
<223> OTHER INFORMATION: hu a-FcRn w/ tag w/ leader

<400> SEQUENCE: 6

Met Pro Leu Leu Leu Leu Leu Pro Leu Leu Trp Ala Gly Ala Leu Ala
 1               5                  10                  15

Ala Glu Ser His Leu Ser Leu Leu Tyr His Leu Thr Ala Val Ser Ser
                 20                  25                  30

Pro Ala Pro Gly Thr Pro Ala Phe Trp Val Ser Gly Trp Leu Gly Pro
             35                  40                  45

Gln Gln Tyr Leu Ser Tyr Asn Ser Leu Arg Gly Glu Ala Glu Pro Cys
        50                  55                  60

Gly Ala Trp Val Trp Glu Asn Gln Val Ser Trp Tyr Trp Glu Lys Glu
 65                  70                  75                  80

Thr Thr Asp Leu Arg Ile Lys Glu Lys Leu Phe Leu Glu Ala Phe Lys
                 85                  90                  95

Ala Leu Gly Gly Lys Gly Pro Tyr Thr Leu Gln Gly Leu Leu Gly Cys
             100                 105                 110
```

```
Glu Leu Gly Pro Asp Asn Thr Ser Val Pro Thr Ala Lys Phe Ala Leu
            115                 120                 125

Asn Gly Glu Glu Phe Met Asn Phe Asp Leu Lys Gln Gly Thr Trp Gly
130                 135                 140

Gly Asp Trp Pro Glu Ala Leu Ala Ile Ser Gln Arg Trp Gln Gln Gln
145                 150                 155                 160

Asp Lys Ala Ala Asn Lys Glu Leu Thr Phe Leu Leu Phe Ser Cys Pro
                165                 170                 175

His Arg Leu Arg Glu His Leu Glu Arg Gly Arg Gly Asn Leu Glu Trp
            180                 185                 190

Lys Glu Pro Pro Ser Met Arg Leu Lys Ala Arg Pro Ser Ser Pro Gly
195                 200                 205

Phe Ser Val Leu Thr Cys Ser Ala Phe Ser Phe Tyr Pro Pro Glu Leu
210                 215                 220

Gln Leu Arg Phe Leu Arg Asn Gly Leu Ala Ala Gly Thr Gly Gln Gly
225                 230                 235                 240

Asp Phe Gly Pro Asn Ser Asp Gly Ser Phe His Ala Ser Ser Ser Leu
                245                 250                 255

Thr Val Lys Ser Gly Asp Glu His His Tyr Cys Cys Ile Val Gln His
            260                 265                 270

Ala Gly Leu Ala Gln Pro Leu Arg Val Glu Leu Glu Ser Pro Ala Lys
        275                 280                 285

Ser Ser Leu Glu His His His His His His His His Ile Gly
290                 295                 300

Leu Asn Asp Ile Phe Glu Ala Gln Lys Ile Glu Trp His Glu
305                 310                 315

<210> SEQ ID NO 7
<211> LENGTH: 99
<212> TYPE: PRT
<213> ORGANISM: Homo sapiens

<400> SEQUENCE: 7

Ile Gln Arg Thr Pro Lys Ile Gln Val Tyr Ser Arg His Pro Ala Glu
1               5                   10                  15

Asn Gly Lys Ser Asn Phe Leu Asn Cys Tyr Val Ser Gly Phe His Pro
            20                  25                  30

Ser Asp Ile Glu Val Asp Leu Leu Lys Asn Gly Glu Arg Ile Glu Lys
        35                  40                  45

Val Glu His Ser Asp Leu Ser Phe Ser Lys Asp Trp Ser Phe Tyr Leu
    50                  55                  60

Leu Tyr Tyr Thr Glu Phe Thr Pro Thr Glu Lys Asp Glu Tyr Ala Cys
65                  70                  75                  80

Arg Val Asn His Val Thr Leu Ser Gln Pro Lys Ile Val Lys Trp Asp
                85                  90                  95

Arg Asp Met

<210> SEQ ID NO 8
<211> LENGTH: 119
<212> TYPE: PRT
<213> ORGANISM: Homo sapiens

<400> SEQUENCE: 8

Met Ser Arg Ser Val Ala Leu Ala Val Leu Ala Leu Leu Ser Leu Ser
1               5                   10                  15

Gly Leu Glu Ala Ile Gln Arg Thr Pro Lys Ile Gln Val Tyr Ser Arg
```

```
                    20                  25                  30
His Pro Ala Glu Asn Gly Lys Ser Asn Phe Leu Asn Cys Tyr Val Ser
                35                  40                  45

Gly Phe His Pro Ser Asp Ile Glu Val Asp Leu Leu Lys Asn Gly Glu
            50                  55                  60

Arg Ile Glu Lys Val Glu His Ser Asp Leu Ser Phe Ser Lys Asp Trp
65                  70                  75                  80

Ser Phe Tyr Leu Leu Tyr Tyr Thr Glu Phe Thr Pro Thr Glu Lys Asp
                85                  90                  95

Glu Tyr Ala Cys Arg Val Asn His Val Thr Leu Ser Gln Pro Lys Ile
            100                 105                 110

Val Lys Trp Asp Arg Asp Met
            115

<210> SEQ ID NO 9
<211> LENGTH: 274
<212> TYPE: PRT
<213> ORGANISM: Macaca fascicularis

<400> SEQUENCE: 9

Ala Glu Ser His Leu Ser Leu Leu Tyr His Leu Thr Ala Val Ser Ser
1               5                   10                  15

Pro Ala Pro Gly Thr Pro Ala Phe Trp Val Ser Gly Trp Leu Gly Pro
                20                  25                  30

Gln Gln Tyr Leu Ser Tyr Asp Ser Leu Arg Gly Gln Ala Glu Pro Cys
                35                  40                  45

Gly Ala Trp Val Trp Glu Asn Gln Val Ser Trp Tyr Trp Glu Lys Glu
            50                  55                  60

Thr Thr Asp Leu Arg Ile Lys Glu Lys Leu Phe Leu Glu Ala Phe Lys
65                  70                  75                  80

Ala Leu Gly Gly Lys Gly Pro Tyr Thr Leu Gln Gly Leu Leu Gly Cys
                85                  90                  95

Glu Leu Ser Pro Asp Asn Thr Ser Val Pro Thr Ala Lys Phe Ala Leu
            100                 105                 110

Asn Gly Glu Glu Phe Met Asn Phe Asp Leu Lys Gln Gly Thr Trp Gly
            115                 120                 125

Gly Asp Trp Pro Glu Ala Leu Ala Ile Ser Gln Arg Trp Gln Gln Gln
            130                 135                 140

Asp Lys Ala Ala Asn Lys Glu Leu Thr Phe Leu Leu Phe Ser Cys Pro
145                 150                 155                 160

His Arg Leu Arg Glu His Leu Glu Arg Gly Arg Gly Asn Leu Glu Trp
                165                 170                 175

Lys Glu Pro Pro Ser Met Arg Leu Lys Ala Arg Pro Gly Asn Pro Gly
            180                 185                 190

Phe Ser Val Leu Thr Cys Ser Ala Phe Ser Phe Tyr Pro Pro Glu Leu
                195                 200                 205

Gln Leu Arg Phe Leu Arg Asn Gly Met Ala Ala Gly Thr Gly Gln Gly
            210                 215                 220

Asp Phe Gly Pro Asn Ser Asp Gly Ser Phe His Ala Ser Ser Ser Leu
225                 230                 235                 240

Thr Val Lys Ser Gly Asp Glu His His Tyr Cys Cys Ile Val Gln His
                245                 250                 255

Ala Gly Leu Ala Gln Pro Leu Arg Val Glu Leu Glu Thr Pro Ala Lys
            260                 265                 270
```

Ser Ser

<210> SEQ ID NO 10
<211> LENGTH: 302
<212> TYPE: PRT
<213> ORGANISM: Artificial Sequence
<220> FEATURE:
<223> OTHER INFORMATION: cy a-FcRn w/ tag w/ leader

<400> SEQUENCE: 10

```
Ala Glu Ser His Leu Ser Leu Leu Tyr His Leu Thr Ala Val Ser Ser
1               5                   10                  15

Pro Ala Pro Gly Thr Pro Ala Phe Trp Val Ser Gly Trp Leu Gly Pro
                20                  25                  30

Gln Gln Tyr Leu Ser Tyr Asp Ser Leu Arg Gly Gln Ala Glu Pro Cys
            35                  40                  45

Gly Ala Trp Val Trp Glu Asn Gln Val Ser Trp Tyr Trp Glu Lys Glu
    50                  55                  60

Thr Thr Asp Leu Arg Ile Lys Glu Lys Leu Phe Leu Glu Ala Phe Lys
65                  70                  75                  80

Ala Leu Gly Gly Lys Gly Pro Tyr Thr Leu Gln Gly Leu Leu Gly Cys
                85                  90                  95

Glu Leu Ser Pro Asp Asn Thr Ser Val Pro Thr Ala Lys Phe Ala Leu
            100                 105                 110

Asn Gly Glu Glu Phe Met Asn Phe Asp Leu Lys Gln Gly Thr Trp Gly
        115                 120                 125

Gly Asp Trp Pro Glu Ala Leu Ala Ile Ser Gln Arg Trp Gln Gln Gln
    130                 135                 140

Asp Lys Ala Ala Asn Lys Glu Leu Thr Phe Leu Leu Phe Ser Cys Pro
145                 150                 155                 160

His Arg Leu Arg Glu His Leu Glu Arg Gly Arg Gly Asn Leu Glu Trp
                165                 170                 175

Lys Glu Pro Pro Ser Met Arg Leu Lys Ala Arg Pro Gly Asn Pro Gly
            180                 185                 190

Phe Ser Val Leu Thr Cys Ser Ala Phe Ser Phe Tyr Pro Pro Glu Leu
        195                 200                 205

Gln Leu Arg Phe Leu Arg Asn Gly Met Ala Ala Gly Thr Gly Gln Gly
    210                 215                 220

Asp Phe Gly Pro Asn Ser Asp Gly Ser Phe His Ala Ser Ser Ser Leu
225                 230                 235                 240

Thr Val Lys Ser Gly Asp Glu His His Tyr Cys Cys Ile Val Gln His
                245                 250                 255

Ala Gly Leu Ala Gln Pro Leu Arg Val Glu Leu Glu Thr Pro Ala Lys
            260                 265                 270

Ser Ser Leu Glu His His His His His His His His Ile Gly
        275                 280                 285

Leu Asn Asp Ile Phe Glu Ala Gln Lys Ile Glu Trp His Glu
    290                 295                 300
```

<210> SEQ ID NO 11
<211> LENGTH: 290
<212> TYPE: PRT
<213> ORGANISM: Macaca fascicularis

<400> SEQUENCE: 11

```
Met Pro Leu Leu Leu Leu Leu Pro Leu Leu Trp Ala Gly Ala Leu Ala
1               5                   10                  15
```

Ala Glu Ser His Leu Ser Leu Leu Tyr His Leu Thr Ala Val Ser Ser
            20                  25                  30

Pro Ala Pro Gly Thr Pro Ala Phe Trp Val Ser Gly Trp Leu Gly Pro
        35                  40                  45

Gln Gln Tyr Leu Ser Tyr Asp Ser Leu Arg Gly Gln Ala Glu Pro Cys
    50                  55                  60

Gly Ala Trp Val Trp Glu Asn Gln Val Ser Trp Tyr Trp Glu Lys Glu
65                  70                  75                  80

Thr Thr Asp Leu Arg Ile Lys Glu Lys Leu Phe Leu Glu Ala Phe Lys
                85                  90                  95

Ala Leu Gly Gly Lys Gly Pro Tyr Thr Leu Gln Gly Leu Leu Gly Cys
            100                 105                 110

Glu Leu Ser Pro Asp Asn Thr Ser Val Pro Thr Ala Lys Phe Ala Leu
        115                 120                 125

Asn Gly Glu Glu Phe Met Asn Phe Asp Leu Lys Gln Gly Thr Trp Gly
130                 135                 140

Gly Asp Trp Pro Glu Ala Leu Ala Ile Ser Gln Arg Trp Gln Gln Gln
145                 150                 155                 160

Asp Lys Ala Ala Asn Lys Glu Leu Thr Phe Leu Leu Phe Ser Cys Pro
                165                 170                 175

His Arg Leu Arg Glu His Leu Glu Arg Gly Arg Gly Asn Leu Glu Trp
            180                 185                 190

Lys Glu Pro Pro Ser Met Arg Leu Lys Ala Arg Pro Gly Asn Pro Gly
        195                 200                 205

Phe Ser Val Leu Thr Cys Ser Ala Phe Ser Phe Tyr Pro Pro Glu Leu
210                 215                 220

Gln Leu Arg Phe Leu Arg Asn Gly Met Ala Ala Gly Thr Gly Gln Gly
225                 230                 235                 240

Asp Phe Gly Pro Asn Ser Asp Gly Ser Phe His Ala Ser Ser Ser Leu
                245                 250                 255

Thr Val Lys Ser Gly Asp Glu His His Tyr Cys Cys Ile Val Gln His
            260                 265                 270

Ala Gly Leu Ala Gln Pro Leu Arg Val Glu Leu Glu Thr Pro Ala Lys
        275                 280                 285

Ser Ser
    290

<210> SEQ ID NO 12
<211> LENGTH: 318
<212> TYPE: PRT
<213> ORGANISM: Artificial Sequence
<220> FEATURE:
<223> OTHER INFORMATION: cy a-FcRn w/ tag w/ leader

<400> SEQUENCE: 12

Met Pro Leu Leu Leu Leu Pro Leu Leu Trp Ala Gly Ala Leu Ala
1               5                   10                  15

Ala Glu Ser His Leu Ser Leu Leu Tyr His Leu Thr Ala Val Ser Ser
            20                  25                  30

Pro Ala Pro Gly Thr Pro Ala Phe Trp Val Ser Gly Trp Leu Gly Pro
        35                  40                  45

Gln Gln Tyr Leu Ser Tyr Asp Ser Leu Arg Gly Gln Ala Glu Pro Cys
    50                  55                  60

Gly Ala Trp Val Trp Glu Asn Gln Val Ser Trp Tyr Trp Glu Lys Glu
65                  70                  75                  80

-continued

Thr Thr Asp Leu Arg Ile Lys Glu Lys Leu Phe Leu Glu Ala Phe Lys
                85                  90                  95

Ala Leu Gly Gly Lys Gly Pro Tyr Thr Leu Gln Gly Leu Leu Gly Cys
            100                 105                 110

Glu Leu Ser Pro Asp Asn Thr Ser Val Pro Thr Ala Lys Phe Ala Leu
        115                 120                 125

Asn Gly Glu Glu Phe Met Asn Phe Asp Leu Lys Gln Gly Thr Trp Gly
    130                 135                 140

Gly Asp Trp Pro Glu Ala Leu Ala Ile Ser Gln Arg Trp Gln Gln Gln
145                 150                 155                 160

Asp Lys Ala Ala Asn Lys Glu Leu Thr Phe Leu Leu Phe Ser Cys Pro
                165                 170                 175

His Arg Leu Arg Glu His Leu Glu Arg Gly Arg Gly Asn Leu Glu Trp
            180                 185                 190

Lys Glu Pro Pro Ser Met Arg Leu Lys Ala Arg Pro Gly Asn Pro Gly
        195                 200                 205

Phe Ser Val Leu Thr Cys Ser Ala Phe Ser Phe Tyr Pro Pro Glu Leu
    210                 215                 220

Gln Leu Arg Phe Leu Arg Asn Gly Met Ala Ala Gly Thr Gly Gln Gly
225                 230                 235                 240

Asp Phe Gly Pro Asn Ser Asp Gly Ser Phe His Ala Ser Ser Ser Leu
                245                 250                 255

Thr Val Lys Ser Gly Asp Glu His His Tyr Cys Cys Ile Val Gln His
            260                 265                 270

Ala Gly Leu Ala Gln Pro Leu Arg Val Glu Leu Glu Thr Pro Ala Lys
        275                 280                 285

Ser Ser Leu Glu His His His His His His His His Ile Gly
    290                 295                 300

Leu Asn Asp Ile Phe Glu Ala Gln Lys Ile Glu Trp His Glu
305                 310                 315

<210> SEQ ID NO 13
<211> LENGTH: 95
<212> TYPE: PRT
<213> ORGANISM: Macaca fascicularis

<400> SEQUENCE: 13

Pro Lys Ile Gln Val Tyr Ser Arg His Pro Pro Glu Asn Gly Lys Pro
1               5                   10                  15

Asn Phe Leu Asn Cys Tyr Val Ser Gly Phe His Pro Ser Asp Ile Glu
            20                  25                  30

Val Asp Leu Leu Lys Asn Gly Glu Lys Met Gly Lys Val Glu His Ser
        35                  40                  45

Asp Leu Ser Phe Ser Lys Asp Trp Ser Phe Tyr Leu Leu Tyr Tyr Thr
    50                  55                  60

Glu Phe Thr Pro Asn Glu Lys Asp Glu Tyr Ala Cys Arg Val Asn His
65                  70                  75                  80

Val Thr Leu Ser Gly Pro Arg Thr Val Lys Trp Asp Arg Asp Met
                85                  90                  95

<210> SEQ ID NO 14
<211> LENGTH: 119
<212> TYPE: PRT
<213> ORGANISM: Macaca fascicularis

<400> SEQUENCE: 14

```
Met Ser Pro Ser Val Ala Leu Ala Val Leu Ala Leu Leu Ser Leu Ser
1               5                   10                  15

Gly Leu Glu Ala Ile Gln Arg Thr Pro Lys Ile Gln Val Tyr Ser Arg
                20                  25                  30

His Pro Pro Glu Asn Gly Lys Pro Asn Phe Leu Asn Cys Tyr Val Ser
            35                  40                  45

Gly Phe His Pro Ser Asp Ile Glu Val Asp Leu Leu Lys Asn Gly Glu
        50                  55                  60

Lys Met Gly Lys Val Glu His Ser Asp Leu Ser Phe Ser Lys Asp Trp
65                  70                  75                  80

Ser Phe Tyr Leu Leu Tyr Tyr Thr Glu Phe Thr Pro Asn Glu Lys Asp
                85                  90                  95

Glu Tyr Ala Cys Arg Val Asn His Val Thr Leu Ser Gly Pro Arg Thr
            100                 105                 110

Val Lys Trp Asp Arg Asp Met
        115
```

<210> SEQ ID NO 15
<211> LENGTH: 276
<212> TYPE: PRT
<213> ORGANISM: Mus musculus

<400> SEQUENCE: 15

```
Ser Glu Thr Arg Pro Pro Leu Met Tyr His Leu Thr Ala Val Ser Asn
1               5                   10                  15

Pro Ser Thr Gly Leu Pro Ser Phe Trp Ala Thr Gly Trp Leu Gly Pro
                20                  25                  30

Gln Gln Tyr Leu Thr Tyr Asn Ser Leu Arg Gln Glu Ala Asp Pro Cys
            35                  40                  45

Gly Ala Trp Met Trp Glu Asn Gln Val Ser Trp Tyr Trp Glu Lys Glu
        50                  55                  60

Thr Thr Asp Leu Lys Ser Lys Glu Gln Leu Phe Leu Glu Ala Leu Lys
65                  70                  75                  80

Thr Leu Glu Lys Ile Leu Asn Gly Thr Tyr Thr Leu Gln Gly Leu Leu
                85                  90                  95

Gly Cys Glu Leu Ala Ser Asp Asn Ser Ser Val Pro Thr Ala Val Phe
            100                 105                 110

Ala Leu Asn Gly Glu Glu Phe Met Lys Phe Asn Pro Arg Ile Gly Asn
        115                 120                 125

Trp Thr Gly Glu Trp Pro Glu Thr Glu Ile Val Ala Asn Leu Trp Met
130                 135                 140

Lys Gln Pro Asp Ala Ala Arg Lys Glu Ser Glu Phe Leu Leu Asn Ser
145                 150                 155                 160

Cys Pro Glu Arg Leu Leu Gly His Leu Glu Arg Gly Arg Arg Asn Leu
                165                 170                 175

Glu Trp Lys Glu Pro Pro Ser Met Arg Leu Lys Ala Arg Pro Gly Asn
            180                 185                 190

Ser Gly Ser Ser Val Leu Thr Cys Ala Ala Phe Ser Phe Tyr Pro Pro
        195                 200                 205

Glu Leu Lys Phe Arg Phe Leu Arg Asn Gly Leu Ala Ser Gly Ser Gly
        210                 215                 220

Asn Cys Ser Thr Gly Pro Asn Gly Asp Gly Ser Phe His Ala Trp Ser
225                 230                 235                 240

Leu Leu Glu Val Lys Arg Gly Asp Glu His His Tyr Gln Cys Gln Val
```

```
                    245                 250                 255
Glu His Glu Gly Leu Ala Gln Pro Leu Thr Val Asp Leu Asp Ser Ser
                260                 265                 270

Ala Arg Ser Ser
            275

<210> SEQ ID NO 16
<211> LENGTH: 304
<212> TYPE: PRT
<213> ORGANISM: Artificial Sequence
<220> FEATURE:
<223> OTHER INFORMATION: mu a-FcRn w/ tag w/ leader

<400> SEQUENCE: 16

Ser Glu Thr Arg Pro Pro Leu Met Tyr His Leu Thr Ala Val Ser Asn
1               5                   10                  15

Pro Ser Thr Gly Leu Pro Ser Phe Trp Ala Thr Gly Trp Leu Gly Pro
                20                  25                  30

Gln Gln Tyr Leu Thr Tyr Asn Ser Leu Arg Gln Glu Ala Asp Pro Cys
            35                  40                  45

Gly Ala Trp Met Trp Glu Asn Gln Val Ser Trp Tyr Trp Glu Lys Glu
    50                  55                  60

Thr Thr Asp Leu Lys Ser Lys Glu Gln Leu Phe Leu Glu Ala Leu Lys
65                  70                  75                  80

Thr Leu Glu Lys Ile Leu Asn Gly Thr Tyr Thr Leu Gln Gly Leu Leu
                85                  90                  95

Gly Cys Glu Leu Ala Ser Asp Asn Ser Ser Val Pro Thr Ala Val Phe
            100                 105                 110

Ala Leu Asn Gly Glu Glu Phe Met Lys Phe Asn Pro Arg Ile Gly Asn
    115                 120                 125

Trp Thr Gly Glu Trp Pro Glu Thr Glu Ile Val Ala Asn Leu Trp Met
130                 135                 140

Lys Gln Pro Asp Ala Ala Arg Lys Glu Ser Glu Phe Leu Leu Asn Ser
145                 150                 155                 160

Cys Pro Glu Arg Leu Leu Gly His Leu Glu Arg Gly Arg Arg Asn Leu
                165                 170                 175

Glu Trp Lys Glu Pro Pro Ser Met Arg Leu Lys Ala Arg Pro Gly Asn
            180                 185                 190

Ser Gly Ser Ser Val Leu Thr Cys Ala Ala Phe Ser Phe Tyr Pro Pro
    195                 200                 205

Glu Leu Lys Phe Arg Phe Leu Arg Asn Gly Leu Ala Ser Gly Ser Gly
    210                 215                 220

Asn Cys Ser Thr Gly Pro Asn Gly Asp Gly Ser Phe His Ala Trp Ser
225                 230                 235                 240

Leu Leu Glu Val Lys Arg Gly Asp Glu His His Tyr Gln Cys Gln Val
                245                 250                 255

Glu His Glu Gly Leu Ala Gln Pro Leu Thr Val Asp Leu Asp Ser Ser
                260                 265                 270

Ala Arg Ser Ser Leu Glu His His His His His His His His
            275                 280                 285

Ile Gly Leu Asn Asp Ile Phe Glu Ala Gln Lys Ile Glu Trp His Glu
            290                 295                 300

<210> SEQ ID NO 17
<211> LENGTH: 292
<212> TYPE: PRT
```

<213> ORGANISM: Mus musculus

<400> SEQUENCE: 17

Met Pro Leu Leu Leu Leu Pro Leu Leu Trp Ala Gly Ala Leu Ala
1               5                   10                  15

Ser Glu Thr Arg Pro Pro Leu Met Tyr His Leu Thr Ala Val Ser Asn
            20                  25                  30

Pro Ser Thr Gly Leu Pro Ser Phe Trp Ala Thr Gly Trp Leu Gly Pro
                35                  40                  45

Gln Gln Tyr Leu Thr Tyr Asn Ser Leu Arg Gln Glu Ala Asp Pro Cys
    50                  55                  60

Gly Ala Trp Met Trp Glu Asn Gln Val Ser Trp Tyr Trp Glu Lys Glu
65                  70                  75                  80

Thr Thr Asp Leu Lys Ser Lys Glu Gln Leu Phe Leu Glu Ala Leu Lys
                85                  90                  95

Thr Leu Glu Lys Ile Leu Asn Gly Thr Tyr Thr Leu Gln Gly Leu Leu
            100                 105                 110

Gly Cys Glu Leu Ala Ser Asp Asn Ser Ser Val Pro Thr Ala Val Phe
        115                 120                 125

Ala Leu Asn Gly Glu Glu Phe Met Lys Phe Asn Pro Arg Ile Gly Asn
    130                 135                 140

Trp Thr Gly Glu Trp Pro Glu Thr Glu Ile Val Ala Asn Leu Trp Met
145                 150                 155                 160

Lys Gln Pro Asp Ala Ala Arg Lys Glu Ser Glu Phe Leu Leu Asn Ser
                165                 170                 175

Cys Pro Glu Arg Leu Leu Gly His Leu Glu Arg Gly Arg Arg Asn Leu
            180                 185                 190

Glu Trp Lys Glu Pro Pro Ser Met Arg Leu Lys Ala Arg Pro Gly Asn
        195                 200                 205

Ser Gly Ser Ser Val Leu Thr Cys Ala Ala Phe Ser Phe Tyr Pro Pro
    210                 215                 220

Glu Leu Lys Phe Arg Phe Leu Arg Asn Gly Leu Ala Ser Gly Ser Gly
225                 230                 235                 240

Asn Cys Ser Thr Gly Pro Asn Gly Asp Gly Ser Phe His Ala Trp Ser
                245                 250                 255

Leu Leu Glu Val Lys Arg Gly Asp His His Tyr Gln Cys Gln Val
            260                 265                 270

Glu His Glu Gly Leu Ala Gln Pro Leu Thr Val Asp Leu Asp Ser Ser
        275                 280                 285

Ala Arg Ser Ser
    290

<210> SEQ ID NO 18
<211> LENGTH: 320
<212> TYPE: PRT
<213> ORGANISM: Artificial Sequence
<220> FEATURE:
<223> OTHER INFORMATION: mu a-FcRn w/ tag w/ leader

<400> SEQUENCE: 18

Met Pro Leu Leu Leu Leu Pro Leu Leu Trp Ala Gly Ala Leu Ala
1               5                   10                  15

Ser Glu Thr Arg Pro Pro Leu Met Tyr His Leu Thr Ala Val Ser Asn
            20                  25                  30

Pro Ser Thr Gly Leu Pro Ser Phe Trp Ala Thr Gly Trp Leu Gly Pro
                35                  40                  45

```
Gln Gln Tyr Leu Thr Tyr Asn Ser Leu Arg Gln Glu Ala Asp Pro Cys
            50                  55                  60

Gly Ala Trp Met Trp Glu Asn Gln Val Ser Trp Tyr Trp Glu Lys Glu
 65                  70                  75                  80

Thr Thr Asp Leu Lys Ser Lys Glu Gln Leu Phe Leu Glu Ala Leu Lys
                85                  90                  95

Thr Leu Glu Lys Ile Leu Asn Gly Thr Tyr Thr Leu Gln Gly Leu Leu
            100                 105                 110

Gly Cys Glu Leu Ala Ser Asp Asn Ser Ser Val Pro Thr Ala Val Phe
            115                 120                 125

Ala Leu Asn Gly Glu Glu Phe Met Lys Phe Asn Pro Arg Ile Gly Asn
            130                 135                 140

Trp Thr Gly Glu Trp Pro Glu Thr Glu Ile Val Ala Asn Leu Trp Met
145                 150                 155                 160

Lys Gln Pro Asp Ala Ala Arg Lys Glu Ser Glu Phe Leu Leu Asn Ser
                165                 170                 175

Cys Pro Glu Arg Leu Leu Gly His Leu Glu Arg Gly Arg Arg Asn Leu
                180                 185                 190

Glu Trp Lys Glu Pro Pro Ser Met Arg Leu Lys Ala Arg Pro Gly Asn
                195                 200                 205

Ser Gly Ser Ser Val Leu Thr Cys Ala Ala Phe Ser Phe Tyr Pro Pro
210                 215                 220

Glu Leu Lys Phe Arg Phe Leu Arg Asn Gly Leu Ala Ser Gly Ser Gly
225                 230                 235                 240

Asn Cys Ser Thr Gly Pro Asn Gly Asp Gly Ser Phe His Ala Trp Ser
                245                 250                 255

Leu Leu Glu Val Lys Arg Gly Asp Glu His His Tyr Gln Cys Gln Val
            260                 265                 270

Glu His Glu Gly Leu Ala Gln Pro Leu Thr Val Asp Leu Asp Ser Ser
            275                 280                 285

Ala Arg Ser Ser Leu Glu His His His His His His His His
            290                 295                 300

Ile Gly Leu Asn Asp Ile Phe Glu Ala Gln Lys Ile Glu Trp His Glu
305                 310                 315                 320

<210> SEQ ID NO 19
<211> LENGTH: 95
<212> TYPE: PRT
<213> ORGANISM: Mus musculus

<400> SEQUENCE: 19

Pro Gln Ile Gln Val Tyr Ser Arg His Pro Pro Glu Asn Gly Lys Pro
 1               5                  10                  15

Asn Ile Leu Asn Cys Tyr Val Thr Gln Phe His Pro Pro His Ile Glu
                20                  25                  30

Ile Gln Met Leu Lys Asn Gly Lys Lys Ile Pro Lys Val Glu Met Ser
            35                  40                  45

Asp Met Ser Phe Ser Lys Asp Trp Ser Phe Tyr Ile Leu Ala His Thr
 50                  55                  60

Glu Phe Thr Pro Thr Glu Thr Asp Thr Tyr Ala Cys Arg Val Lys His
 65                  70                  75                  80

Ala Ser Met Ala Glu Pro Lys Thr Val Tyr Trp Asp Arg Asp Met
                85                  90                  95
```

-continued

```
<210> SEQ ID NO 20
<211> LENGTH: 119
<212> TYPE: PRT
<213> ORGANISM: Mus musculus

<400> SEQUENCE: 20

Met Ala Arg Ser Val Thr Leu Val Phe Leu Val Leu Val Ser Leu Thr
1               5                   10                  15

Gly Leu Tyr Ala Ile Gln Lys Thr Pro Gln Ile Gln Val Tyr Ser Arg
            20                  25                  30

His Pro Pro Glu Asn Gly Lys Pro Asn Ile Leu Asn Cys Tyr Val Thr
        35                  40                  45

Gln Phe His Pro Pro His Ile Glu Ile Gln Met Leu Lys Asn Gly Lys
    50                  55                  60

Lys Ile Pro Lys Val Glu Met Ser Asp Met Ser Phe Ser Lys Asp Trp
65                  70                  75                  80

Ser Phe Tyr Ile Leu Ala His Thr Glu Phe Thr Pro Thr Glu Thr Asp
                85                  90                  95

Thr Tyr Ala Cys Arg Val Lys His Asp Ser Met Ala Glu Pro Lys Thr
            100                 105                 110

Val Tyr Trp Asp Arg Asp Met
        115

<210> SEQ ID NO 21
<211> LENGTH: 330
<212> TYPE: PRT
<213> ORGANISM: Escherichia coli

<400> SEQUENCE: 21

Ala Lys Asp Asn Thr Val Pro Leu Lys Leu Ile Ala Leu Leu Ala Asn
1               5                   10                  15

Gly Glu Phe His Ser Gly Glu Gln Leu Gly Glu Thr Leu Gly Met Ser
            20                  25                  30

Arg Ala Ala Ile Asn Lys His Ile Gln Thr Leu Arg Asp Trp Gly Val
        35                  40                  45

Asp Val Phe Thr Val Pro Gly Lys Gly Tyr Ser Leu Pro Glu Pro Ile
    50                  55                  60

Gln Leu Leu Asn Ala Lys Gln Ile Leu Gly Gln Leu Asp Gly Gly Ser
65                  70                  75                  80

Val Ala Val Leu Pro Val Ile Asp Ser Thr Asn Gln Tyr Leu Leu Asp
                85                  90                  95

Arg Ile Gly Glu Leu Lys Ser Gly Asp Ala Cys Ile Ala Glu Tyr Gln
            100                 105                 110

Gln Ala Gly Arg Gly Arg Arg Gly Arg Lys Trp Phe Ser Pro Phe Gly
        115                 120                 125

Ala Asn Leu Tyr Leu Ser Met Phe Trp Arg Leu Glu Gln Gly Pro Ala
    130                 135                 140

Ala Ala Ile Gly Leu Ser Leu Val Ile Gly Ile Val Met Ala Glu Val
145                 150                 155                 160

Leu Arg Lys Leu Gly Ala Asp Lys Val Arg Val Lys Trp Pro Asn Asp
                165                 170                 175

Leu Tyr Leu Gln Asp Arg Lys Leu Ala Gly Ile Leu Val Glu Leu Thr
            180                 185                 190

Gly Lys Thr Gly Asp Ala Ala Gln Ile Val Ile Gly Ala Gly Ile Asn
        195                 200                 205

Met Ala Met Arg Arg Val Glu Glu Ser Val Val Asn Gln Gly Trp Ile
```

```
                210                 215                 220
Thr Leu Gln Glu Ala Gly Ile Asn Leu Asp Arg Asn Thr Leu Ala Ala
225                 230                 235                 240

Met Leu Ile Arg Glu Leu Arg Ala Ala Leu Glu Leu Phe Glu Gln Glu
                245                 250                 255

Gly Leu Ala Pro Tyr Leu Ser Arg Trp Glu Lys Leu Asp Asn Phe Ile
            260                 265                 270

Asn Arg Pro Val Lys Leu Ile Ile Gly Asp Lys Glu Ile Phe Gly Ile
        275                 280                 285

Ser Arg Gly Ile Asp Lys Gln Gly Ala Leu Leu Glu Gln Asp Gly
    290                 295                 300

Ile Ile Lys Pro Trp Met Gly Gly Glu Ile Ser Leu Arg Ser Ala Glu
305                 310                 315                 320

Lys Gly Gly Ser Asp Tyr Lys Asp Glu Leu
                325                 330

<210> SEQ ID NO 22
<211> LENGTH: 34
<212> TYPE: DNA
<213> ORGANISM: Artificial Sequence
<220> FEATURE:
<223> OTHER INFORMATION: L3

<400> SEQUENCE: 22
ataacttcgt ataaagtctc ctatacgaag ttat                           34

<210> SEQ ID NO 23
<211> LENGTH: 34
<212> TYPE: DNA
<213> ORGANISM: Artificial Sequence
<220> FEATURE:
<223> OTHER INFORMATION: 2L

<400> SEQUENCE: 23
ataacttcgt atagcataca ttatacgaag ttat                           34

<210> SEQ ID NO 24
<211> LENGTH: 34
<212> TYPE: DNA
<213> ORGANISM: Artificial Sequence
<220> FEATURE:
<223> OTHER INFORMATION: loxFas

<400> SEQUENCE: 24
acaacttcgt atataccttt ctatacgaag ttgt                           34

<210> SEQ ID NO 25
<211> LENGTH: 608
<212> TYPE: DNA
<213> ORGANISM: Human cytomegalovirus

<400> SEQUENCE: 25
gttgacattg attattgact agttattaat agtaatcaat tacggggtca ttagttcata    60
gcccatatat ggagttccgc gttacataac ttacggtaaa tggcccgcct ggctgaccgc   120
ccaacgaccc ccgcccattg acgtcaataa tgacgtatgt tcccatagta acgccaatag   180
ggactttcca ttgacgtcaa tgggtggagt atttacggta aactgcccac ttggcagtac   240
atcaagtgta tcatatgcca agtacgcccc ctattgacgt caatgacggt aaatggcccg   300
cctggcatta tgcccagtac atgaccttat gggactttcc tacttggcag tacatctacg   360
```

```
tattagtcat cgctattagc atggtgatgc ggttttggca gtacatcaat gggcgtggat    420
agcggtttga ctcacgggga tttccaagtc tccaccccat tgacgtcaat gggagtttgt    480
tttggcacca aaatcaacgg gactttccaa aatgtcgtaa caactccgcc ccattgacgc    540
aaatgggcgg taggcgtgta cggtgggagg tctatataag cagagctccg tttagtgaac    600
gtcagatc                                                             608

<210> SEQ ID NO 26
<211> LENGTH: 696
<212> TYPE: DNA
<213> ORGANISM: Human cytomegalovirus

<400> SEQUENCE: 26
gttgacattg attattgact agttattaat agtaatcaat tacggggtca ttagttcata     60
gcccatatat ggagttccgc gttacataac ttacggtaaa tggcccgcct ggctgaccgc    120
ccaacgaccc ccgcccattg acgtcaataa tgacgtatgt tcccatagta acgccaatag    180
ggactttcca ttgacgtcaa tgggtggagt atttacggta aactgcccac ttggcagtac    240
atcaagtgta tcatatgcca gtacgccccc tattgacgtc aatgacggt aaatggcccg     300 cctggcatta tgcccagtac atgaccttat gggactttcc tacttggcag tacatctacg    360
tattagtcat cgctattagc atggtgatgc ggttttggca gtacatcaat gggcgtggat    420
agcggtttga ctcacgggga tttccaagtc tccaccccat tgacgtcaat gggagtttgt    480
tttggcacca aaatcaacgg gactttccaa aatgtcgtaa caactccgcc ccattgacgc    540
aaatgggcgg taggcgtgta cggtgggagg tctatataag cagagctccg tttagtgaac    600
gtcagatcta gctctgggag aggagcccag cactagaagt cggcggtgtt tccattcggt    660
gatcagcact gaacacagag gaagcttgcc gccacc                              696

<210> SEQ ID NO 27
<211> LENGTH: 2125
<212> TYPE: DNA
<213> ORGANISM: Human cytomegalovirus

<400> SEQUENCE: 27
ctgcagtgaa taataaaatg tgtgtttgtc cgaaatacgc gttttgagat ttctgtcgcc     60
gactaaattc atgtcgcgcg atagtggtgt ttatcgccga tagagatggc gatattggaa    120
aaatcgatat ttgaaaatat ggcatattga aaatgtcgcc gatgtgagtt tctgtgtaac    180
tgatatcgcc attttccaa aagtgatttt tgggcatacg cgatatctgg cgatagcgct    240
tatatcgttt acggggatg gcgatagacg actttggtga cttgggcgat tctgtgtgtc    300
gcaaatatcg cagtttcgat ataggtgaca gacgatatga ggctatatcg ccgatagagg    360
cgacatcaag ctggcacatg gccaatgcat atcgatctat acattgaatc aatattggcc    420
attagccata ttattcattg gttatatagc ataaatcaat attggctatt ggccattgca    480
tacgttgtat ccatatcata atatgtacat ttatattggc tcatgtccaa cattaccgcc    540
atgttgacat tgattattga ctagttatta atagtaatca attacggggt cattagttca    600
tagcccatat atggagttcc gcgttacata acttacggta atggcccgc ctggctgacc     660 gcccaacgac ccccgcccat tgacgtcaat aatgacgtat gttcccatag taacgccaat    720
agggactttc cattgacgtc aatgggtgga gtatttacgg taaactgccc acttggcagt    780
acatcaagtg tatcatatgc caagtacgcc ccctattgac gtcaatgacg gtaaatggcc    840
cgcctggcat tatgcccagt acatgacctt atgggacttt cctacttggc agtacatcta    900
```

```
cgtattagtc atcgctatta ccatggtgat gcggttttgg cagtacatca atgggcgtgg      960
atagcggttt gactcacggg gatttccaag tctccacccc attgacgtca atgggagttt     1020
gttttggcac caaaatcaac gggactttcc aaaatgtcgt aacaactccg ccccattgac     1080
gcaaatgggc ggtaggcgtg tacggtggga ggtctatata agcagagctc gtttagtgaa     1140
ccgtcagatc gcctggagac gccatccacg ctgttttgac ctccatagaa gacaccggga     1200
ccgatccagc ctccgcggcc gggaacggtg cattggaacg cggattcccc gtgccaagag     1260
tgacgtaagt accgcctata gagtctatag gcccaccccc ttggcttctt atgcatgcta     1320
tactgttttt ggcttggggt ctatacaccc ccgcttcctc atgttatagg tgatggtata     1380
gcttagccta taggtgtggg ttattgacca ttattgacca ctcccctatt ggtgacgata     1440
ctttccatta ctaatccata acatggctct ttgccacaac tctctttatt ggctatatgc     1500
caatacactg tccttcagag actgacacgg actctgtatt tttacaggat ggggtctcat     1560
ttattattta caaattcaca tatacaacac caccgtcccc agtgcccgca gttttttatta     1620 aacataacgt gggatctcca cgcgaatctc gggtacgtgt tccggacatg ggctcttctc     1680
cggtagcggc ggagcttcta catccgagcc ctgctcccat gcctccagcg actcatggtc     1740
gctcggcagc tccttgctcc taacagtgga ggccagactt aggcacagca cgatgcccac     1800
caccaccagt gtgccgcaca aggccgtggc ggtagggtat gtgtctgaaa atgagctcgg     1860
ggagcgggct tgcaccgctg acgcatttgg aagacttaag gcagcggcag aagaagatgc     1920
aggcagctga gttgttgtgt tctgataaga gtcagaggta actcccgttg cggtgctgtt     1980
aacggtggag ggcagtgtag tctgagcagt actcgttgct gccgcgcgcg ccaccagaca     2040
taatagctga cagactaaca gactgttcct ttccatgggt cttttctgca gtcaccgtcc     2100
ttgacacggt ttaaacgccg ccacc                                           2125

<210> SEQ ID NO 28
<211> LENGTH: 129
<212> TYPE: DNA
<213> ORGANISM: Simian virus 40

<400> SEQUENCE: 28
aacttgttta ttgcagctta taatggttac aaataaagca atagcatcac aaatttcaca       60
aataaagcat ttttttcacc attctagttg tggtttgtcc aaactcatca atgtatctta      120
tcatgtctg                                                              129

<210> SEQ ID NO 29
<211> LENGTH: 225
<212> TYPE: DNA
<213> ORGANISM: Bos taurus

<400> SEQUENCE: 29
ctgtgccttc tagttgccag ccatctgttg tttgcccctc ccccgtgcct tccttgaccc       60
tggaaggtgc cactcccact gtcctttcct aataaaatga ggaaattgca tcgcattgtc      120
tgagtaggtg tcattctatt ctggggggtg ggtgggca ggacagcaag ggggaggatt       180
gggaagacaa tagcaggcat gctgggatg cggtgggctc tatgg                       225

<210> SEQ ID NO 30
<211> LENGTH: 73
<212> TYPE: DNA
<213> ORGANISM: Homo sapiens
```

```
<400> SEQUENCE: 30
caggataata tatggtaggg ttcatagcca gagtaacctt tttttttaat ttttatttta    60
ttttattttt gag                                                       73

<210> SEQ ID NO 31
<211> LENGTH: 288
<212> TYPE: DNA
<213> ORGANISM: Simian virus 40

<400> SEQUENCE: 31
agtcagcaac caggtgtgga aagtccccag gctccccagc aggcagaagt atgcaaagca    60
tgcatctcaa ttagtcagca accatagtcc cgcccctaac tccgcccatc ccgcccctaa   120
ctccgcccag ttccgcccat tctccgcccc atggctgact aatttttttt atttatgcag   180
aggccgaggc cgcctctgcc tctgagctat tccagaagta gtgaggaggc ttttttggag   240
gcctaggctt ttgcaaaaag ctcccgggag cttgtatatc cattttcg               288

<210> SEQ ID NO 32
<211> LENGTH: 798
<212> TYPE: DNA
<213> ORGANISM: Artificial Sequence
<220> FEATURE:
<223> OTHER INFORMATION: green fluorescent protein encoding nucleic acid

<400> SEQUENCE: 32
atggtgagca agggcgagga gctgttcacc ggggtggtgc ccatcctggt cgagctggac    60
ggcgacgtaa acggccacaa gttcagcgtg tccggcgagg gcgagggcga tgccacctac   120
ggcaagctga cccctgaagtt catctgcacc accggcaagc tgcccgtgcc ctggcccacc   180
ctcgtgacca ccctgaccta cggcgtgcag tgcttcagcc gctaccccga ccacatgaag   240
cagcacgact tcttcaagtc cgccatgccc gaaggctacg tccaggagcg caccatcttc   300
ttcaaggacg acggcaacta caagacccgc gccgaggtga agttcgaggg cgacaccctg   360
gtgaaccgca tcgagctgaa gggcatcgac ttcaaggagg acggcaacat cctggggcac   420
aagctggagt acaactacaa cagccacaac gtctatatca tggccgacaa gcagaagaac   480
ggcatcaagg tgaacttcaa gatccgccac aacatcgagg acggcagcgt gcagctcgcc   540
gaccactacc agcagaacac ccccatcggc gacggccccg tgctgctgcc cgacaaccac   600
tacctgagca cccagtccgc cctgagcaaa gaccccaacg agaagcgcga tcacatggtc   660
ctgctggagt tcgtgaccgc cgccgggatc actctcggca tggacgagct gtacaagtcc   720
ggactcagat ctcgagctca agcttcgaat tctgcagtcg acggtaccgc gggcccggga   780
tccaccggat ctagatga                                                798
```